(12) United States Patent
He et al.

(10) Patent No.: US 11,068,685 B2
(45) Date of Patent: Jul. 20, 2021

(54) OPTICAL ID SENSING USING ILLUMINATION LIGHT SOURCES POSITIONED AT A PERIPHERY OF A DISPLAY SCREEN

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/860,000

(22) Filed: Apr. 27, 2020

(65) Prior Publication Data
US 2020/0327302 A1 Oct. 15, 2020

Related U.S. Application Data

(62) Division of application No. 16/380,969, filed on Apr. 10, 2019, now abandoned.

(51) Int. Cl.
| | |
|---|---|
| *G06K 9/00* | (2006.01) |
| *G06F 3/042* | (2006.01) |
| *G06F 3/041* | (2006.01) |
| *H01L 27/32* | (2006.01) |
| *G06F 21/32* | (2013.01) |

(52) U.S. Cl.
CPC ......... *G06K 9/00013* (2013.01); *G06F 3/042* (2013.01); *G06F 3/0412* (2013.01); *G06F 3/0421* (2013.01); *G06F 21/32* (2013.01); *H01L 27/323* (2013.01); *H01L 27/3234* (2013.01)

(58) Field of Classification Search
CPC .. G06K 9/00013; G06K 9/004; G06F 3/0412; G06F 3/042; G06F 3/0421; G06F 21/32; H01L 27/3234; H01L 27/323
See application file for complete search history.

(56) References Cited

U.S. PATENT DOCUMENTS

| | | | | |
|---|---|---|---|---|
| 2008/0284925 | A1* | 11/2008 | Han | G06F 3/0425 349/12 |
| 2014/0098058 | A1* | 4/2014 | Baharav | G06F 3/0416 345/174 |
| 2015/0331508 | A1* | 11/2015 | Nho | G06F 3/0445 345/173 |
| 2017/0220838 | A1* | 8/2017 | He | G06F 3/044 |
| 2017/0364763 | A1* | 12/2017 | Jin | G06F 21/32 |

\* cited by examiner

*Primary Examiner* — Liliana Cerullo
(74) *Attorney, Agent, or Firm* — Kilpatrick Townsend & Stockton LLP

(57) ABSTRACT

An electronic device includes a display screen, which includes a cover glass, a transparent layer disposed under the cover glass disposed under the cover glass, and a display illumination layer disposed under the transparent layer. The electronic device further includes an optical ID sensing module disposed under the display illumination layer and configured to form an image of a fingerprint pattern or a palmprint pattern of a hand of a user. The electronic device further includes a light source disposed at an edge side of the transparent layer, and is configured to emit a light beam to be coupled into the transparent layer through the edge side. A portion of the light beam may be transmitted through the cover glass to illuminate the hand for imaging of fingerprint pattern or the palmprint pattern by the optical ID sensing module.

15 Claims, 37 Drawing Sheets

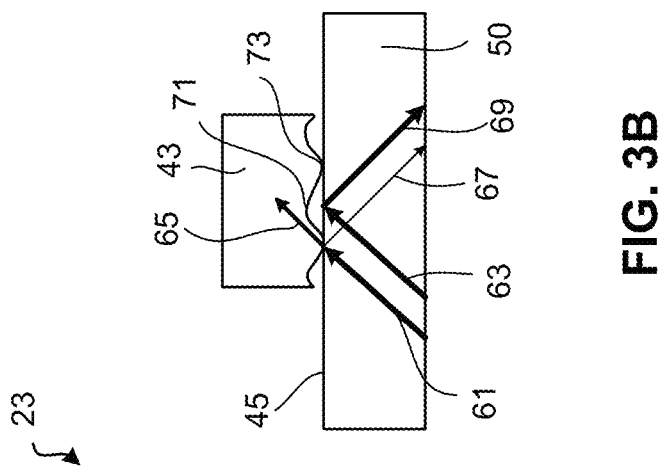
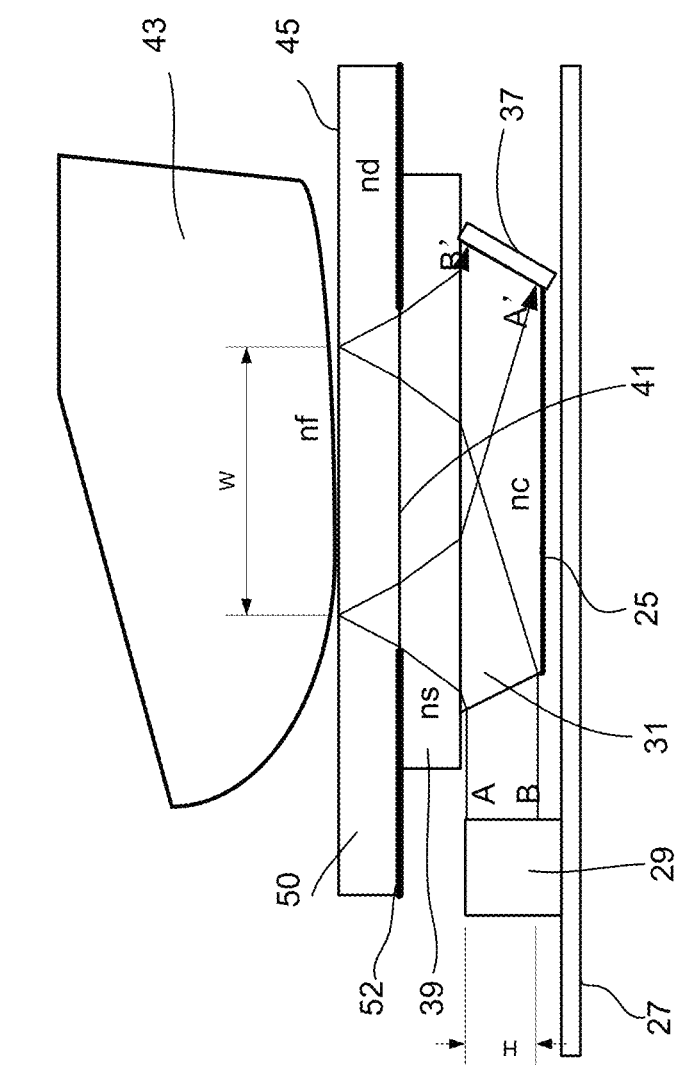
FIG. 3B
FIG. 3A
FIG. 3

21- Fingerprint sensor mark
23- Fingerprint sensor module
25- Matched color material layer
27- Flexible printed circuit (FPC) with circuits
31- Matched coupler
35- Light sources for decorating illumination
50- Enhanced cover glass
52- Color material layer 26- Matched color material layer
27- Flexible printed circuit (FPC) with circuits
29- Probe light source
31- Matched coupler
33- Light sources for liveness detection
35- Light sources for decorating illumination
37- Photo diode array
39- Spacer material
41- Light path window
43- Touching finger
45- Sensing surface
51- Sensor cover glass
53- Color material layer 3010- Touch panel assembly
3012- Other sensor positions
3014, 3016- Side buttons
3021- Fingerprint sensor position
3022- In-display virtual button position
3023- Fingerprint sensor Module
3024- Extra light sources
3025- Field of view
3027- Trigger probing media
3043- Finger
3050- Enhanced cover glass
3052- Support cover glass
3054- Other display layers
3056- Bottom layers of the display

FIG. 21
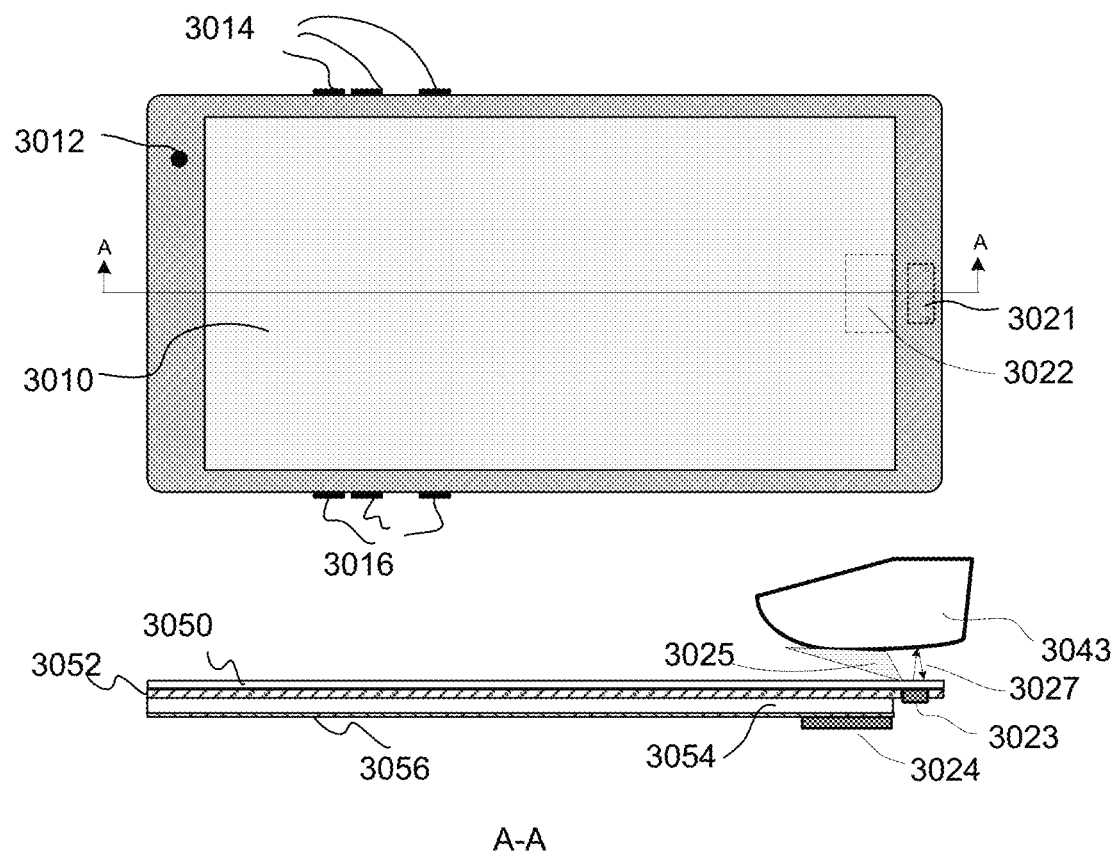
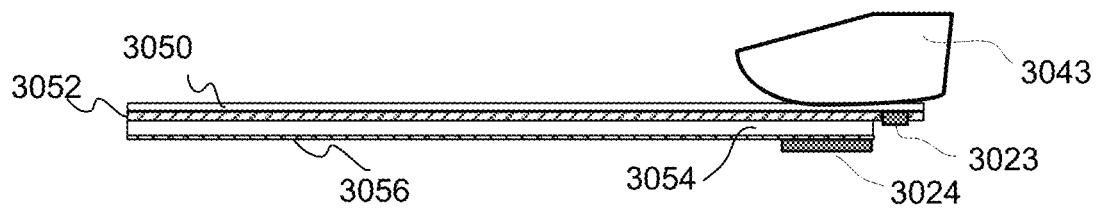
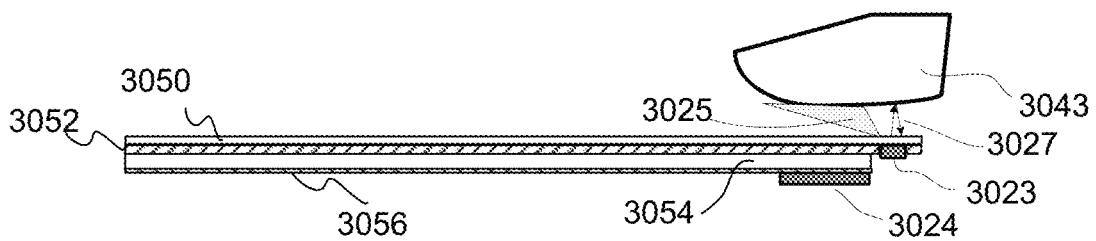

3050- Enhanced cover glass
3052- Support cover glass
3054- Other display layers
3093- Discrete sensor module 2301- Lightly pressed fingerprint
2303- Heavily pressed fingerprint
2305- Integration zone 4001 - Platform front side
4003 - Platform back side
4005 - Hand approaching from front side
4007 - Front side palmprint sensor field of view
4009 - Hand approaching from back side
4011 - Back side palmprint sensor field of view
4013 - Palmprint sensor
4015 - Micro lens or pinhole of the palmprint sensor
4017 - Photodiode array of the palmprint sensor
4019 - Side buttons 4030- Palmprint sensor
4031- Platform
4032- Display screen
4033- Finger to touch the virtual buttons
4035- Security check reminding cursors
4037- Sensor viewing angle
4039- Palmprint being evaluated 4001 - Platform front side
4003 - Platform back side
4013 - Palmprint sensor
4041 - Finger approaching the sensing reminding cursor
4043 - Sensor viewing angle
4045 - Fingerprint being evaluated 4001 - Platform front side
4003 - Platform back side
4013 - Palmprint sensor
4051 - Finger approaching the sensing reminding cursor
4053 - Sensor viewing angle
4055 - Fingerprint being evaluated 5011- Cover glass
5013- Touch sensing layer
5015- OLED layer
5017- Other material layers 5019- Dark coating
5021- Fingerprint/palmprint sensor window
5023- Fingerprint/palmprint sensor module
5025- Out light sources 5011- Cover glass
5013- Touch sensor layer
5015- Illumination layer
5017- Other material layers 5019- Dark coatings
5061- Out light sources
5063,5064- Light coupled into the cover glass
5065,5066- Light coupled out into the finger

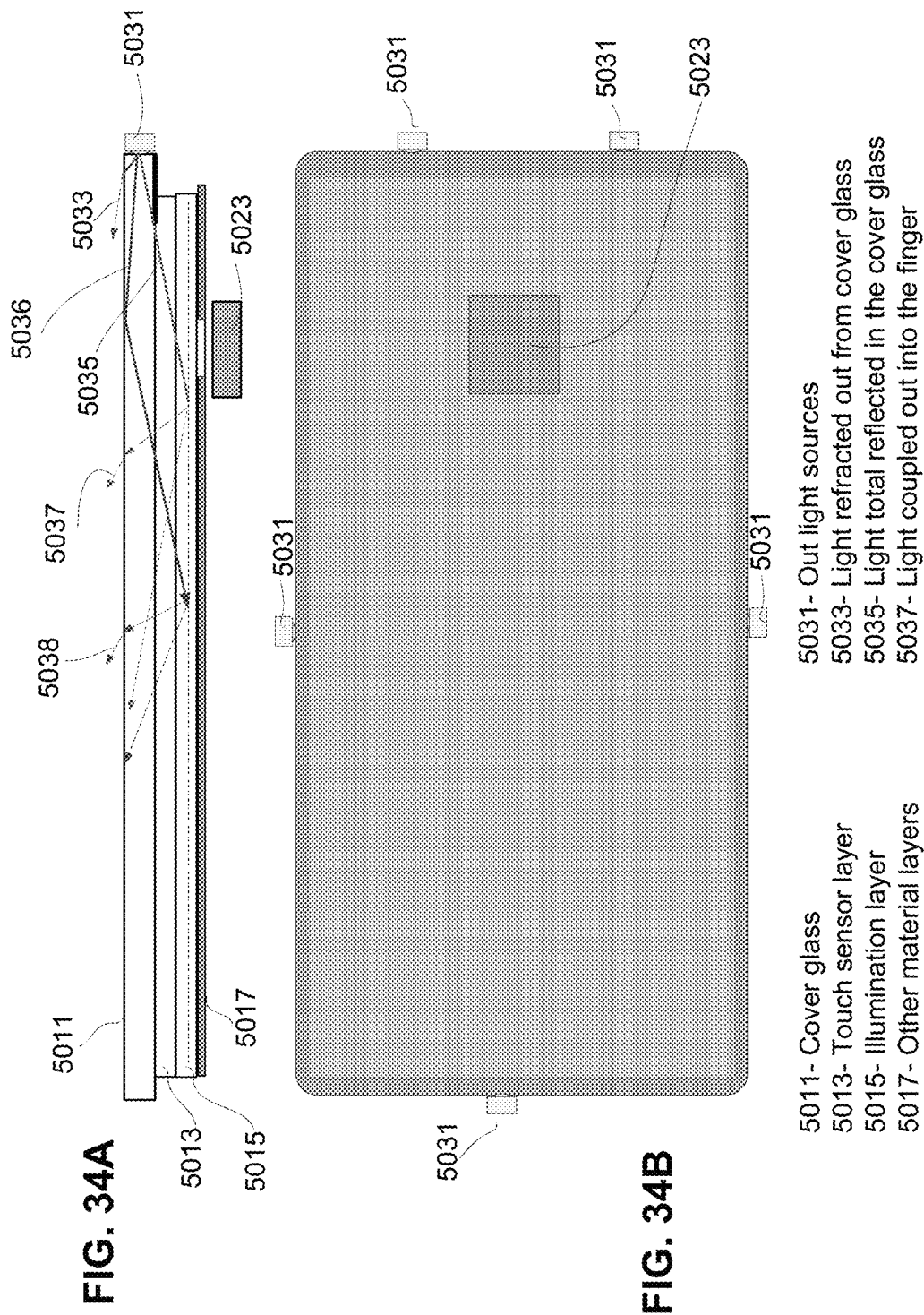

5011- Cover glass
5013- Touch sensor layer
5015- Illumination layer
5017- Other material layers
5019, 5045- Dark coatings 5041- Out light sources
5043- Light coupler
5044- Light coupling window
5046, 5047- Light coupled into the cover glass
5048, 5049- Light coupled out into the finger 5011- Cover glass
5013- Touch sensor layer
5015- Illumination layer
5017- Other material layers 5019- Dark coatings
5071- Out light sources
5077- Reflection films

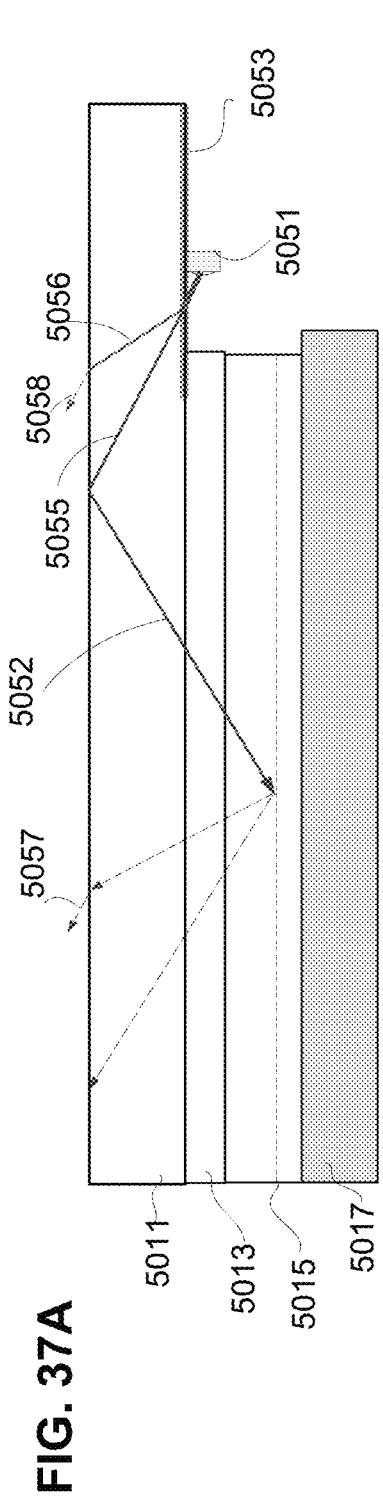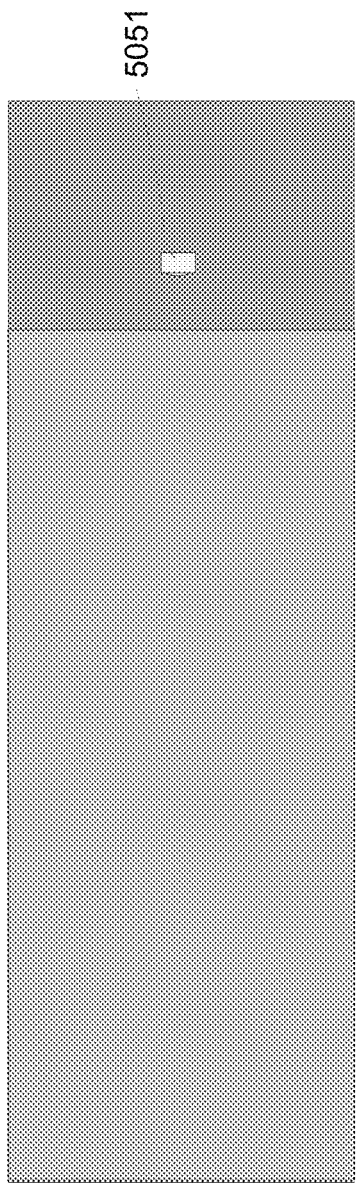
FIG. 37A
FIG. 37B
5011- Cover glass
5013- Touch sensor layer
5015- Illumination layer
5017- Other material layers
5051- Out light sources
5053- Partially transparent dark coating
5055, 5056- Light coupled into the cover glass
5057, 5058- Light coupled out into the finger

OPTICAL ID SENSING USING ILLUMINATION LIGHT SOURCES POSITIONED AT A PERIPHERY OF A DISPLAY SCREEN

REFERENCES TO RELATED APPLICATIONS

This application is a Division of U.S. application Ser. No. 16/380,969, entitled "OPTICAL ID SENSING USING ILLUMINATION LIGHT SOURCES POSITIONED AT A PERIPHERY OF A DISPLAY SCREEN," filed on Apr. 10, 2019, the disclosure of which is hereby incorporated by reference in its entirety for all purposes.

TECHNICAL FIELD

This patent document generally relates to fingerprint or palmprint recognition and its applications for secure access of electronic devices or information systems.

BACKGROUND

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access for protecting the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as automatic teller machines (ATMs).

Secured access to a device such as a mobile device or a system such as an electronic database and a computer-controlled system can be achieved in different ways, including, for example, using user passwords. Passwords, however, may be easily stolen or obtained. This nature of passwords can reduce the level of the security. Moreover, a user needs to remember a password to use electronic devices or systems, and, if the user forgets the password, the user needs to undertake certain password recovery procedures to get authenticated or otherwise regain the access to the device. Such processes may be burdensome to users and may have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods. One form of biometric identifiers is a person's fingerprint pattern or palmprint pattern. A fingerprint sensor and/or a palmprint sensor can be built into an electronic device or an information system to read a user's fingerprint pattern and/or palmprint pattern, so that the device can only be unlocked by an authorized user of the device through fingerprint and/or palmprint authentication.

SUMMARY

According to some embodiments, an electronic device includes a display screen. The display screen includes a cover glass, a transparent layer disposed under the cover glass disposed under the cover glass, and a display illumination layer disposed under the transparent layer. The transparent layer has an edge side. The electronic device further includes an optical ID sensing module disposed under the display illumination layer. The optical ID sensing module is configured to form an image of a fingerprint pattern or a palmprint pattern of a hand of a user placed within a field of view (FOV) of the optical ID sensing module. The electronic device further includes a light source disposed at the edge side of the transparent layer. The light source is configured to emit a light beam to be coupled into the transparent layer through the edge side. A portion of the light beam may be transmitted through the cover glass to illuminate the hand for imaging of fingerprint pattern or the palmprint pattern by the optical ID sensing module.

According to some embodiments, an electronic device includes a display screen. The display screen includes a cover glass, a touch sensing layer disposed under the cover glass, and an organic light-emitting diode (OLED) layer disposed under the touch sensing layer. The touch sensing layer has an edge side. The electronic device further includes an optical ID sensing module disposed under the OLED layer. The optical ID sensing module is configured to form an image of a fingerprint pattern or a palmprint pattern of a hand of a user placed within a field of view (FOV) of the optical ID sensing module. The electronic device further includes a light source disposed at the edge side of the touch sensing layer. The light source is configured to emit a light beam to be coupled into the touch sensing layer through the edge side. A portion of the light beam may be transmitted through the cover glass to illuminate the hand for imaging of fingerprint pattern or the palmprint pattern by the optical ID sensing module.

According to some embodiments, an electronic device includes a display screen. The display screen includes a cover glass, and a display illumination layer disposed under the cover glass. The electronic device further includes an optical ID sensing module disposed under the display illumination layer. The optical ID sensing module is configured to form an image of a fingerprint pattern or a palmprint pattern of a hand of a user placed within a field of view (FOV) of the optical ID sensing module. The electronic device further includes a light source disposed adjacent the cover glass. The light source is configured to emit a light beam to be coupled into the cover glass. A portion of the light beam may be transmitted through the cover glass to illuminate the hand for imaging of fingerprint pattern or the palmprint pattern by the optical ID sensing module.

BRIEF DESCRIPTION OF THE DRAWINGS

FIGS. 3A and 3B are diagrams showing an exemplary fingerprint sensing light path.

FIGS. 16, 17, 18, 19, 20 and 21 illustrate examples of features for implementing an optical sensor module to allow for optical sensing of an object in contact and non-contact conditions.

FIG. 34A shows a schematic cross-sectional view of a display screen of an electronic device equipped with an optical ID sensing module and peripheral light sources according to some embodiments.

FIG. 34B shows a schematic plan view of the electronic device illustrated in FIG. 34A according to some embodiments.

FIG. 37A shows a schematic cross-sectional view of a display screen of an electronic device equipped with peripheral light sources according to some embodiments.

FIG. 37B shows a schematic plan view of the electronic device illustrated in FIG. 37A according to some embodiments.

DETAILED DESCRIPTION

Figure 1A:
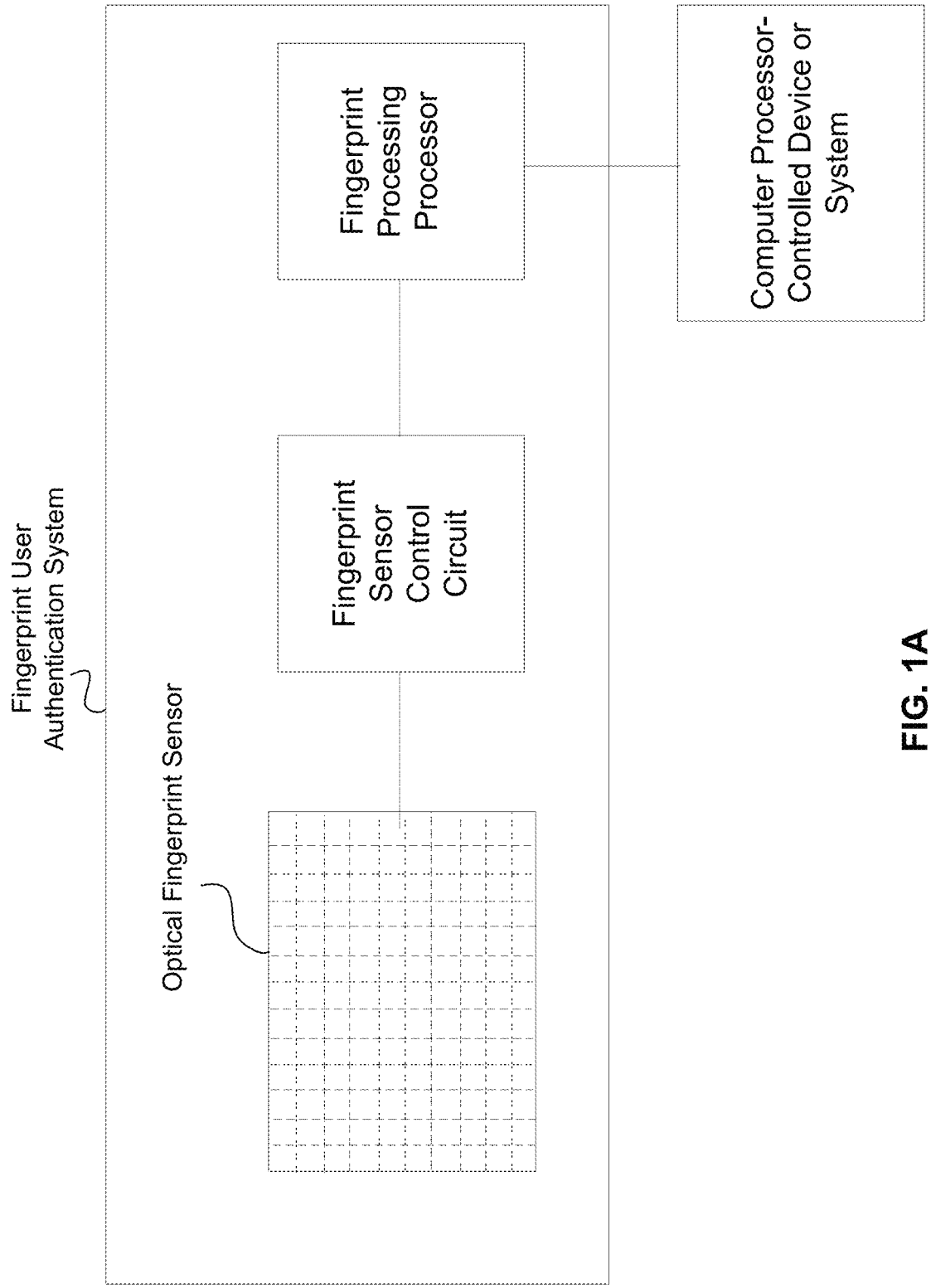
FIG. 1A is a block diagram of an example of an optical sensing based fingerprint user authentication system that controls the access to a computer processor controlled device or system.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device. Many implementations of capacitive fingerprint sensors must be implemented on the top surface of a device due to the near-field interaction requirement of capacitive sensing.

Optical sensing modules can be designed to mitigate the above and other limitations in the capacitive fingerprint sensors and to achieve additional technical advantages. For example, in implementing an optical fingerprint sensing device, the light carrying fingerprint imagining information can be directed over distance to an optical detector array of optical detectors for detecting the fingerprint without being limited to the near-field sensing in a capacitive sensor. In particular, light carrying fingerprint imagining information can be directed to transmit through the top cover glass commonly used in many display screens such as touch sensing screens and other structures and may be directed for folded or complex optical paths to reach the optical detector array, thus allowing for flexibility in placing an optical fingerprint sensor in a device that is not available for a capacitive fingerprint sensor. Optical sensor modules based on the disclosed technology in this patent document can be an under-screen optical sensor module that is placed below a display screen in some designs to capture and detect light from a finger placed on or above the top sensing surface of the screen. As disclosed in this patent document, optical sensing can also be used to, in addition to detecting and sensing a fingerprint pattern, detect other parameters such as whether a detected fingerprint is from a finger of a live person and to provide anti-spoofing mechanism, or certain biological parameters of the person.

The optical sensing technology and examples of implementations described in this patent document provide an optical sensor module that uses, at least in part, the light from a display screen as the illumination probe light to illuminate a fingerprint sensing area on the touch sensing surface of the display screen to perform one or more sensing operations based on optical sensing of such light. A suitable display screen for implementing the disclosed optical sensor technology can be based on various display technologies or configurations, including, a liquid crystal display (LCD) screen using a backlight to provide while light illumination to the LCD pixels with optical filters to produce colored LCD pixels, a display screen having light emitting display pixels without using backlight where each individual pixel generates light for forming a display image on the screen such as an organic light emitting diode (OLED) display screens, or electroluminescent display screens.

Regarding the additional optical sensing functions beyond fingerprint detection, the optical sensing may be used to measure other parameters. For example, the disclosed optical sensor technology can measure a pattern of a palm of a person given the large touch area available over the entire LCD display screen (in contrast, some designated fingerprint sensors such as the fingerprint senor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a blood flow dynamics change. Those and other changes can be measured by optical sensing based on the disclosed optical sensor technology and can be used to calculate the touch force. This touch force sensing can be used to add more functions to the optical sensor module beyond the fingerprint sensing.

With respect to useful operations or control features in connection with the touch sensing aspect of the display screen, the disclosed optical sensor technology can provide triggering functions or additional functions based on one or more sensing results from the optical sensor module to perform certain operations in connection with the touch sensing control over the display screen. For example, the optical property of a finger skin (e.g., the index of refraction) tends to be different from other artificial objects. Based on this, the optical sensor module may be designed to selectively receive and detect returned light that is caused by a finger in touch with the surface of the display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the display screen which, the pixels are put in a "sleep" mode by being turned off while one or more illumination light sources (e.g., LEDs) for the under-panel optical sensor module or selected display pixels in an LED display are turned on in a flash mode to intermittently emit flash light to the screen surface for sensing any touch by a person's finger or palm. Under this design, the optical sensor module operates the one or more illumination light sources to produce the "sleep" mode wake-up sensing light flashes so that the optical sensor module can detect returned light of such wake-up sensing light caused by the finger touch on the display screen and, upon a positive detection, the entire display screen is turned on or "woken up". In some implementations, the wake-up sensing light can be in the infrared invisible spectral range so a user will not experience any visual of a flash light. The display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the display screen is turned on and in the other frame when the display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

In some implementations, an optical sensor module based on the disclosed optical sensor technology can be coupled to the backside of the display screen without requiring creation of a designated area on the surface side of the display screen that would occupy a valuable device surface real estate in some electronic devices such as a smartphone, a tablet or a wearable device. This aspect of the disclosed technology can be used to provide certain advantages or benefits in both device designs and product integration or manufacturing.

Notably, among other features, the disclosed optical sensing technology can be implemented to provide optical fingerprint sensing while a user finger is located near a device while not in contact with the device for user authentication in accessing the device and can further provide optical fingerprint sensing while a user finger is in contact with the device. In some implementations (e.g., FIGS. 14-16 and 20-21 and their applications for optical sensing implementations with LCD and OLED displays), the optical fingerprint sensing can be performed on a finger in both contact and on-contact instances to enhance the fingerprint sensing and to provide anti-spoofing in the optical sensing. For example, multiple fingerprint images can be captured when a finger is located near a device while not in contact with the device and when the finger is in contact with the device. The captured fingerprint images of the non-contact finger and the captured fingerprint images of the contact finger provide two different types of optical fingerprint sensing mechanisms and can be used collectively to enhance the fingerprint sensing performance and anti-spoofing feature.

Each user has unique inner topographical features in their fingers that are below the skin surface and such inner features are not usually captured or available in various fingerprint sensors. Notably, such unique topographical features below the skin surface are difficult to duplicate by fake fingerprint pattern duplicating techniques many of which are designed to mimic or reproduce external images representing the external surface pattern of the skin surface such as a 2-dimensional fingerprint pattern of ridges and valleys on the external surface of a finger. The features of the external surface pattern of ridges and valleys on the external surface of a finger tend to vary in shape in connection with the contact conditions of the finger, e.g., a captured image of the fingerprint pattern when a finger is not pressed against a surface would tend to reflect the shapes of ridges and valleys of the finger in their natural positions would be different from the captured image of the same finger when a finger is deformed in shape when being pressed against a surface. Such external fingerprint variation in shape in connection with the contact condition of the finger can vary with the amount or level of pressing when the finger is pressed under different pressing forces or conditions, thus further complicating the fingerprint detectability or reliability in fingerprint sensing.

The disclosed optical sensing technology in this patent document can be used to or implemented to capture unique inner topographical features below the skin surface in user fingers to improve the detection accuracy of the optical fingerprint sensing and thus the security provided by fingerprint authentication.

Figure 1B:
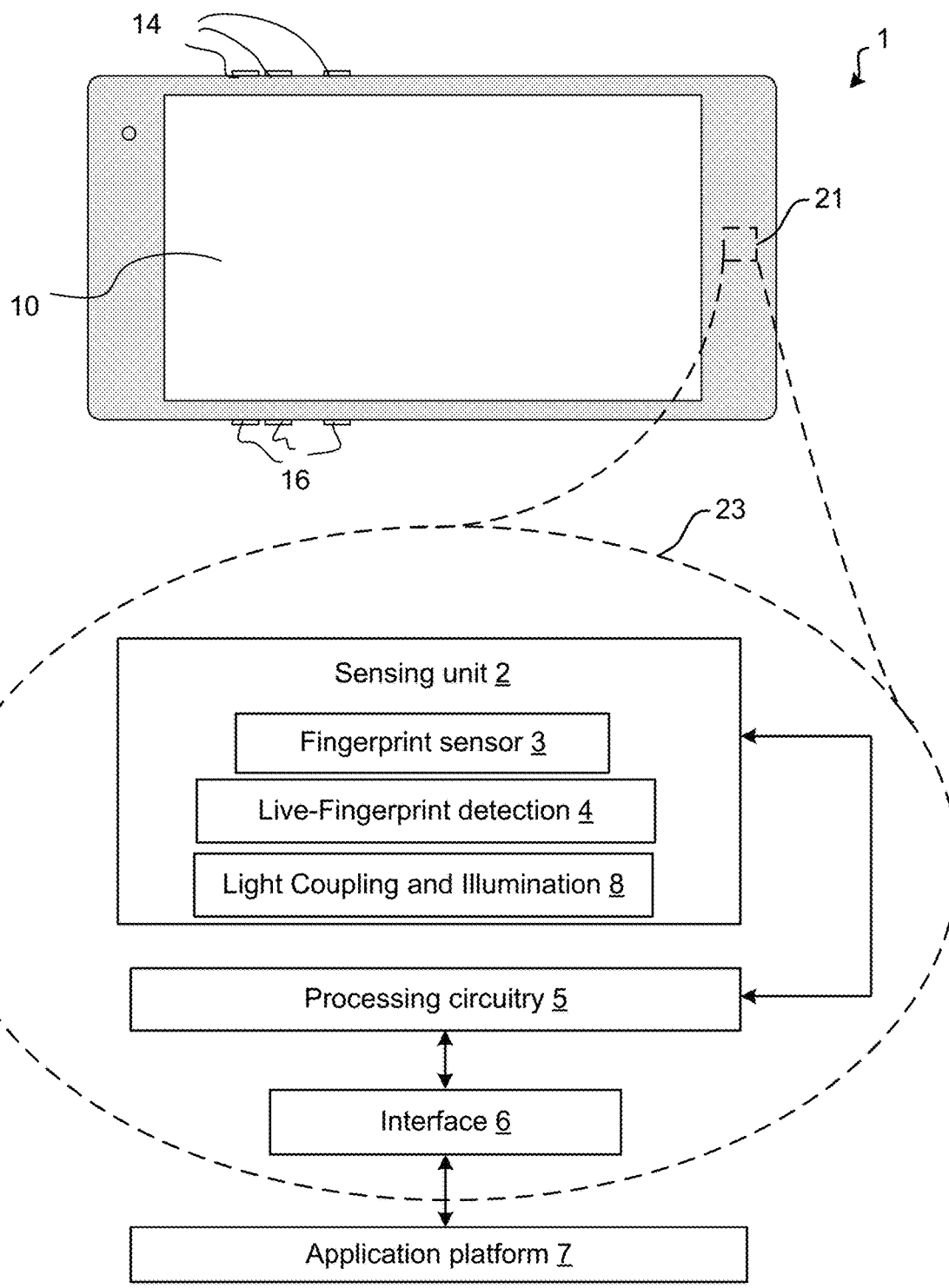
FIG. 1B is a block diagram showing an exemplary fingerprint sensor device implementing in a mobile device such as a smartphone based on the design in FIG. 1A.

FIG. 1A is a block diagram of an example of an optical sensing based fingerprint user authentication system that controls the access to a computer processor controlled device or system. The system uses an optical fingerprint sensor with an array of optical detectors to capture an optical image of received light that carries the fingerprint pattern from a finger that is touched on the optical fingerprint sensor sensing surface that is illuminated by an illumination light beam. The system includes a fingerprint sensor control circuit that receives the outputs from the optical detectors in the optical fingerprint sensor, and a digital fingerprint processing processor which may include one or more processors for processing fingerprint patterns and determining whether an input fingerprint pattern is one for an authorized user. The fingerprint sensing system may compare a captured fingerprint to a stored fingerprint to enable or disable functionality in a device or system that is secured by the fingerprint user authentication system. For example, the fingerprint user authentication system at an ATM may determine the fingerprint of a customer requesting to access funds. Based on a comparison of the customer's fingerprint to one or more stored fingerprints, the fingerprint user authentication system may cause the ATM system to allow access to funds and may identify the customer in order to associate an appropriate account to credit or deduct the requested funds. A wide range of devices or systems may be used in connection with the disclosed optical fingerprint sensors, including mobile applications, and various wearable or portable devices (e.g., smartphones, tablet computers, wrist-worn devices), larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others. FIG. 1B illustrates an example for a smartphone or a portable device where the fingerprint user authentication system is a module integrated to the smart phone.

Fingerprint sensing is useful in mobile applications and other applications that use secure access. For example, fingerprint sensing can be used to provide secure access to a mobile device and secure financial transactions including online purchases. It is desirable to include robust and reliable fingerprint sensors features suitable for mobile devices. For example, it is desirable for fingerprint sensors in mobile devices to have a small footprint and thin to fit into the highly limited space in mobile devices; it is also desirable to include a protective cover to protect such a fingerprint sensor from various contaminants.

The optical sensing technology described in this patent document for fingerprint sensing can be implemented to provide high performance fingerprint sensing and can be packaged in compact sizes to fit into mobile and other small device packages. In capacitive fingerprint sensors, the sensing is based on measuring the capacitance between the sensing electrode and a finger surface due to their capacitive coupling. As the protective cover over the capacitive sensor pixels becomes thicker, the electrical field sensed by each capacitive sensor pixel disperses quickly in space leading to a steep reduction in the spatial resolution of the sensor. In connection with this reduction of the sensing spatial resolution, the sensor signal strength received at each sensor pixel also reduces significantly with the increase in thickness of the protective cover. Thus, when the protective cover thickness exceeds a certain threshold (e.g., 300 µm), it can become more difficult for such capacitive sensors to provide a desired high spatial resolution in sensing fingerprint patterns and to reliably resolve a sensed fingerprint pattern with an acceptable fidelity.

The disclosed technology provides optical fingerprint sensor designs in thin optical fingerprint sensor packages for easy integration into a mobile device or other compact devices. In some implementations, the optical fingerprint sensors of the disclosed technology use matched light coupling solutions to provide optical fingerprint sensing at low cost, high performance, and flexible package structures. The disclosed optical fingerprint sensors may also be configured to provide live-finger detection to improve the fingerprint sensing security. Examples of implementations of the disclosed technology can be used for a wide range of devices and systems including those with a display structure. The optical fingerprint sensor based on the disclosed technology can be integrated under the same cover of a display such as a touch sensing display device or be packaged in a discrete device that is located at various locations on the device. In addition, disclosed optical fingerprint sensor solutions may be used to provide separate fingerprint sensing when a finger is at a non-contact position and an in a contact position and the fingerprint sensing at both contact and non-contact positons can be combined to enhance the fingerprint sensing and anti-spoofing.

The performance of the optical fingerprint sensors based on the disclosed technology is not limited by the package cover thickness that may hinder capacitive fingerprint sensors. In this regard, an optical fingerprint sensor based on the disclosed technology can be implemented into a thin package by using suitable optical imaging capture configurations, including configurations that are free of imaging lenses or prisms that tend to render the optical imaging modules bulky. Implementations of optical fingerprint sensors based on the disclosed technology can be provide color matching design features to allow the colors of the optical fingerprint sensing areas to be in certain desired colors, e.g., matching colors of the surrounding structures.

In some implementations, the optical fingerprint sensors of the disclosed technology can be packaged under the platform screen cover glass without modifying the cover thickness and color. The optical fingerprint sensor can include an optical sensor array, e.g., a photo diode array, or a CMOS sensor array, and the optical sensor array can be dimensioned to a compact size due to the contribution of the compressed light path structure. Moreover, the design provides flexibility to decorate the sensor area, for example, with color light illumination.

In some implementations, in addition to the optical sensing of a fingerprint, optical sensing of a biometric indication is provided to indicate whether an input of the fingerprint pattern is from a live person. This additional optical sensing feature can be used to meet the needs for defeating various ways that may compromise the secured or authorized access to fingerprint-protected devices or systems. For example, a fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device or system. Hence, a fingerprint pattern, although a unique biometric identifier, may not be by itself a completely reliable or secure identification. The techniques, devices and systems described in this document supplement the disclosed optical sensing based fingerprint authentication technology further improve the security level by using an optical sensing technique to determine whether the input fingerprint is from a live person.

Fingerprint Sensor Circuitry and Live Finger Detection

FIG. 1B is a block diagram showing an exemplary fingerprint sensor device 23 implementing in a mobile device such as a smartphone, a tablet or a portable computing device 1 with a touch sensing display screen or touch panel 10 for both touch sensing user inputs and display images and functions of the device 1. This is specific implementation example of the general optical fingerprint sensing controlled system in FIG. 1A. The touch panel or sensing display screen 10 can be implemented based on various touch sensing display designs, including, a display screen having light emitting display pixels without using backlight where each individual pixel generates light for forming a display image on the screen such as an organic light emitting diode (OLED) display screens or electroluminescent display screens or other display screens such as LCD-based touch sensing display screens. The touch sensing display panel includes a touch sensing and displaying area for both displaying images and contents and for receiving contact inputs from a user.

A fingerprint sensor device marker 21 is shown in FIG. 1B to illustrate an exemplary position of the fingerprint sensor device 23 with respect to the mobile device 1. The fingerprint sensor device 23 includes a sensing unit or circuitry 2 that performs fingerprint scanning, live-fingerprint detection, and sensing area decorative functions. The sensing unit 2 is communicatively coupled to processing circuitry 5 that handles signal flows from the sensing unit 2 and to process the signals associated with fingerprint scanning and live-fingerprint judgment, etc.

An interface 6 bridges a signal flow between the fingerprint sensor device 23 and an application platform or a host device 7, which is the smartphone 1 in this example. Examples of the application platform 7 include the smart phone 1, a tablet computer, a laptop computer, a wearable device, and other electronic device where a secure access is desired. For example, the interface 6 can communicate with a central processor (either directly or through other components, such as a bus or an interface) of the smartphone 1 to provide sensor data from the fingerprint sensor device 23 under the fingerprint sensor device marker 21 including fingerprint image data and information indicative of whether the detected fingerprint making the contact input belongs to a live fingerprint.

In the illustrated example in FIG. 1B, the sensing unit 2 includes a fingerprint sensor 3, a live-fingerprint detector 4, and a light coupling and illumination unit 8. The fingerprint sensor 3 captures a fingerprint pattern and can be implemented using one or more optical techniques. The live-fingerprint sensor 4 can include circuitry for analyzing fingerprint image dynamics. The live finger sensor 4 can include circuitry, such as optical sensors, for sensing additional biometric markers, such as heartbeat or heart rate from the scanned fingerprint.

The live finger sensor 4 is designed to detect whether a fingerprint is from a finger of a live person and this live finger detection or judgment is based on the fact that a finger of a live person may exhibit certain motions or physical traits that are typically associated with a live person, e.g., a pulsing signal due to blood flows through the user's vessels. For example, blood cells manifest different optical absorption spectral signatures at visible wavelengths (e.g., a higher optical absorption) and near IR wavelengths (e.g., a lower optical absorption than that is a visible wavelength). Such different optical absorption signatures by blood can be optically captured by the liver finger sensor 4. Other signatures of blood flows may be reflected by pressure variations in blood vessels. In some implementations, the live finger sensor 4 can include a pressure sensor, an optical sensor, or other sensors that can detect the moving, stretching, or pulsing of a live finger. For example, an optical sensor can include a light source, such as a light emitting diode (LED) or a laser diode (LD) to emit light and a light detector, such as a photodiode to detect scattered light scattered from the finger responsive to the emitted light. When the light propagates through the finger tissues or the blood cells, the light is partially absorbed and partially scattered. The live finger movement or the blood flow causes a change in the light absorption cross-section. The photodiode detects this kind of change and the detected signal can be used to indicate whether a fingerprint that is being presented to the device is from a live person.

The light coupling and illumination unit 8 creates a probe light beam at the fingerprint sensing surface which generates a reflected probe light beam into an optical sensor array (e.g., a photo diode array or CMOS sensor array) of the sensing unit. The fingerprint signals are generated when the probe light beam meets with the finger skin that touches the sensing surface. The fingerprint sensor 3 acquires the fingerprint signals by detecting the reflection differences of the probing light beam at the sensing surface across a fingerprint pattern where locations of the skin of fingerprint ridges in a finger in contact with the sensing surface creates a lower optical reflection than the optical reflections at locations of fingerprint valleys in the finger where the finger skin does not contact the sensing surface. The spatial distribution the above reflection differences across the touched sensing surface by the finger is carried by the reflected optical probe light beam as an optical image that is detected by the array of optical detectors in the fingerprint sensor 3.

The disclosed technology provides for two fingerprint sensor packaging techniques to implement fingerprint detection and live-finger detection. The first packaging technique is to package the fingerprint sensor under the screen cover glass of the platform, such as a smartphone. The second packaging technique is to package the fingerprint sensor as a separate fingerprint sensing button.

Fingerprint Sensor Packaged Under the Screen Cover Glass

Figure 2:
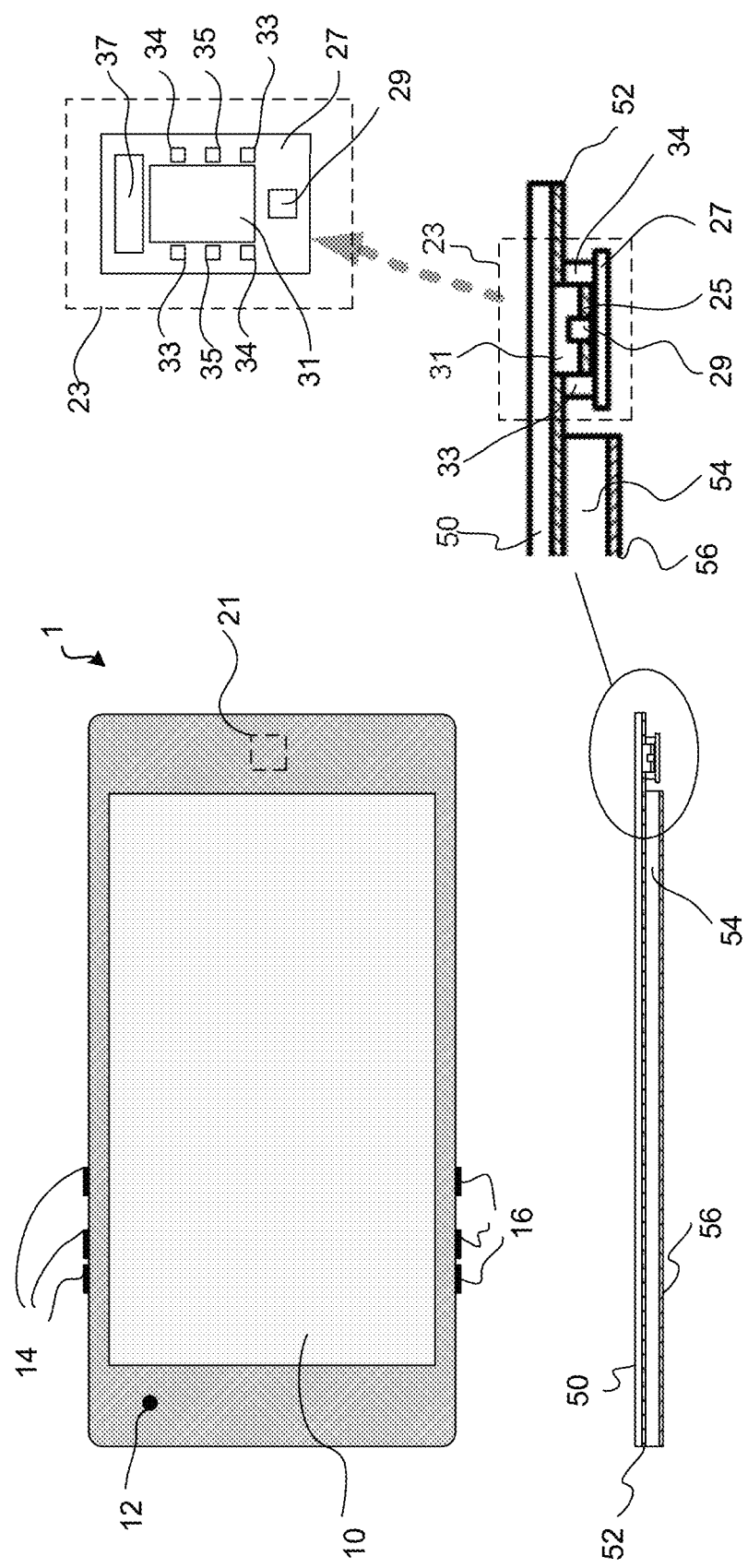
FIG. 2 is a diagram showing an exemplary optical fingerprint sensor packaged under a screen cover glass of a platform, such as a smart phone.

FIG. 2 is a diagram showing an exemplary optical fingerprint sensor packaged under a screen cover glass of a platform, which can be a communication or computing device such as a smartphone, a tablet or a portable electronic device. FIG. 3 further illustrates an exemplary fingerprint sensing light paths of the device in FIG. 2.

In FIG. 2, the exemplary optical fingerprint sensor 23 is packaged under a top transparent layer 50 which may be a screen cover glass, such as an enhanced cover glass of a platform 1. The location of the optical fingerprint sensor 23 is shown by a fingerprint sensor mark 21 in the top-down view in the upper right-hand side of the device surface having a device display 10 (typically, a touch panel assembly) shown in FIG. 2. The illustrated device surface of the smartphone platform 1 includes the touch panel assembly 10, other sensors 12, such as a camera, and physical buttons 14 and 16 on one or more sides for performing certain operations of the device. There are various structures under the cover glass 50, including, e.g., a color material layer 52, display layers 54 (e.g., OLED layers or LCD layers) as part of the display screen in the touch panel assembly 10, and bottom layers 56 of the display screen in the touch panel assembly 10. A set of touching sensing layers may also be placed to overlay the display layers 54 under the top cover glass 50 (e.g., between the display layers 54 and the top cover glass 50) to provide desired touching sensing functions. Therefore, the optical fingerprint sensor 23 is placed adjacent to and outside of the display module represented by the display layers 54 but both the optical fingerprint sensor 23 and the display layers 54 are under the common contiguous top glass cover 50.

Figure 12:
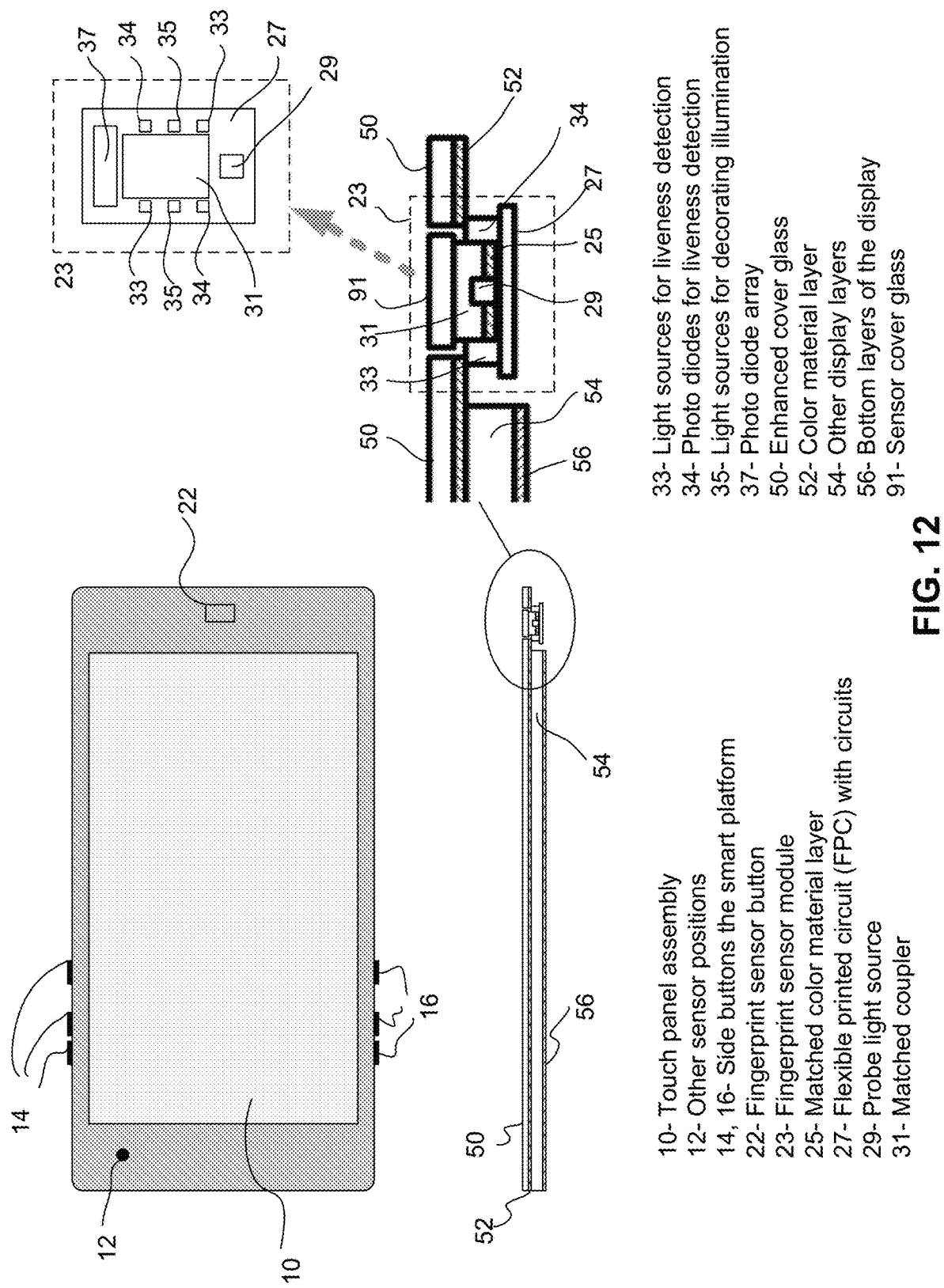
FIG. 12 is a diagram showing an exemplary optical fingerprint sensor packaged as a separate button.

In the example of the optical fingerprint sensor design in FIG. 2, the packaging design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. Under the illustrated design in FIG. 2 and FIG. 1B, the fingerprint sensor 23 formed in the area underneath fingerprint sensor device marker 21 for optical fingerprint is located under the top cover glass or layer 50 so that the top surface of the cover glass or layer 50 serves as the top surface of the device as a contiguous and uniform glass surface across both the display screen of the touch display assembly 10 and the optical detector sensor module 23. In the examples shown in FIGS. 1-6, the optical sensor module is located on one side of the transparent substrate 50 as a glass cover that is contiguous without any opening at or near the optical sensor module. This design is different various smartphones with a fingerprint sensor and provides unique features and benefits. This design for integrating optical fingerprint sensing and the touch sensitive display screen under a common and uniform surface provides benefits, including improved device integration, enhanced device packaging, enhanced device resistance to failure and wear and tear, and enhanced user experience. In some implementations of the optical sensing of fingerprints and other sensing operations, such as the design example in FIG. 12, the optical sensor module may be packaged in a discrete device configuration in which the optical sensor module is embodied a distinct structure that has a structural border or demarcation with the display screen or the top cover glass 50, e.g., a button-like fingerprint sensor structure in an opening of the top glass cover in some mobile phone designs to provide a capacitive fingerprint sensor button or areas. The design in FIG. 12 is based on all optical sensing or a hybrid sensing with both capacitive sensing and optical sensing and thus is different from other button-like fingerprint sensor structures based on capacitive sensing.

The optical fingerprint sensor 23 disposed under the cover glass 50 can include an optical coupler 31 that is made of an optical transparent material with a refractive index nc (greater than 1) and is disposed over a matched color material layer 25, and a probe light source 29 that emits probe light to illuminate a finger placed over the cover glass 50 for optical fingerprint sensing by the optical fingerprint sensor 23. The matched coupler 31, the matched color material layer 25, and the probe light source 29 are disposed over a circuit 27, such as a flexible printed circuit (FPC) with desired circuit elements. Also disposed on the FPC 27 are one or more light sources 33 that produce probe light for liveness detection as further illustrated in the examples associated with FIGS. 7-9, optical detectors 34 such as photo diodes for detecting probe light from the light sources 33 after interacting with the finger to provide liveness detection, light sources 35 for decorating illumination, and an optical detector array 37 of optical detectors such as a photodiode array for capturing the fingerprint pattern or information.

As shown in FIGS. 2 and 3, in some implementations, two optional color material layers 25 and 52 can be provided and designed to be color matched to each other and used to visually conceal or camouflage optical fingerprint sensor 23 disposed under the cover glass 50. The color material layer 25 is placed underneath the optical fingerprint sensor 23 (e.g., on the lower surface of the transparent coupler 31) and the color material layer 52 is placed under the cover glass 50 and above the optical fingerprint sensor 23 to cover the area that is not covered by the color material layer 25 so that the two color-matched material layers 25 and 52 collectively form a more or less uniform appearance when viewed from the above the cover glass 50. In the examples in FIGS. 2 and 3, the top color matched material layer 52 has an opening that defines an optical sensing area on the fingerprint sensing surface 45 on the top of the cover glass 50 to allow for the probe light from the light source 29 to illuminate a finger placed over the cover glass 50 for optical fingerprint sensing, and to allow light from the finger to be collected by the optical fingerprint sensor 23.

FIG. 3 includes FIG. 3A showing an example of the optical fingerprint sensor 23 and FIG. 3B illustrating optical fingerprint sensing based on reflected probe light for capturing a spatial variation in optical reflection at valleys and ridges on the exterior of a finger.

As shown in FIG. 3A, the light coupler 31 is fixed onto the cover glass 50 and an underlying spacer material 39 placed between the light coupler 31 and the lower surface of the cover glass 50 to provide two different light coupling functions. First, the light coupler 31 couples the probe light from the light source 29 towards the top of the top cover glass 50 to illuminate a finger placed over the cover glass 50 for optical fingerprint sensing, and, second, the light coupler 31 couples the probe light and other light coming from the finger and the cover glass 50 to pass through the light coupler 31 along a different optical path as the beam A'B' to reach the optical detector array 37 for optical fingerprint sensing. In the specific design shown in FIG. 3A, the coupler 31 is made from a solid transparent material with two angled flat facets, one to receive light from the probe light source 29 and another one to interface with the optical detector array 37 to direct returned light from the top sensing surface 45 to the optical detector array 37. The probe light source 29 is fixed at a proper position so that the probe light beam or a portion of the probe light beam may be projected into the coupler 31 at desired angles. In implementations, the coupler 31, the spacer material 39, and the cover glass 50 can each be made of multiple layers. The optical detector array 37 is fixed at a proper position to receive the reflected probe light beam as part of the received beam A'B' for capturing the optical image of the fingerprint pattern carried by the reflected probe light beam.

Probe light source 29 projects probe light beam AB into coupler 31 which further directs the probe light beam AB through the opening of the optional color material layer 52 onto the fingerprint sensing surface 45 on the top of the cover glass 50 to illuminate the finger in contact. The light beam AB is coupled into cover glass 50 with the help of the spacer material 39 placed underneath the cover glass 50. When nothing is placed on the top sensing surface 45 of the cover glass 50, a portion or all of the probe light beam power is reflected into the spacer 39, and this reflected light enters into coupler 31 and forms the reflected probe light beam as part of the received beam A'B' at the optical detector array 37. The reflected probe light beam as part of the received beam A'B' is received by the matched optical sensor array 37 (e.g., a photo diode array) which converts the optical image carried by the reflected probe light beam A'B' into an array of detector signals for further processing.

When a finger 43 touches the sensing surface 45 of the cover glass 50, the fingerprint ridges 73 change the local surface reflectance in the contact area as shown by FIG. 3B. A portion 61 of the probe light incident on each finger ridge 73 is refracted as light 65 that is scattered in the finger 43, the rest is reflected as light 67 by the finger ridge 73. The fingerprint valleys are separate from the sensing surface 45 and generally do not significantly change the local surface reflection at the sensing surface 45. The incident light 63 that is incident on the fingerprint valleys is reflected as light 69 by the sensing surface 45. The reflected probe light beam which is part of the received light beam A'B' carries the fingerprint signals. Similarly, when something other than a finger skin touches the sensing surface 45 of the cover glass 50, the reflected probe light beam as part of the received light beam A'B' carries the touching material information, which is different from a live fingerprint.

In the example of the optical sensor in FIGS. 2 and 3, the materials of the coupler 31, spacer 39, and cover glass 50 may be of a proper level of optical transparency so that the probe light beam can transmit in and through the materials to reach the top sensing surface 45 and, once returned back from the top sensing surface 45, can transmit to the optical detector array 37. The propagation directions of the probe light beam to and from the top sensing surface 45 are affected by the refractive index nc of the coupler 31, the refractive index ns of the spacer material 39, the refractive index nd of the cover glass 50, and the refractive index nf of the touching material such as a person's finger.

The desired probe light beam angles may be realized by the proper design of the light source 29 and the end surface tilting angle of the coupler 31. The divergent angle of the probe light beam is controlled by the structures of the light source 29 and the shape of the coupler 31's end surface.

To obtain a clear fingerprint image without an optical lens, the emitting area of the light source 29 may be designed to be small to effectuate a point light source in some implementations, or the probe light beam may be collimated in other implementations. A small LED light source can be installed as the light source 29 and is located far away from the coupler 31 as practical to achieve this in the optical system shown in FIG. 3.

The optical structures and configurations of the light source 29, the coupler 31, the spacer material 39, the cover glass 50, and the placement of the optical detector array 37 in the optical sensor module, including matching proper refractive indexes (nc, ns, nd, nf) of the materials in the optical fingerprint sensor and initiating the probe light beam incident angles, can be used to cause the probe light beam to be totally reflected or partially reflected at the sensing surface 45. For example, such an optical sensor can be designed so that the probe light beam is totally reflected when the touch material is water having a refractive index of about 1.33 at 589 nm, and partially reflected when the touch material is finger skin having a refractive index of about 1.44 at 589 nm. Such and other designs can cause a variation in the optical reflection spatial profile at the ridges and valleys of a finger in contact with the top sensing surface 45 to obtain a spatial pattern in the reflected probe light representing the fingerprint pattern on the outer skin of a finger.

In the example in FIG. 3, the probe beam AB size can be H at the incident end facet of the coupler 31 for receiving the probe light. The probe beam size may be W at the sensing surface 45 once being redirected by the coupler 31 upward to illuminate the sensing surface 45. By matching the refractive indexes of all of the materials and the shape of the coupler 31 and spacer 39, the illuminated dimension W on the sensing surface 45 may be set to be greater than H. Under this condition, the reflected probe beam in the received probe light beam A'B' may have a beam size smaller than the probe light beam at the sensing surface 45 caused by a compression due to the refraction of the reflected probe beam from the top sensing surface 45, to the coupler 31 and to the optical detector array 37. The compression ratio is typically decided by refractive indexes nc and nd. This is an effective method to image a large area with a small detector array without using an imaging lens. In addition, by adjusting the probe light beam divergent angle and the photo diode array tilting angle, the compression ratio can be further adjusted at all dimensions. The reflection from the coupler-spacer interface and from the spacer-cover interface constitutes optical noise and can be removed in the processing of the outputs of the optical detectors in the optical sensor array 37.

In some implementations, the probe light source 29 may be modulated to allow for an improved optical detection by the optical fingerprint sensor 23, e.g., implementing a lock-in detection based on the modulation frequency for modulating the probe light source 29. The matched photo diode array 37 can be designed to have a high efficiency and to work in various optical illumination environments.

Fingerprint Sensing Via Air or Vacuum Coupler

Figure 4:
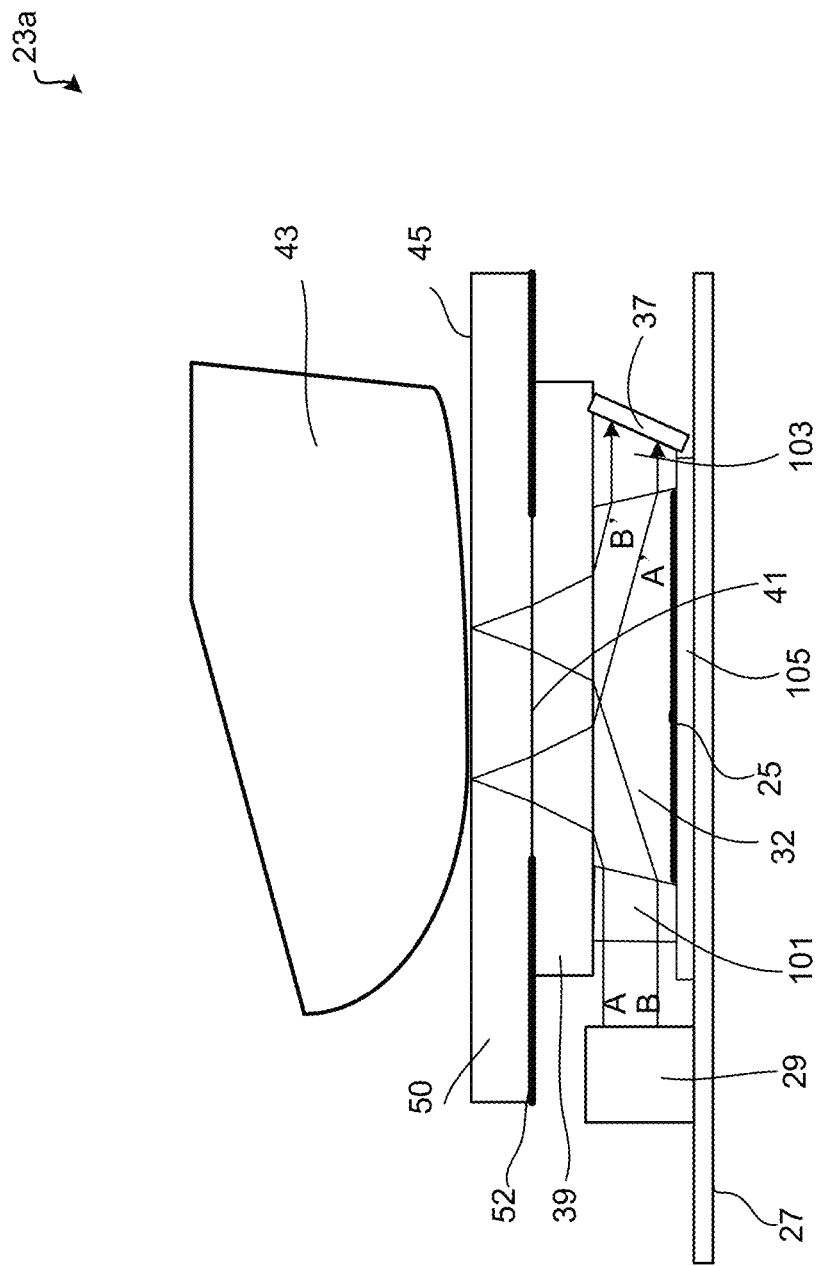
FIG. 4 is a diagram of an exemplary optical fingerprint sensor with an air or vacuum coupler.

FIG. 4 is a diagram of an exemplary optical fingerprint sensor 23a with an air or vacuum coupler. The optical fingerprint sensor 23a of FIG. 4 is similar to the optical fingerprint sensor 23 shown in FIGS. 2 and 3 in certain aspects. In the optical fingerprint sensor 23a, a coupler 32 made of air or vacuum (with an index of 1) is implemented rather than the coupler 31 of FIGS. 2 and 3 with a transparent material with an index greater than 1. Also, a light path window may be implemented to direct the probe light to the finger 43.

The probe light source 29 and a matched prism 101 are provided under the top transparent glass 50 and are structured to cooperate to couple the probe light beam AB generated by the probe light source 29 towards the sensing surface 45 on the top of the top transparent glass 50. The prism 101 is placed between the probe light source 29 and the air or vacuum coupler 32 and is structured to have a first facet to receive and redirect the initially horizontal probe light beam AB by optical refraction at a second opposing angled facet to propagate upward through the air or vacuum coupler 32 towards the sensing surface 45. An optically transmissive spacer material 39 may be placed underneath the top transparent glass 45 to facilitate the optical sensing operation by the optical detector array 37 and, in some implementations, include anti-reflection coatings to reduce undesired optical reflection in the optical paths in connection with the optical sensing at the optical detector array 37. On the other side of the air or vacuum coupler 32 in the optical path leading to the optical detector array 37, a second prism 103 with an angled facet is provided to receive returned light from the sensing surface 45 and to direct the received light, including the reflected probe light beam A'B', towards the optical detector array 37 through a second facet of the prism 103. The optical detector array 37 (e.g., a photo diode array) produces an array of detector output signals for optical sensing. Different from FIG. 2 or 3 where the optical coupler 31 formed of a solid transparent material includes a lower surface to hold the color matched material layer 25 below the optical fingerprint sensor module 23, the color matched color layer 25 in the optical fingerprint sensor 23a in FIG. 4 is formed on (e.g., painted on) a substrate 105 located on the lower side of the air or vacuum coupler 32 above the FPC 27. This substrate 105 in the illustrated example in FIG. 4 also provides support for the two prisms 101 and 103.

In the optical fingerprint sensor 23a in FIG. 4, the optical configuration of the cover glass 50 for receiving the probe light is configured so that the total internal reflection does not happen in the cover glass 50. Due to differences of the optical interfacing conditions of the cover glass 50 with respect to fingerprint ridge positons and fingerprint valley positions, when a finger 43 touches the sensing surface 45, the reflectance at the fingerprint ridge positions differs from the reflectance at the fingerprint valley positions. This difference varies spatially and represents a 2-dimensional pattern of ridges and valleys of on the external surface of the finger with different fingerprint signals at different locations that are carried by the reflected probe beam A'B'.

Because the air or vacuum coupler 32 can be implemented at a relatively low cost and can be easily made of a range of different sizes by placing the two prisms 103 and 105 at desired spacings from each other, this design can be used to construct optical touch panels with a range of different display sizes without substantially increasing the costs.

Fingerprint Sensing—A Sample Design

Figure 5:
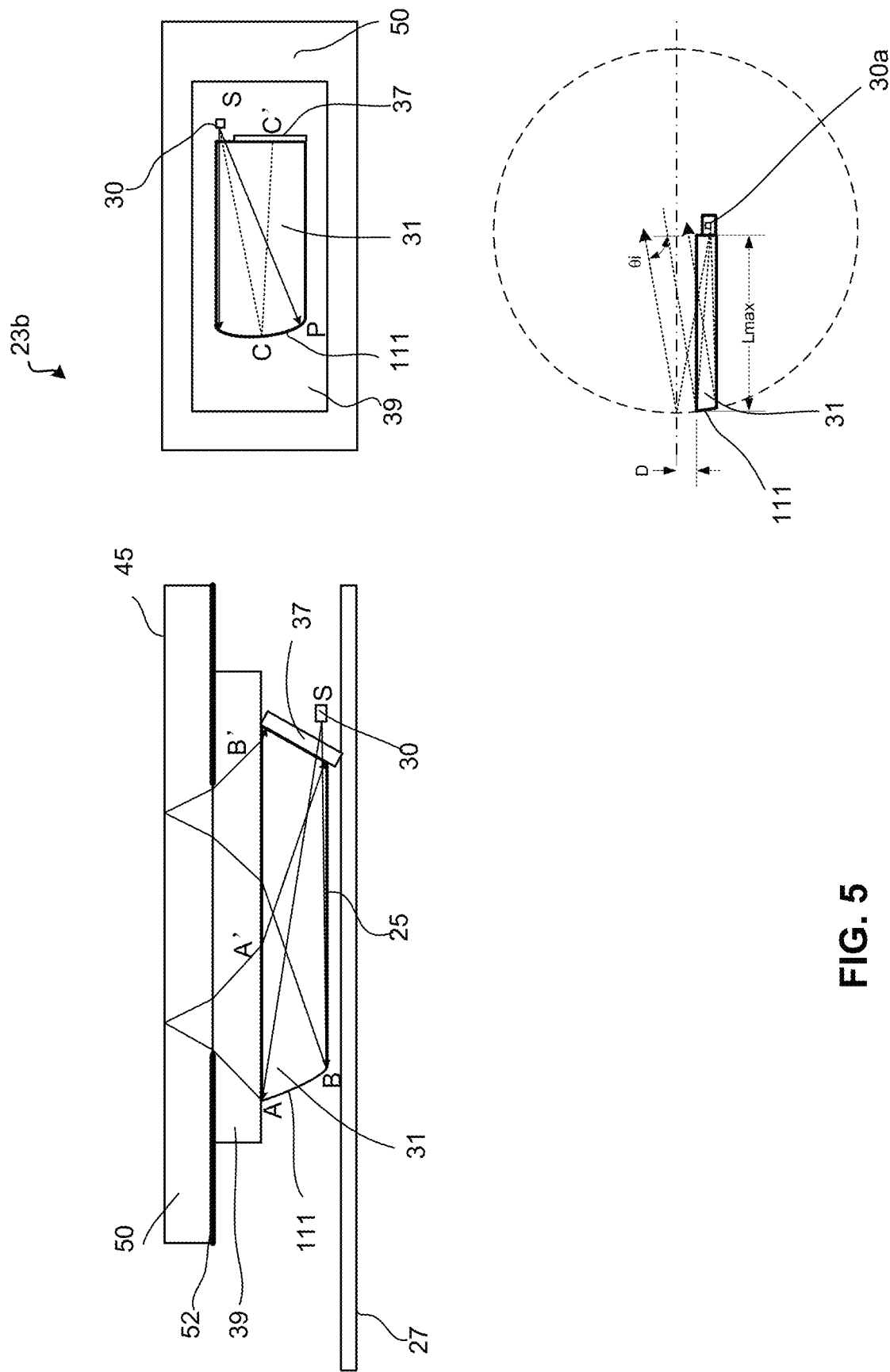
FIG. 5 is a block diagram showing an exemplary optical fingerprint sensor for fingerprint sensing.

FIG. 5 includes FIGS. 5A, 5B and 5C and shows an exemplary optical fingerprint sensor 23b for fingerprint sensing. FIG. 5A shows the sectional view of different layers of the optical fingerprint sensor 23b, FIG. 5B shows a top view of the same optical fingerprint sensor 23b, and FIG. 5C shows The specific design of the optical coupler 31b in the optical fingerprint sensor 23b shown in FIG. 5 is a different design from the optical coupler 31b for the optical fingerprint sensor 23 of FIGS. 2 and 3. Specifically, one surface 111 of the coupler 31b on the left side as shown in FIG. 5A has a curved (spherical or aspheric surface) mirror shape for imaging. A probe light source 30 is placed at the focus point of the curved mirror surface 111 of the coupler 31b so that the light rays reflected by the curved mirror surface 111 are parallel rays or the reflected probe beam is a collimated beam that propagates towards the top sensing surface 45 for illuminating a finger. In some implementations, a pinhole can be used on the probe light source 30 to spatially confine the probe light so that a modified light source 30a only projects a portion of the light beam to the curved mirror surface 111, and the influence of the scattered light is reduced or eliminated. The coupler 31b is set to be off center with proper distance D when the curved surface 111 is fabricated. Therefore, the curved mirror surface 111 of the coupler 31b is tilted properly so that the collimated light beam from the curved mirror surface 111 is incident into the spacer material 39 and the cover glass 50 with desired angles. For example, divergent light beam ASB is collimated and projected to the sensing surface 45. The reflected probe light beam A'B' is detected by the photo diode array 37. correspondingly, the central light SC is reflected back to the optical detector array 37 (e.g., a photo diode array) at or near a center C'.

In the example shown in FIG. 5, the light beams are propagated mostly in the coupler 31b. The structure can be made compact and robust. In the example shown in FIG. 5, the material of the coupler 31b can be of a single material, or multiple material compounds.

The optical fingerprint sensor of the disclosed technology can be implemented to provide one or more of the following features. The optical fingerprint sensor includes a light source, a coupler, a spacer, a photo diode array, and a cover glass. The spacer may be made to include a glass material, an adhesive material, or may be formed by an air gap or vacuum layer. The coupler may be made to include a glass material, an adhesive material, or a layer of air or vacuum. The cover glass for the optical sensor may be configured as part of the display cover glass in some designs, or may be a separate cover glass in other designs. Each of the coupler, spacer, and cover glass may include multiple layers in various implementations.

The disclosed technology provides flexibilities in controlling the signal contrast in the optical sensing at the optical detector array 37 by matching the shapes of the materials and refractive indexes of the materials. By matching the probe light beam incident angle, divergent angle, and the materials of the involved coupler, spacer and cover glass along the optical path of the illumination probe light, the probe light beam may be controlled to be totally reflected or partially reflected at the sensing surface for different touching materials.

The disclosed optical fingerprint sensor may be configured to operate to effectuate a water-free effect when interfacing with a finger for optical fingerprint sensing. For example, a smartphone cover glass in various smartphones may have a refractive index of about 1.50. One design is to use a low refractive index material (MgF2, CaF2, Polymer etc.) to form the coupler 31 or 31b in the above design examples. For example, the disclosed technology can be used to control the local probe light beam incident angle at the sensing surface 45 of the cover glass 50 to be about 68.5 □. The total reflection angle is about 62.46 □ when water is present on or in contact with the sensing surface 45 of the optical fingerprint sensor, and the total reflection angle is about 73.74 □ when the ridges of a fingerprint touch the sensing surface 45. The total reflection angle is about 41.81 □ when nothing touches the sensing surface 45. In this design, at the water soaking area on the top sensing surface 45, the probe light is totally reflected towards the photo diode array 37 at locations where the fingerprint ridges touch the top sensing surface 45 so that less than 5% of the probe light is reflected to the photo diode array 37; and at the dry fingerprint valleys positions, the probe light beam is also totally reflected to the photo diode array 37. Under this design, the optical reflection varies from the ridges to valleys of the finger and reflection caused by the fingerprint ridges generates stronger optical signals that are detected to create a high contrast optical image of the fingerprint pattern at the photo diode array 37.

Human sweat has a refractive index that is lower than the finger's skin. Therefore, based on the differences in optical reflection in the above design, the disclosed technology provides a solution to distinguishing the sweat pores in the fingerprint. When an air gap is used to form the coupler such as the example shown in FIG. 4, the total reflection at the sensing surface does not occur. The reflectance difference among different touching materials (the fingerprint ridges, fingerprint valleys, and other contaminations) can be used to detect the fingerprint image.

Due to the light path compression effect in the above optical designs in FIGS. 2 through 5, the sensing area size at the sensing surface 45 on the cover glass 50 may be greater than the photo diode array size of the photo diode array 37. The light path compression effect can be utilized to design the coupler 31 or 31b to be very thin, thus reducing the overall thickness of the optical sensing module. For example, less than 1 mm thickness CaF2 coupler can be used to realize a 10 mm sensing area size on the top sensing surface where the image compression ratio can be set around 1:10 by designing the various components in the optical sensing module. This feature can be used to reduce the sensor thickness and the sensor cost. In the examples in FIGS. 2 through 5, the photo diode array 37 is installed on one end of the coupler 31 or 31b instead of under the coupler. This design leaves the flexibility to apply color paint, illumination light etc. to compensate the color or decorate the sensor area.

In implementations, the light source for optical sensing may be a point light source installed at a proper distance. In some implementations, the probe light beam may be collimated by spherical lenses, cylinder lenses, or aspheric lenses. In some implementations the light source be placed a distance to be sufficiently far away from the sensing area 45. The probe light beam may be of a proper divergent angle in some designs. The probe light beam may be divergent or convergent in various designs.

In some implementations, the probe light source may be modulated to improve the optical sensing by reducing the influence of the background light which is not modulated and thus can be distinguished from the modulated probe light via a phase sensitive detection similar to detection based on a lock-in amplifier. The photo diode array is designed to work well in any illumination environments. Under the above optical design, the cover glass thickness does not limit the optical fingerprint sensing. The principle can be used to build optical touch panel.

Live-Fingerprint Detection

Figure 6:
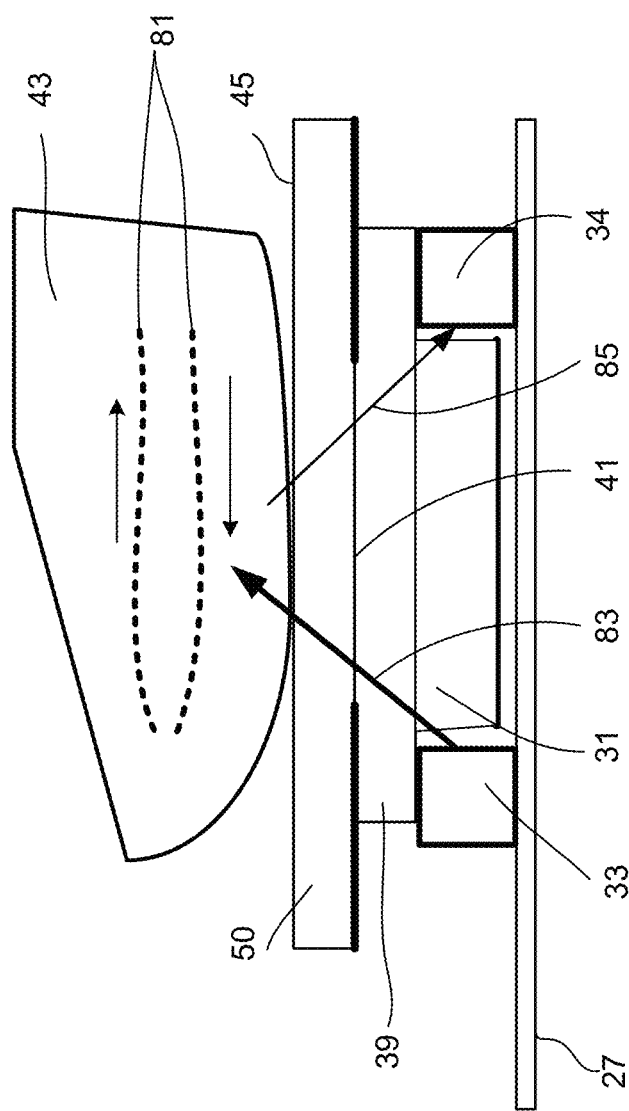
FIG. 6 is a diagram illustrating exemplary live-fingerprint detection.

FIG. 6 shows an exemplary live-fingerprint detection design in an optical sensing module. The live-fingerprint detection part of the optical sensing module can be implemented by one or more designated light source 33 and one or more designated optical detectors 34 for live finger detection in the example of the optical sensing module in FIG. 2 that are separate from the light source 29 for providing illumination for optical fingerprint sensing and the optical detector array 37 for optical fingerprint sensing. FIG. 6 shows only the placement of the one or more designated light source 33 and one or more designated optical detectors 34 for live finger detection relative to the optical coupler 31 without showing other components of the optical sensing module such as the light source 29 for providing illumination for optical fingerprint sensing and the optical detector array 37 for optical fingerprint sensing.

Alternatively, in other implementations, the live-fingerprint detection can be performed by the same the light source 29 and the optical detector array 37 for fingerprint sensing without using a separate optical sensing as shown in FIG. 2. The live fingerprint detection in FIG. 6 can be performed by a finger print sensor, such as one of the optical fingerprint sensors 23 in FIG. 3, 23a in FIG. 4, or 23b in FIG. 5, in a way similar to what is now described below in the specific example in FIG. 6.

In FIG. 6, the one or more light sources 33 and the receiving photodetector (PD) array 34 are isolated by a matched optical coupler 31 so that the emitting light beams from the one or more light sources 33 cannot directly reach the photodetector (PD) 34 for sensing whether a fingerprint is from a live finger. The optical coupler 31 directs the light beams from the light sources 33 to propagate through the light path window 41 on the top cover glass 50 (which can be formed by an opening of the color material layer 52 on the bottom of the top cover glass 50) and transmit into the touching material 43, for example, a finger. For a live-fingerprint of a live-person, the blood flow 81 in the finger exhibits certain optical absorption characteristics at different probe wavelengths and also varies with the heartbeat, the pressing force against the sensor, the breathing or other parameters. Accordingly, the received probe light at the optical detector 34 would carry detectable information associated with optical absorption characteristics at different probe wavelengths, the heartbeat, the pressing force against the sensor, the breathing, micro movement of the finger, or other parameters and thus can be processed to use such information to determine whether a touched object is from a live person. When the probe light beam 83 from the light sources 33 is coupled by the optical coupler 31 to enter the material being monitored, the tissues in the material scatter a portion 85 of the probe light 83 into the receiving PD array 34. By analyzing the signals received, a sequence of signals can be obtained and analyzed for live finger detection.

The fingerprint sensor photo diode array 37 may also be used to detect the scattered light from the touching materials and thus may also be used for live-fingerprint detection. For example, the micro movement of the fingerprint can be used to indicate whether the fingerprint is from a live-finger. A sequence of fingerprint images is used to recover the signal amplitude and bright spots distribution change with time. A fake, non-live-finger manifests different dynamics from a live-finger.

Figure 7:
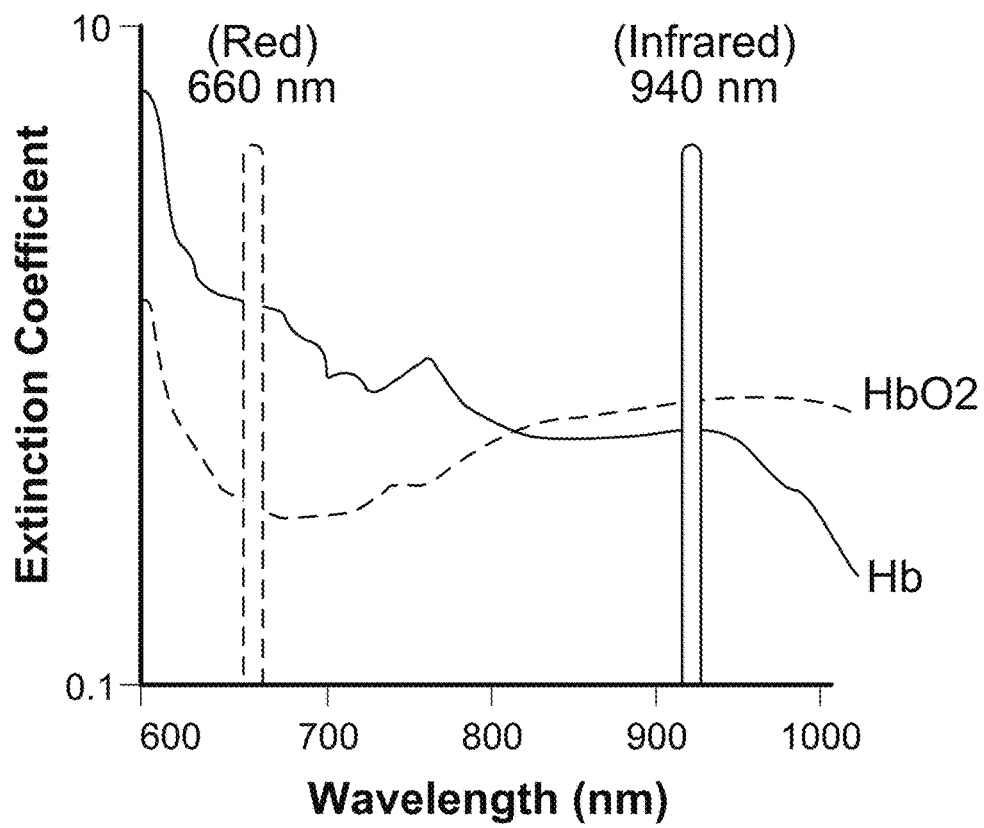
FIG. 7 shows exemplary extension coefficients of materials being monitored.

FIG. 7 shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a visible wavelength and an IR wavelength, the differences in the optical absorption can be captured determine whether the touched object is a finger from a live person.

Figure 8:
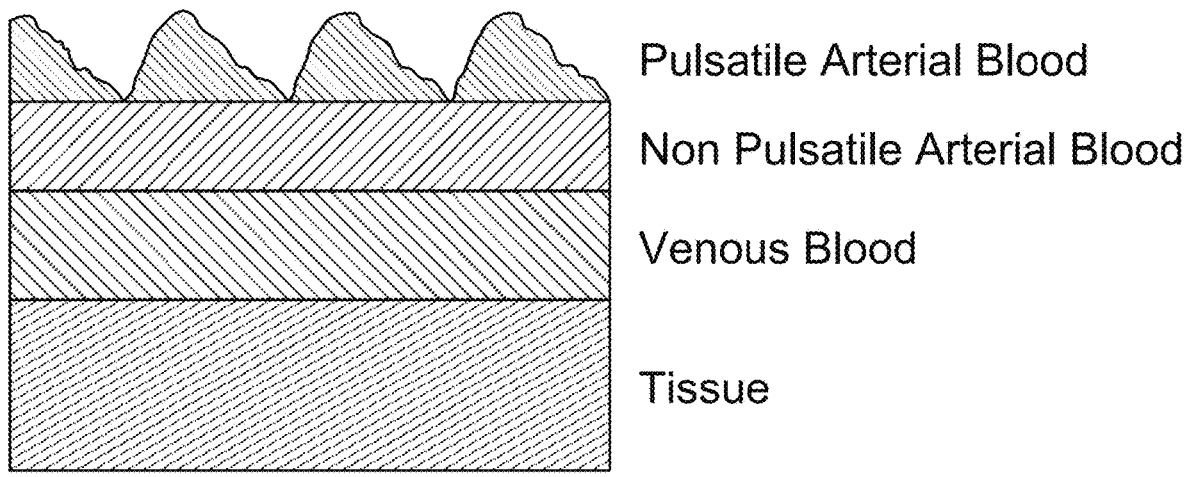
FIG. 8 shows blood flow in different parts of a tissue.

FIG. 8 shows the blood flow in different parts of a tissue. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 9:
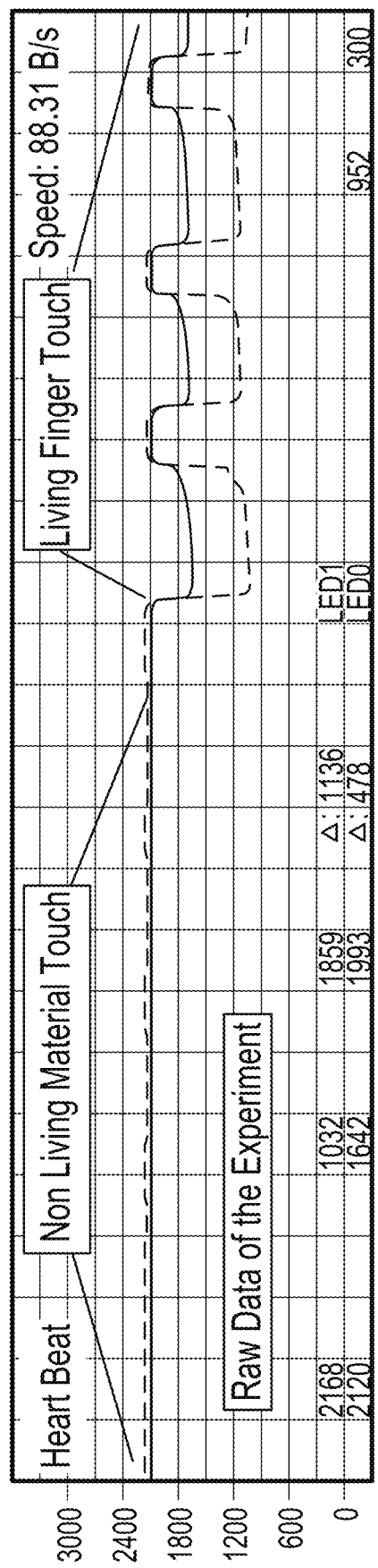
FIG. 9 shows a comparison between a nonliving material (e.g., a fake finger) and a live-finger.

FIG. 9 shows a comparison between a nonliving material (e.g., a fake finger) and a live-finger. Referring to FIG. 6, the light source 33 and the corresponding designed detector 34 in the optical fingerprint sensor can also operate as a heartbeat sensor to monitor a living organism. One or multiple light wavelengths can be provided from the light source 33. When two or more wavelengths of light are used (e.g., red light around 660 nm and IR light at 940 nm), the extinction ratio difference can be used to quickly determine whether the monitored material is a living organism, such as live fingerprint. In the example shown in FIG. 8B, two light sources are used to emit probe light at different wavelengths, one at a visible wavelength and another an IR wavelength as illustrated in FIG. 7.

When a nonliving material touches the optical fingerprint sensor, the received signal reveals strength levels that are correlated to the surface pattern of the nonliving material and the received signal does not contain signal components associated with a finger of a living person. However, when a finger of a living person touches the optical fingerprint sensor, the received signal reveals signal characteristics associated with a living person, including different strength levels because the extinction ratios are different for different wavelengths. This method does not take long time to know whether the touching material is a part of a living person. In FIG. 9, the pulse-shaped signal reflects multiple touches instead of blood pulse. Similar multiple touches with a nonliving material does not show the difference caused by a living finger.

The above optical sensing of different optical absorption behaviors of the blood at different optical wavelengths can be performed in a short period for live finger detection and can be faster than optical detection of a person's heart beat using the same optical sensor.

In LCD displays, the LCD backlighting illumination light is white light and thus contains light at both the visible and IR spectral ranges for performing the above live finger detection at the optical sensor module. The LCD color filters in the LCD display module can be used to allow the optical sensor module to obtain measurements in FIGS. 7, 8 and 9. In addition, the designated light sources for producing the illumination light for optical sensing can be operated to emit probe light at the selected visible wavelength and IR wavelength at different times and the reflected probe light at the two different wavelengths is captured by the optical detector array to determine whether touched object is a live finger based on the above operations shown in FIGS. 7, 8 and 9. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

In an implementation where the live-fingerprint detection can be implemented by a designed optical system such as the light source 33 and optical detector 34 in the example in FIG. 2 that are separate from the light source 29 and the optical detector array 37 for fingerprint sensing, the designated light source 33 is operated to emit probe light at the selected visible wavelength and IR wavelength, e.g., at different times, and the reflected probe light at the two different wavelengths is captured by the designated optical detector 34 to determine whether touched object is a live finger based on the above operations shown in FIGS. 7 and 9.

Alternatively, in an implementation, live-fingerprint detection can be performed by the same the light source 29 and the optical detector array 37 for fingerprint sensing without using a separate optical sensing components designated for live finger detection. Under this design using the light source 29 and the optical detector array 37 for both fingerprint sensing and the live-fingerprint detection, the light source 29 is operated to emit probe light at the selected visible wavelength and IR wavelength at different times and the reflected probe light at the two different wavelengths is captured by the designated optical detector 34 to determine whether touched object is a live finger based on the above operations shown in FIGS. 7 and 9. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

Security Level Set Up

Figure 10:
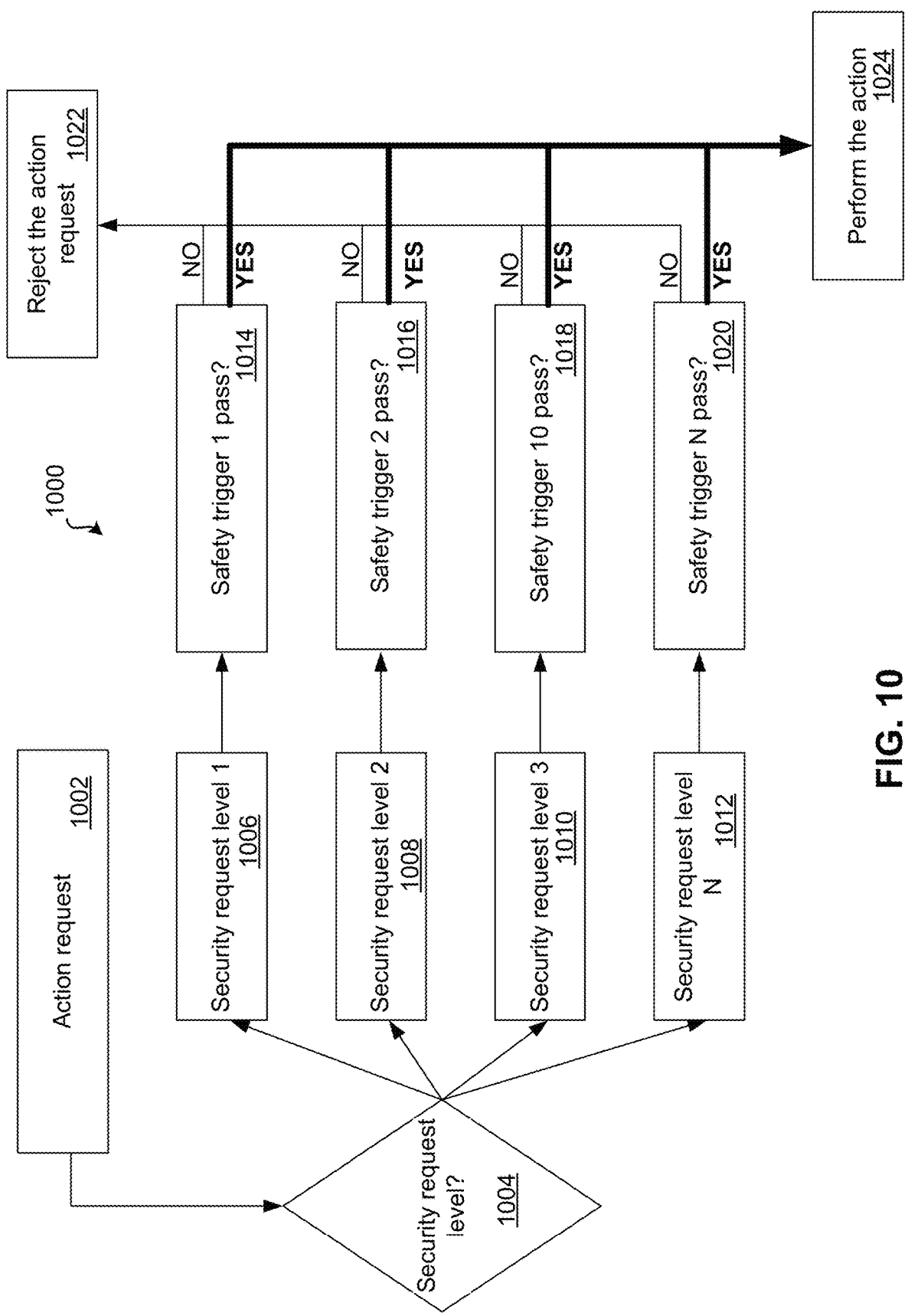
FIG. 10 shows a process flow diagram of an exemplary process 1000 for setting up different security levels for authenticating a live finger.

FIG. 10 shows a process flow diagram of an exemplary process 1000 for setting up different security levels for authenticating a live finger based on the disclosed optical sensing technology for fingerprint sensing. Different security level criterions may be set up based on the type of action requested. For example, a regular action request is required to pass security level 1 check. A request for a financial transaction for an amount below a threshold, such as under $100 payment needs to pass security level 2. A financial transaction for an amount over the threshold may require a higher security level clearance. Different security level action is triggered after different safety level evaluation. The safety levels corresponding to different security levels can be set up by combining different live-finger signatures. For example, single light source signals can be used to set up safety level 1 gate, two light source signals can be combined to set up safety level 2 gate, and so on.

The method 1000 can begin or be triggered when an action is requested (1002). The requested action is analyzed to determine an appropriate security level (1004). When determined that that security level 1 (the lowest security level) is required (1006), the safety trigger level 1 is required to be passed (1014). When the fingerprint analysis passes the safety trigger level 1, the requested action is performed (1024). However, when the fingerprint analysis fails the safety trigger level 1, the requested action is denied (1022).

Similarly, when determined that that security level 2 is required (1008), the safety trigger level 1 is required to be passed (1016). When the fingerprint analysis passes the safety trigger level 1, the requested action is performed (1024). When the fingerprint analysis fails the safety trigger level 1, the requested action is denied (1022).

When determined that that security level 3 is required (1010), the safety trigger level 1 is required to be passed (1018). If the fingerprint analysis passes the safety trigger level 1, the requested action is performed (1024). If, however, the fingerprint analysis fails the safety trigger level 1, the requested action is denied (1022).

When determined that that security level N is required (1012), the safety trigger level 1 is required to be passed (1020). If the fingerprint analysis passes the safety trigger level 1, the requested action is performed (1024). If, however, the fingerprint analysis fails the safety trigger level 1, the requested action is denied (1022).

The optical fingerprint sensor of the disclosed technology can be implemented to perform live-finger detection with various features. The optical fingerprint sensor can detect whether the touching material is a live-finger and can improve the security of the sensor. Specified light sources and detectors can be used to detect whether the object touching the sensing area is a live-finger or a nonliving material. When probe light at a single wavelength is used for illumination, the heartbeat detection or other live finger characteristics (micromovement of the finger) can be used to provide a reliable criterion to detect whether the object touching the sensing area is a live-finger or a nonliving material, including the fingerprint of a live-finger. When two or more wavelengths are used, the extinction ratio of the wavelengths are compared to detect whether the object touching the sensing area is a live-finger or a nonliving material, including the fingerprint of a live-finger. The fingerprint sensor light sources and photo diode array can be used to detect whether the object touching the sensing area is a live-finger or a nonliving material, including the fingerprint of a live-finger. The dynamic fingerprint images can be used to detect whether the object touching the sensing area is a live-finger or a nonliving material, including the fingerprint of a live-finger. Multiple security level can be set up for different security requirement tasks.

Sensor Area Decorating

Figure 11:
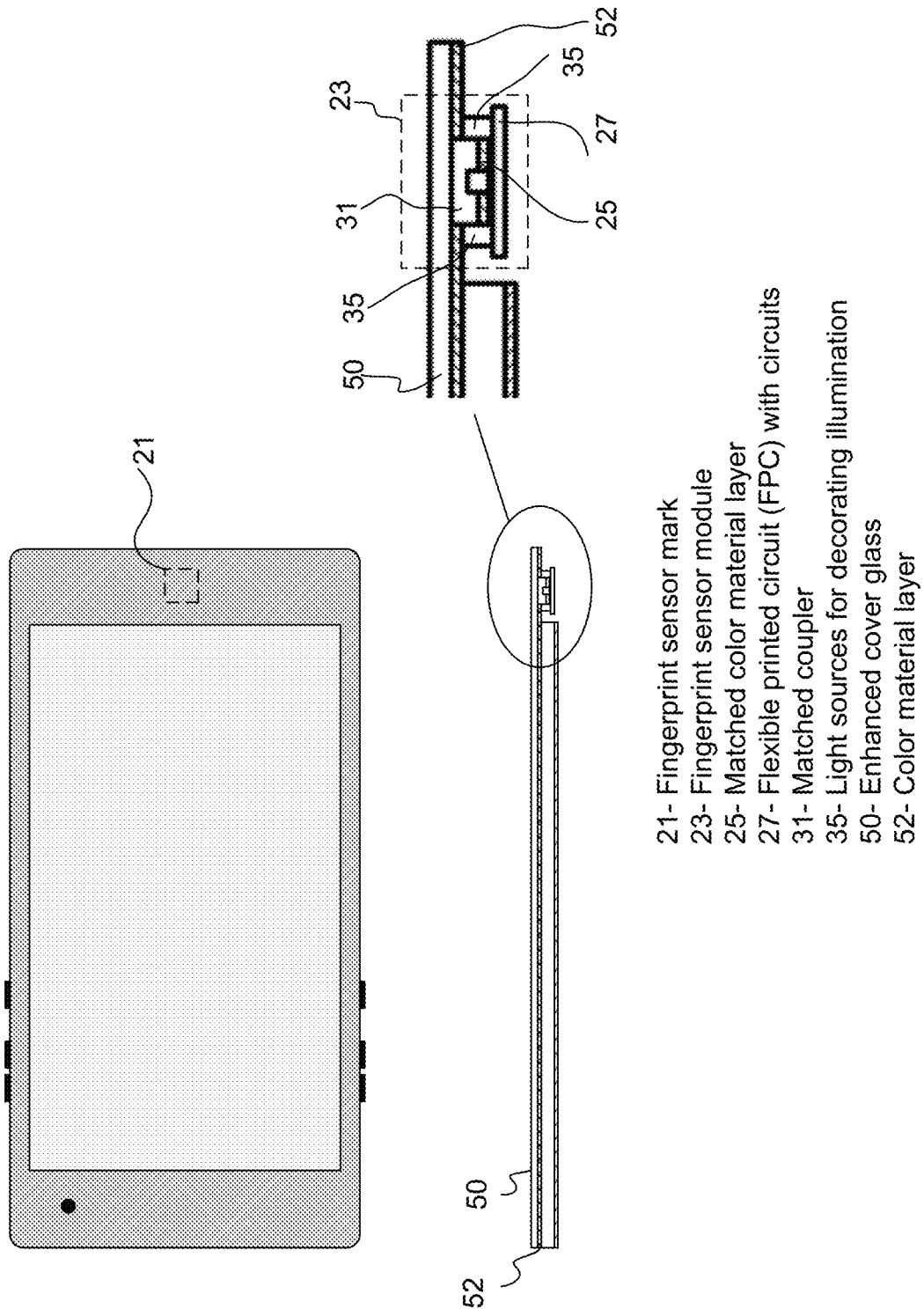
FIG. 11 is a diagram showing an exemplary optical fingerprint sensor for sensor area decorating.

FIG. 11 is a diagram showing an exemplary optical fingerprint sensor for sensor area decorating where an optical fingerprint sensor 23 is placed under the top cover glass 50 and is located adjacent to and outside the display module. When the optical fingerprint sensor 23 is installed under the cover glass 50 that is structured to include an optical window that transmits light for providing the light path for optical sensing. Specifically, a portion of the cover glass' color coating material 52 is removed to form this optical window for optical sensing. Because the fingerprint sensor detector is arranged to be at one end of the coupler 31, the bottom of the coupler 31 may be painted with color layers 25 so that the color layers 52 and 25 collectively provide a perception of a contiguous structure to a user. The painted color layers 25 can be selected to match with the platform surface color. For example, to use same color or pattern under the coupler so that the sensor becomes invisible. In some implementations, the matched coupler 31 may also be painted with a desired or different color or pattern to achieve certain or different decorative effects or styles. The matched coupler 31 may also be painted with certain patterns or signs, such as homing button sign.

The design provides an attractive option to further decorate the sensor area. For example, one or more designated decorating light sources 35 may be provided to provide a designed decorating lighting to the optical sensing area, e.g., emitting light at different colored light wavelengths to illuminate the sensor area. This decorating lighting feature can be useful in dark environments when the bell rings on the smartphone to indicate where the fingerprint sensing area is located.

The optical fingerprint sensor can be implemented to enable various decorative elements including the following: the bottom surface of the coupler can be painted with same color or pattern layers to match with the platform surface color; the bottom surface of the coupler can be painted with different color or pattern layers to show new styles outlooking; and color light sources 35 can be installed around the coupler to decorate the sensor area.

Fingerprint Sensor Packaged as a Separate Button

As an alternative implementation, the optical fingerprint sensors 23 in FIG. 3, 23a in FIG. 4, and 23b in FIG. 5 placed under a contiguous cover glass 50 can be packaged as a separate physical fingerprint sensor button with a physical demarcation with other parts of the cover glass 50.

FIG. 12 is a diagram showing an exemplary optical fingerprint sensor packaged as a separate button that is located on a front side of a mobile device where the device display panel is located. This button can function, in addition to housing the optical fingerprint sensor module, as a home button for certain operations of the device, a wake-up button for waking up the device from a power saving mode, or other operation of the device.

Figure 13:
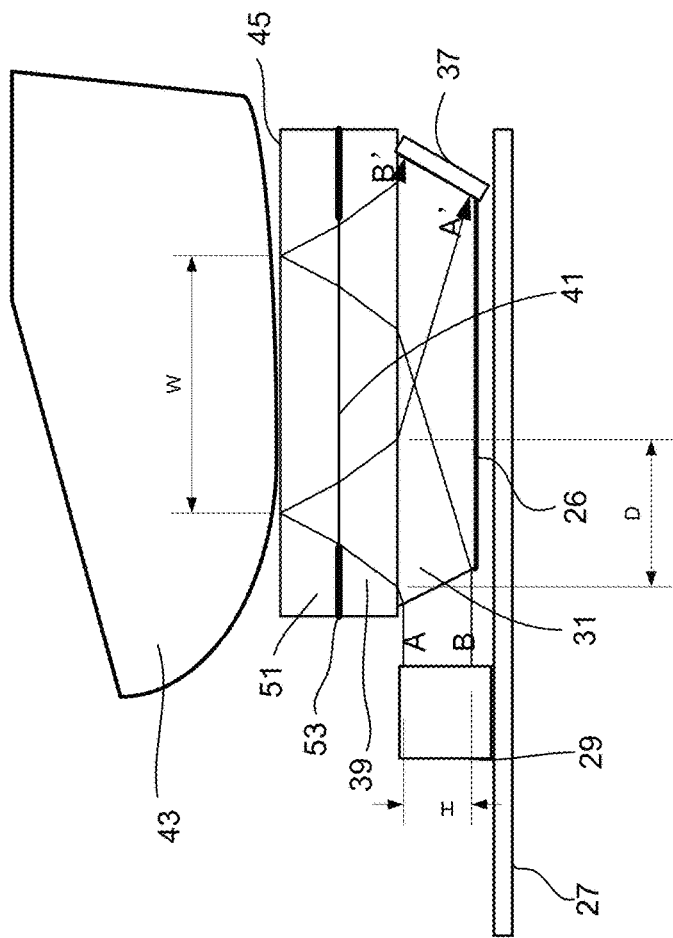
FIG. 13 is a diagram showing exemplary fingerprint and live-finger detection using the optical fingerprint sensor packaged as a separate button.

FIG. 13 is a diagram showing exemplary fingerprint and live-finger detection using the optical fingerprint sensor packaged as a separate button shown in FIG. 12. The optical fingerprint sensor of FIGS. 12 and 13 can be implemented as the optical fingerprint sensors 23 in FIG. 3, 23a in FIG. 4, and 23b in FIG. 5 but packaged as a separate button. Thus, the fingerprint sensing and live-finger detecting is also the same as or similar to those described above. A matched coupler 31 is used to set up the photo diode array 37 position and provide package flexibility to the visible area. The aforementioned features regarding the different components of the optical fingerprint sensor in FIGS. 12 and 13 may be implemented substantially the same as the optical fingerprint sensors 23 in FIG. 3, 23*a* in FIG. 4, and 23*b* in FIG. 5 including the light sources. However, to implement the optical fingerprint sensor as a separate button, the rigidity or the strength of the material for the cover glass 51 may be required at a higher level than the designs in FIGS. 3-5 under the contiguous cover glass 50.

The spacer material 39 and the cover glass 51 add a position shift of D to the probe light beam AB. When the thickness of the cover glass 51 and the spacer material 19 is reduced to zero, specifically by excluding the cover glass and spacer, the probe light beam shift D is eliminated. For example, a 10 mm sensing size can be realized with less than 1 mm thickness CaF2. Also, the photo diode array 37 should match with the light path to realize proper resolution and guarantee the performance in all illumination environments.

The optical fingerprint sensor packaged as a separate button shown in FIGS. 12 and 13 can perform the same fingerprint detection and live-finger detection as the optical fingerprint sensor of FIGS. 2-11. In addition, the optical fingerprint sensor package as a separate button can be implemented to perform the following features.

The cover glass and related spacer material may be implemented to provide design flexibility in the thickness according to the needs of various applications. In some implementations, a practical package may be designed not to use cover glass and spacer material. Another example for a practical design is to use a thin layer of cover glass to protect the coupler where the thin cover glass may be of a high hardness. To use colored glass or other optical materials to build the cover is also practical. When designing a compact button that provide the optical sensor for optical fingerprint sensing with improved security, various mechanical parts may be integrated to enhance the rigidity or strength of the module.

The optical fingerprint sensor designs disclosed in this document can be implemented in various ways (e.g., under a device cover glass alongside with the device display or in a button structure) and are a separate sensing module from the device display screen. Such optical sensor designs do not interfere with operations, engineering or installation of the device display screen and do not interfere functions and features that are associated with or integrated with the display screens such as touch sensing user interface operations and structures. As such, the disclosed optical sensor technology can be used for devices based on various display technologies or configurations, including, a display screen having light emitting display pixels without using backlight where each individual pixel generates light for forming a display image on the screen such as an organic light emitting diode (OLED) display screens including an active matrix organic light emitting diode (AMOLED) display panel, electroluminescent display screens and other displays with backlighting such as the ubiquitous liquid crystal display (LCD) screens.

Figure 14:
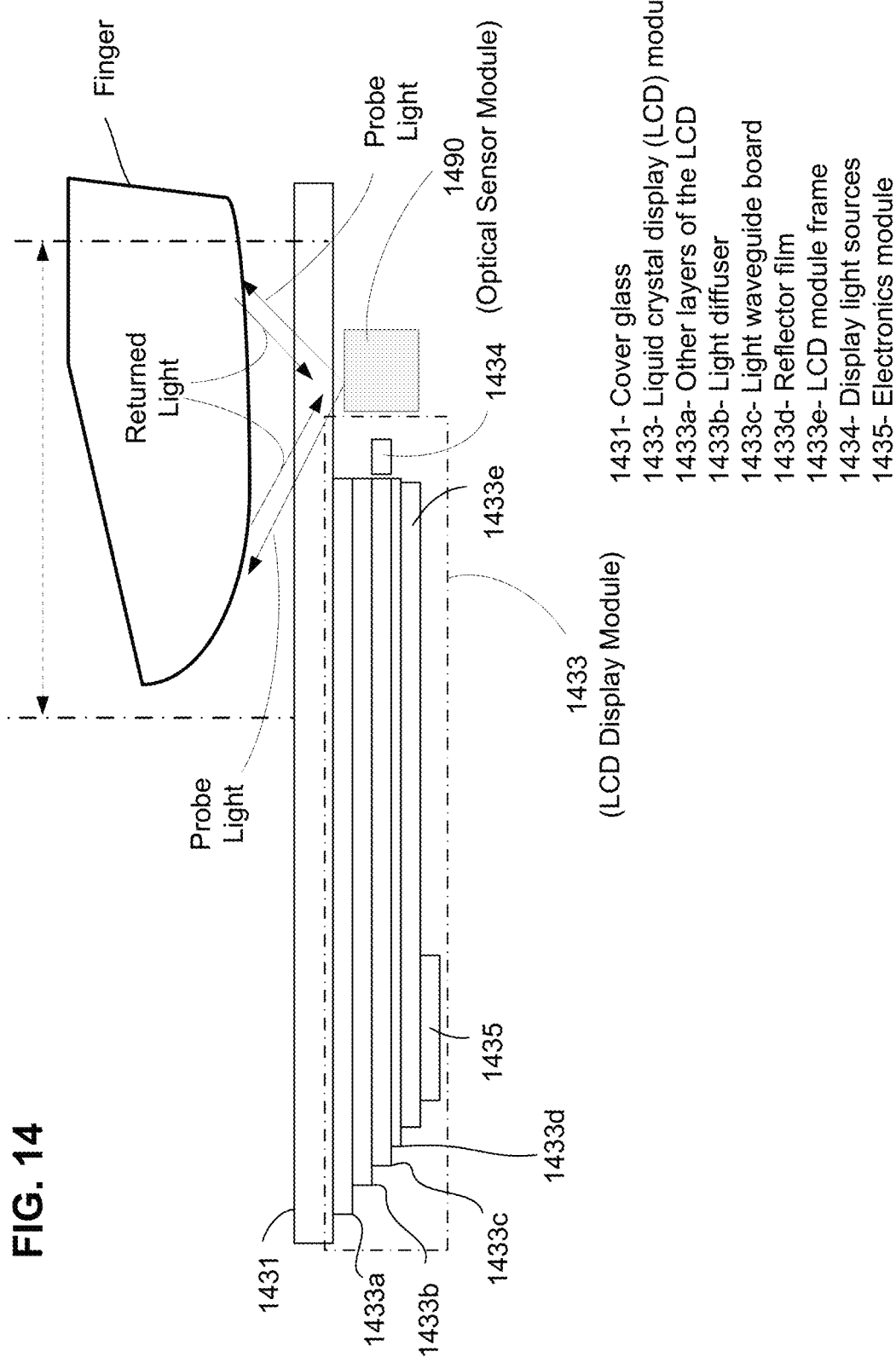
FIGS. 14 and 15 show examples of devices using LCD and OLED display modules in connection with an optical sensor module based on the disclosed technology.
Figure 15:
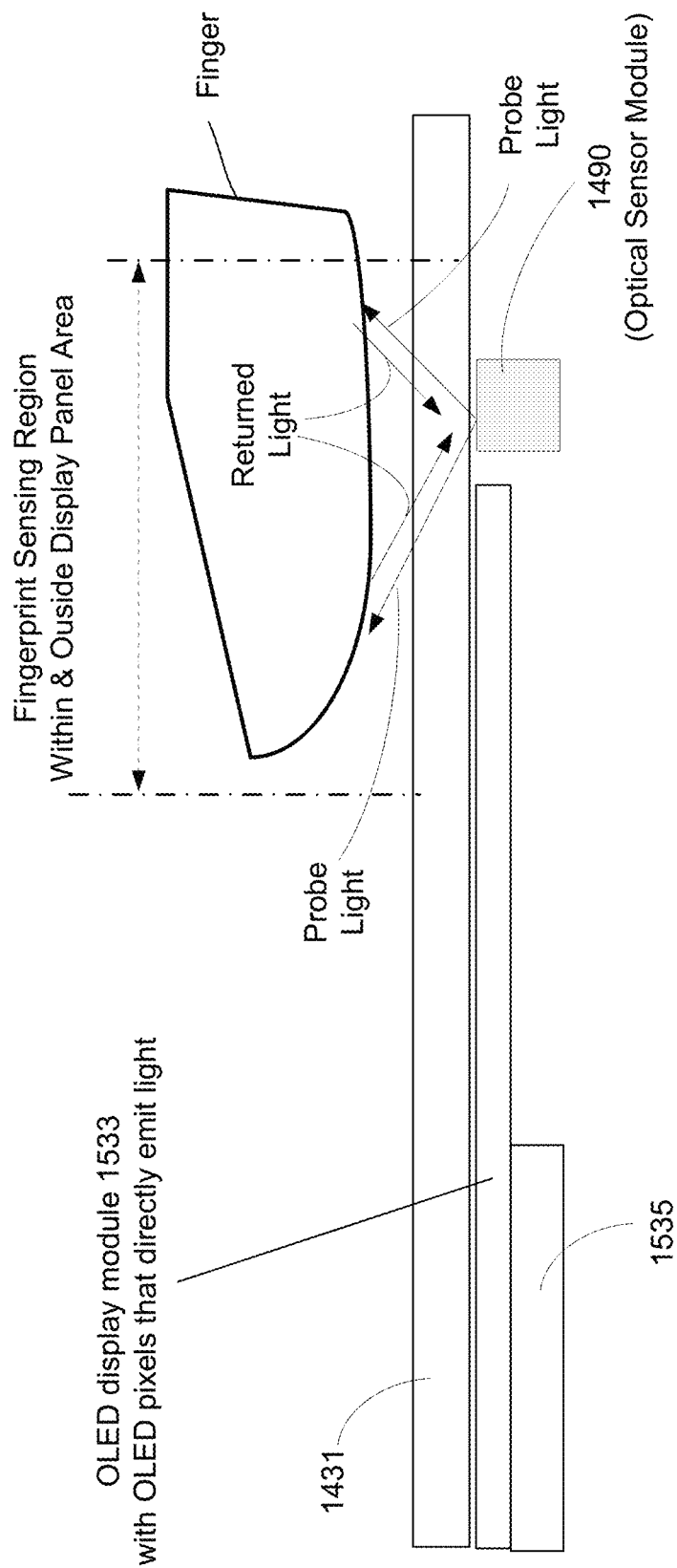

FIGS. 14 and 15 illustrate examples of LCD and OLED display screens for devices that incorporate optical sensing functions based on the disclosed technology, including optical fingerprint sensing and additional optical sensing for determining whether an object in contact is from a live person.

FIG. 14 shows an example of a structure of an LCD display panel that includes a LCD display panel structure to display images; a LCD backlighting light module coupled to the LCD screen to produce backlighting light to the LCD screen for display images; and a top transparent layer formed over the device screen as an interface for being touched by a user for the touch sensing operations and for transmitting the light from the display structure to display images to a user. The LCD) screen structure can be integrated with a touch sensing structure that provides touch sensing user interface operations in connection with operating with the device.

As a specific example, FIG. 14 illustrates a smartphone with a LCD-based touch sensing display system 1433. The touch sensing display system 1433 is placed under a top cover glass 1431 which serves a user interface surface for various user interfacing operations, including, e.g., touch sensing operations by the user, displaying images to the user, and an optical sensing interface to receive a finger for optical fingerprint sensing and other optical sensing operations. The optical sensor module 1490 for optical fingerprint sensing and other optical sensing operations can be placed in various locations of the device, e.g., at one end of the LCD display module 1433 and under the same top glass cover 1431 as shown. The display system 1423 is a multi-layer liquid crystal display (LCD) module 1433 that includes LCD display backlighting light sources 134 (e.g., LED lights) that provide the white backlighting for the LCD module 1433, a light waveguide layer 1433*c* coupled to the LCD display backlighting light sources 1434 to receive and guide the backlighting light, LCD structure layers 433*a* (including, e.g., a layer of liquid crystal (LC) cells, LCD electrodes, transparent conductive ITO layer, an optical polarizer layer, a color filter layer, and a touch sensing layer), a backlighting diffuser 1433*b* placed underneath the LCD structure layers 1433*a* and above the light waveguide layer 1433*c* to spatially spread the backlighting light for illuminating the LCD display pixels in the LCD structure layers 1433*a*, and an optical reflector film layer 1433*d* underneath the light waveguide layer 1433*c* to recycle backlighting light towards the LCD structure layers 433*a* for improved light use efficiency and the display brightness. The example illustrated in FIG. 14 includes a device electronics/circuit module 1435 for the LCD display and touch sensing operations, one or more other sensors 1425 such as an optical sensor for monitoring the light level of the surroundings, optional side buttons 1427 and 1429 for controls of certain smartphone operations.

Among various locations for the optical sensor module 1490 disclosed in this document, in some implementations, the optical sensor module 1490 may be placed next to the display as shown in FIGS. 1B, 2, 11 and alongside with the LCD display module 1433 that is either under the common top cover glass 1431 (as shown here in FIG. 14 and also in FIGS. 1B, 2 and 11) or in a separate discrete structure (FIG. 12). In such implementations, the fingerprint sensing area can include a region above the top glass cover 1431 near an edge of but within the LCD display panel of the LCD display module 1433 by designing probe light sources for the optical sensor module to capture returned probe light from a finger placed in this region in addition to capturing returned probe light from a finger that is directly on top of the optical sensor module outside the LCD display module 1433. This region can be marked to be visible to a user for placing a finger for fingerprint sensing. In some implementations, selected LCD pixels in this region can be operated to turn on to mark this region or the border of this region in the LCD display panel to allow a user to identify the region for placing a finger for fingerprint sensing. In other implementations, one or more illumination light sources may be added underneath the LCD module to produce illumination light to illuminate the border or the region on the top glass cover 1431 to be visible to the user. By providing the one or more illumination light sources, the region can be optically marked for easy identification by a user for fingerprint sensing regardless whether the LCD display is turned off or turned on. The light from LCD pixels that is present in this region within the LCD display can also be used to add illumination light to a finger in addition to the illumination by probe light that is produced by and projected from the optical sensor module. FIG. 14 marks the fingerprint sensing region that includes both the sensing region within an edge of the display panel area and the sensing region outside the display panel area.

FIG. 15 shows an example of an OLED display screen for a device that incorporates optical sensing functions based on the disclosed technology, including optical fingerprint sensing and additional optical sensing for determining whether an object in contact is from a live person. The OLED display screen is part of the OLED display module 1533 that is driven by a driver electronic module or circuit 1535. Similar to the LCD-based device example in FIG. 14, the optical sensor module 1490 is provided in FIG. 15 for optical fingerprint sensing and other optical sensing operations and can be placed in various locations of the device, e.g., at one end of the OLED display module 1533 and under the same top glass cover 1431 as shown. In some implementations, the optical sensor module 1490 may be placed next to the display as shown in FIGS. 1B, 2, 11 and alongside with the LCD display module 1433 that is either under the common top cover glass 1431 (as shown here in FIG. 14 and also in FIGS. 1B, 2 and 11) or in a separate discrete structure (FIG. 12). In such implementations, the fingerprint sensing region can include both the sensing region within an edge of the display panel area and the sensing region outside the display panel area as illustrated in FIG. 15. The fingerprint sensing region within the OLED display area can be marked to be visible to a user for placing a finger for fingerprint sensing. In some implementations, selected OLED pixels in this region can be operated to turn on to mark this region or the border of this region in the OLED display area to allow a user to identify the region for placing a finger for fingerprint sensing. In other implementations, one or more illumination light sources may be added underneath the OLED module to produce illumination light to illuminate the border or the region on the top glass cover 1431 to be visible to the user. By providing the one or more illumination light sources, the region within the OLED display area can be optically marked for easy identification by a user for fingerprint sensing regardless whether the OLED display is turned off or turned on. The light from OLED pixels that is present in this region within the OLED display can also be used to add illumination light to a finger in addition to the illumination by probe light that is produced by and projected from the optical sensor module.

In addition to fingerprint detection by optical sensing, the optical sensor module based on the disclosed technology in this document can also be implemented to perform optical sensing for measuring other parameters. For example, the disclosed optical sensor technology can be used not only to use optical sensing to capture and detect a pattern of a finger that is associated with a person, but also to use optical sensing or other sensing mechanisms to detect whether the captured or detected pattern of a fingerprint is from a live person's hand by a "live finger" detection mechanism.

For example, optical sensing of other user parameters can be based on the fact that a live person's finger tends to be moving or stretching due to the person's natural movement or motion (either intended or unintended), the optical absorption characteristics as disclosed in the examples in FIGS. 7, 8 and 9, or pulsing when the blood flows through the person's body in connection with the heartbeat and blood flow. As explained with respect to FIGS. 7, 8 and 9, the ratio obtained at different probe wavelengths can be used to determine whether the touched object is from a finger of a living person or a fake fingerprint pattern of a man-made material.

For example, the optical sensor module may include a sensing function for measuring a glucose level or a degree of oxygen saturation based on optical sensing in the returned light from a finger or palm. For example, as a person touches the display screen, a change in the touching force can be reflected in one or more ways, including fingerprint pattern deforming, a change in the contacting area between the finger and the screen surface, fingerprint ridge widening, or a blood flow dynamics change. Such changes can be measured by optical sensing based on the disclosed optical sensor technology and can be used to calculate the touch force. This touch force sensing adds more functions to the optical sensor module beyond the fingerprint sensing.

For another example, a portion of the light from the display pixels (e.g., OLED or LCD pixels) can enter the finger tissues. This part of light power is scattered by the finger tissues and a part of this scattered light may be collected by the optical sensor array in the optical sensor module. The light intensity of this scattered light depends on the finger's skin color, or the blood concentration in the finger tissue. Such information carried by the scattered light on the finger is useful for fingerprint sensing and can be detected as part of the fingerprint sensing operation. For example, by integrating the intensity of a region of user's finger image, it is possible to observe the blood concentration increase/decrease depends on the phase of the user's heart-beat. This signature can be used to determine the user's heart beat rate, to determine if the user's finger is a live finger, or to provide a spoof device with a fabricated fingerprint pattern.

As to obtaining information on the user's skin color by optical sensing, measurements of the optical intensities of returned light from a finger illuminated probe light at different optical wavelengths of the probe light can be used to obtain the skin color information. The different optical wavelengths of the probe light for illuminating the finger can be achieved in different ways when implementing the disclosed optical sensing technology. For example, the optical sensor module can include different probe light sources at different optical wavelengths. For another example, when implementing the optical sensing in a device with an OLED display panel, the OLED display panel contains different color pixels, e.g., adjacent red, green and blue pixels within one color OLED pixel and can be controlled to provide desired colored light to illuminate the finger for the measuring the skin color. Specifically, color of pixels within each color pixel of the OLED display panel can be selected to turn on to illuminate the finger at different colors. The light intensities of the scattered light by the finger under the illumination of the probe light at different colors/optical wavelengths can be recorded at the optical sensor array and this intensity information at the different optical wavelengths can be used to represent the user's skin color and can be used as a user identification parameter. In this regard, when a user registers a finger for fingerprint authentication operation for a device, the optical fingerprint sensor measures intensities of the scatter light from finger at two different colors or wavelengths A and B, as measured intensities Ia and Ib, respectively. The ratio of Ia/Ib could be recorded and stored as a user authentication data point and is used to compare with a later measurement of the ratio of Ia/Ib obtained when user's finger is placed on the sensing area as part of the fingerprint sensing operation to gain access to the device. This method can help reject the spoof device which may not match user's skin color.

For another example, people have unique topographical or tissue features in their fingers that are below the skin surface and such features are not usually captured or available in various fingerprint sensors. Such unique topographical or tissue features below the skin surface are difficult to duplicate by fake fingerprint pattern duplicating techniques, and such features tend to vary when a finger is not pressed against a surface and when a finger is deformed in shape when being pressed against a surface. The optical sensing based on the disclosed technology in this document can be implemented to use probe light at an optical wavelength that penetrates into a human skin surface (e.g., at an IR wavelength) to capture optical images containing information on the tissue structures below the skin surface and such captured images can be processed to obtain the information on the tissue structures below the skin surface as part of determination of whether the finger under measurement is a finger of an authorized user for the electronic device to provide anti-spoof fingerprint sensing. In implementations, the disclosed technology can be implemented to provide optical fingerprint sensing by capturing images in non-contact and contact configurations to provide different user authentication mechanism by using the same optical sensor module.

The user authentication can be based on the combination of the both the optical sensing of the fingerprint pattern and the positive determination of the presence of a live person to enhance the access control.

With respect to useful operation or control features in connection with the touch sensing aspect of a display screen, the disclosed optical sensor technology can provide triggering functions or additional functions based on one or more sensing results from the optical sensor module to perform certain operations in connection with the touch sensing control over the display screen. For example, the optical property of a finger skin (e.g., the index of refraction) tends to be different from other artificial objects. Based on this, the optical sensor module may be designed to selectively receive and detect returned light that is caused by a finger in touch with the surface of the display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the display screen. For example, designed extra light sources for optical sensing and the designed extra light sources may be provided and, in operation, the designed extra light sources may be turned on in a flash mode to intermittently emit flash light to the screen surface for sensing any touch by a person's finger or palm while the display screen can be placed in a sleep mode to save power. In some implementations, the wake-up sensing light can be in the infrared invisible spectral range so a user will not experience any visual of a flash light.

Figure 16:
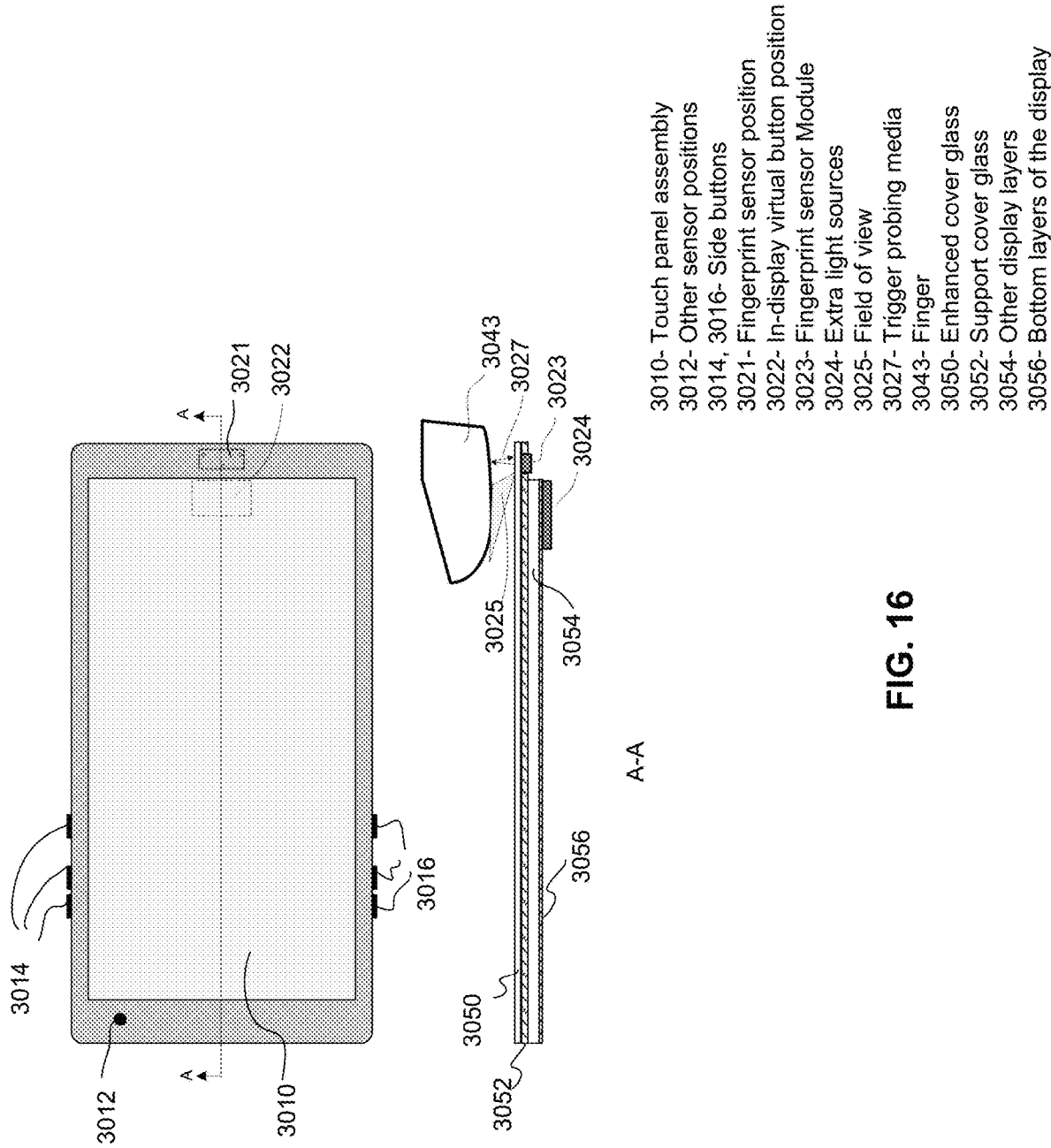
Figure 17:
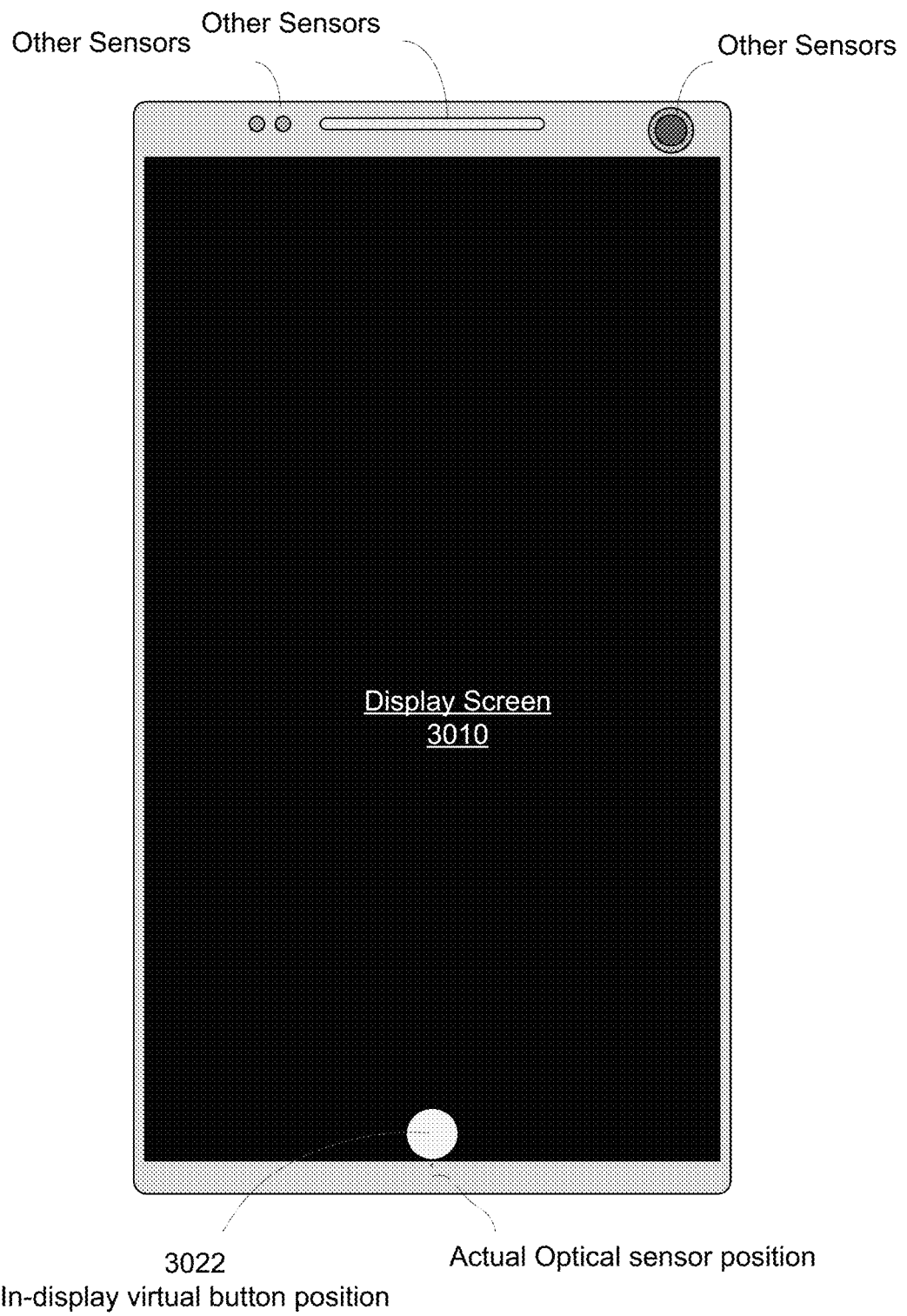

FIG. 16 shows an example of an electronic device in form of a mobile device having an optical fingerprint sensing module based on the disclosed technology. The optical sensing features in this example can be applied to other electronic devices, e.g., tablets and other portable devices and larger electronic devices with optical fingerprint sensing. The device includes a touch sensing display panel assembly 3010 which includes a display module having display layers 3054 and bottom layers 3056. An optical sensor module 3023 is located near or adjacent to the display panel assembly 3010 to provide a fingerprint sensor area 3021 outside the display panel area and a fingerprint sensing region 3022 inside the display panel area as a virtual fingerprint sensor area since the optical sensor module is located in the fingerprint sensor area 3021 outside the display panel area. The device can also include one or more other sensors 3012 (e.g., a front camera), control buttons such as side control buttons 3014 for performing various device operations.

In FIG. 16, the illustrated device includes a display module that displays images and contents and receives user contact inputs. The display module 3010 includes a display panel with different display layers 3054 and bottom layers 3056. A top transparent layer 3056 is formed over the display panel with display layers 3054 to provide a touch interface for receiving a user contact input and to allow viewing of the displayed images and contents of the display panel. As illustrated, a user can place a finger 3043 over the device for fingerprint sensing in accessing the device. The top transparent layer 3056 includes an extended section extending beyond at least one end of the display panel. An optical sensor module 3023 is placed underneath the extended section of the top transparent layer 3056 and adjacent to the one end of the display panel 3010. As disclosed in this patent document, the optical sensor module 3023 includes one or more probe light sources to produce probe light to illuminate the extended section of the top transparent layer 3050 and an adjacent area above the top transparent layer 3050 above the display panel so as to illuminate an object above or in contact with the top transparent layer 3050 for optical sensing. The field of view of the illuminated area above the display panel is marked as 3025 in FIG. 16 and the corresponding area shown in the top transparent layer 3050 is marked by the fingerprint sensing region 3022 inside the display panel area. This is also illustrated in FIGS. 14 and 15 for LCD and OLED display panels. This feature allows a finger to be optically imaged by the optical sensor module 3023 as the finger is placed in the field of view of the illuminated area above sensing region 3022 of the display panel without being in contact with the top transparent layer 3050. The optical sensor module 3023 can also perform optical sensing operation when the finger is in contact with the top transparent layer 3050.

The optical sensor module 3023 includes an optical sensor array for capturing optical images from the returned probe light and/or other light returned from the finger 3043. The optical sensor array includes optical detectors, e.g., CMOS photo detectors or photodiodes, to detect reflected light from the object above or in contact with the top transparent layer to detect a presence of a received contact input associated with both (1) a first signal to provide a first indication of a fingerprint to generate a first signal indicative of an image of a spatial pattern of whether the object is a finger of an authorized user fingerprint and (2) a second signal indicative of a second different signal to provide a separate second indication of whether the object is a finger of an authorized user.

The optical sensor module 3023 may include one or more trigger sensors for detecting whether an object is present or approaching. Such a trigger sensor can generate a trigger probe 3027 and detected the returned trigger probe to determine whether an object is approaching the sensor module, and to detect and evaluate the approaching object at a proper distance from the display cover 3050. The trigger probe can be an optical signal such as a probe light beam. In other implementations, a trigger sensor can be an acoustic trigger sensor that uses a sound signal as the probe, or an electric signal such as a capacitance sensor.

In implementations, the device in FIG. 16 can include a support transparent layer 3052 formed below the top transparent layer 3050 and is engaged to the top transparent layer 3050 as a unified top transparent cover. As illustrated, the support transparent layer 3052 in this example includes an opening that is underneath the extended section of the top transparent layer 3050 and is located adjacent to the one end of the display panel. The optical sensor module 3023 is placed inside the opening of the support transparent layer 3052 underneath the extended section of the top transparent layer 3050. The top transparent layer 3050 and the support transparent layer 3052 may be glass transparent substrates or high-strength transparent materials including crystalized materials. The use of the support transparent layer 3052 can enhance the overall structure strength and to securely hold the optical sensor module 3023.

Referring to FIGS. 1A and 1B, the device in FIG. 16 includes an optical sensor controller coupled to the optical sensor module to control operations of the one or more probe light sources and the optical sensor array to trigger capturing of different images of the object including an image of the object when the object is above the top transparent layer without contacting the top transparent layer as part of the first signal and another image of the object when the object is in contact with the top transparent layer as part of the second signal. The optical sensor controller processes the captured images of the object, including both the captured image of the object when the object is above the top transparent layer without contacting the top transparent layer as part of the first signal and the other captured image of the object when the object is in contact with the top transparent layer as part of the second signal, to determine whether the object is a finger of an authorized user for the electronic device.

Various optical fingerprint sensing operations can be performed by using the device in FIG. 16. For example, when an object or finger touches the display cover 3050, the optical sensor module 3023 can use the returned probe light to capture the images of the object or finger in the regions above the areas 3022 and 3021 before the object or finger touches the top transparent layer 3050. Once the object or finger touches the top transparent layer 3050, the touch sensor in the display further evaluates the object to avoid spoof.

The probe light sources are integrated in the optical sensor module 3023 to illuminate the object to generate returned probe light from the illuminated object back to the optical sensor module 3023 for imaging by the optical sensor array inside the optical sensor module 3023. In some applications, at least one probe light source may be designed to emit probe light at an optical wavelength that penetrates into a human skin surface, e.g., at one or more optical wavelengths in the infrared (IR) or near IR spectral range. Under this operation, the optical sensor array captures (1) images formed by the probe light at the optical wavelength that penetrates into a human skin surface and containing tissue structures below the skin surface, and (2) images representing a surface pattern of the skin surface such as a fingerprint pattern of ridges and valleys of a finger. Accordingly, the optical sensor controller processes (1) the images formed by the probe light at the optical wavelength that penetrates into a human skin surface and containing tissue structures below the skin surface, and (2) the images representing a surface pattern of the skin surface such as a fingerprint pattern of ridges and valleys of a finger to form a 3-dimensional profile for determination of whether the object is a finger of an authorized user for the electronic device to provide anti-spoof fingerprint sensing.

This use of the probe light allows imaging of the inner tissues of the finger to generate a user-specific signature is difficult to duplicate by a fake finger pattern device and can be used as an anti-spoof mechanism as part of the user authentication process for accessing the device. In particular, the above user-specific signature containing inner tissue information under the user finger skin is captured during the user registration process for the device by using the optical sensor module 3023 and is stored for comparison in a user access operation. A fake pattern is unlikely to match such a signature due to the use of the information of inner tissues of the finger below the skin surface and the imaging by the same optical sensor module 3023 for capturing the information of inner tissues of the finger below the skin surface. In addition, a finger exhibits different surface patterns and inner tissue structures when the finger is free from shape deformation without being in contact with the top transparent layer 3050 and when the finger is pressed against the top transparent layer 3050 to undergo some deformation in shape so that using different stored signatures captured by the optical sensor module 3023 when the finger is not in contact with the top transparent layer 3050 and when the finger is pressed against the top transparent layer 3050 provide enhanced anti-spoof features. One aspect of the disclosed technology in this patent document is to use such different surface patterns and inner tissue structures including information captured when a finger is not in contact with the top sensing surface to provide improved fingerprint detection security.

In FIG. 16, in addition to illumination provided by the probe light from the optical sensor module 3023, the display light from the display pixels (e.g., LCD or OLED pixels) may also be used to provide additional illumination for optical sensing operations. In some implementations, one or more extra illumination light sources 3024 may be provided outside the optical sensor module 3023 to assist with the illumination of the object or finger. In the example shown in FIG. 16, the one or more extra illumination light sources 3024 are shown to be located below the display module.

One technical challenge in optical fingerprint sensing is the undesired background light, especially when the device in FIG. 16 is used in outdoor settings or an environment with strong background lighting. To address this, the optical sensor module 3023 can include an optical filter above the optical sensor array to transmit the probe light while blocking background light from reaching the optical sensor array. For example, the optical filter may be structured to reduce infrared light from reaching the optical sensor array, a strong background source from the sunlight. Such an optical filter can be a bandpass filter or one or more filter coatings that are integrated in the detection light path. Each illumination light source can be operated in a flash mode to produce high illumination brightness in a short period time.

in-display optical fingerprint sensing region 3022 inside the display screen and the positon of the optical sensor module located outside the display screen which may be implemented by various designs, including the design examples in FIGS. 14, 15 and 16. The in-display optical fingerprint sensing region 3022 is illuminated to be visible to a user and this illumination can be achieved by using the display pixels or extra light sources. In some designs, the optical sensor module position may be aligned to be in the frame edge area of the display.

Figure 18:
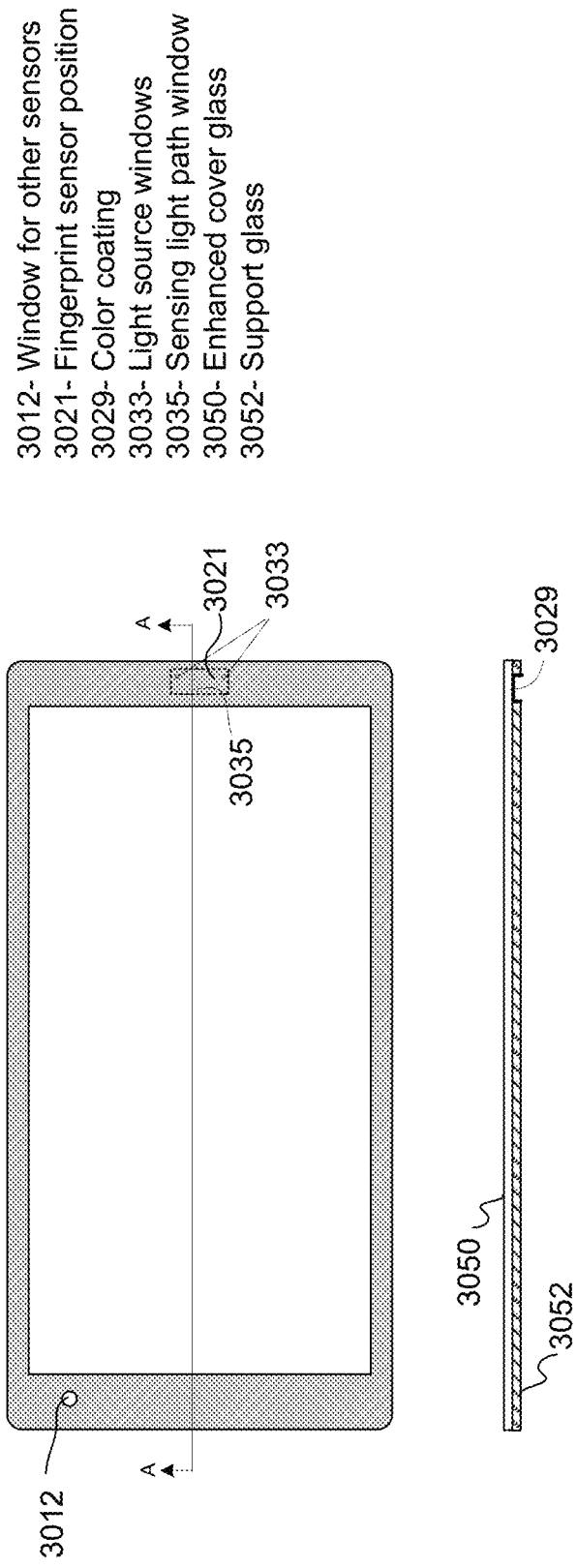
Figure 19:
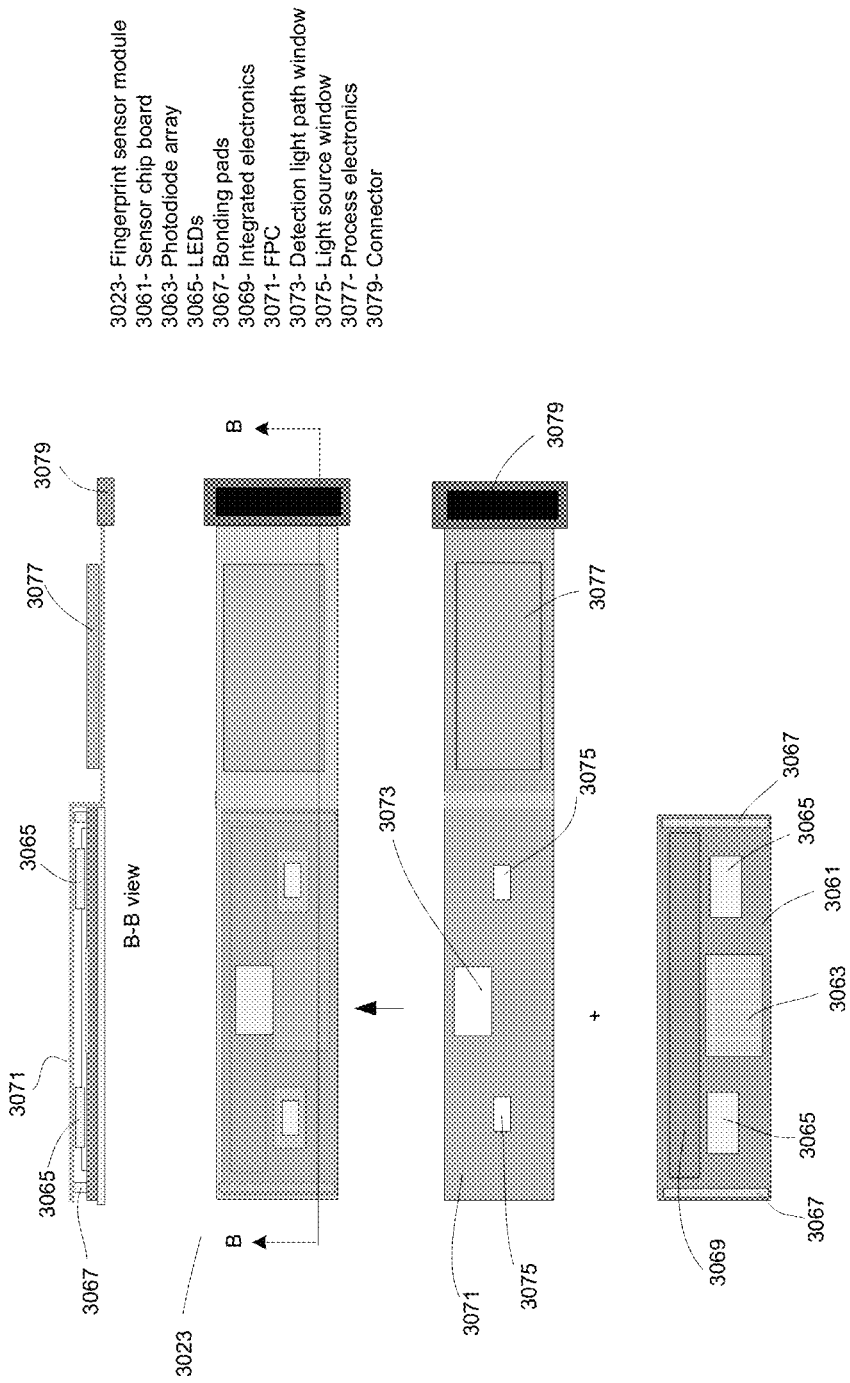

FIG. 18 shows a color coating feature that can be implemented in the optical sensor module design in FIG. 16. Specifically, FIG. 18 shows a multi-layered structure of the display cover. For example, the cover may include one top layer 3050 and a support layer 3052, which can be engaged to each other via different ways, including using an adhesive. In some designs, the top layer 3050 can be very thin (e.g., 200 to 400 microns or other thickness) and the optical sensor module 3023 may be small, e.g., a dimension of around a few millimeters. A color coating 3029 is formed under the top transparent layer inside the opening of the support layer 3052. The color coating 3029 may be patterned to include light source windows 3033 for transmitting probe light from the illumination light sources and a sensing light path window 3035. In some designs, the color coating 3029 may be optically opaque. In other designs, the color coating 3029 may be transparent or partially transparent to the probe light from the light sources where the windows 3033 may not be needed.

in the optical sensor module in FIGS. 16 and 18, including the optical sensor array 3063 which may be a photodiode array, probe or illumination light sources (LEDs etc.) 3065, and related circuits 3069 integrated on a chip board 3061. Flexible printed circuit (FPC) 3071 is bonded onto the sensor chip board 3061 via bonding pads 3067. Processing electronics 3077 and connector 3079 are mounted on the FPC 3071. The FPC 3071 can be patterned to include openings for light source windows 3075 and detection light path widow 3073 formed in the color coating 3029 shown in FIG. 18.

In some implementations, the light sources 3065 may be directly mounted under the FPC 3071. The optical filter for reducing background light can be optical filter coatings formed on the surface of the photodiode array 3063. Furthermore, in some designs, an enhancement side wall structure may be included in the module.

Figure 20:
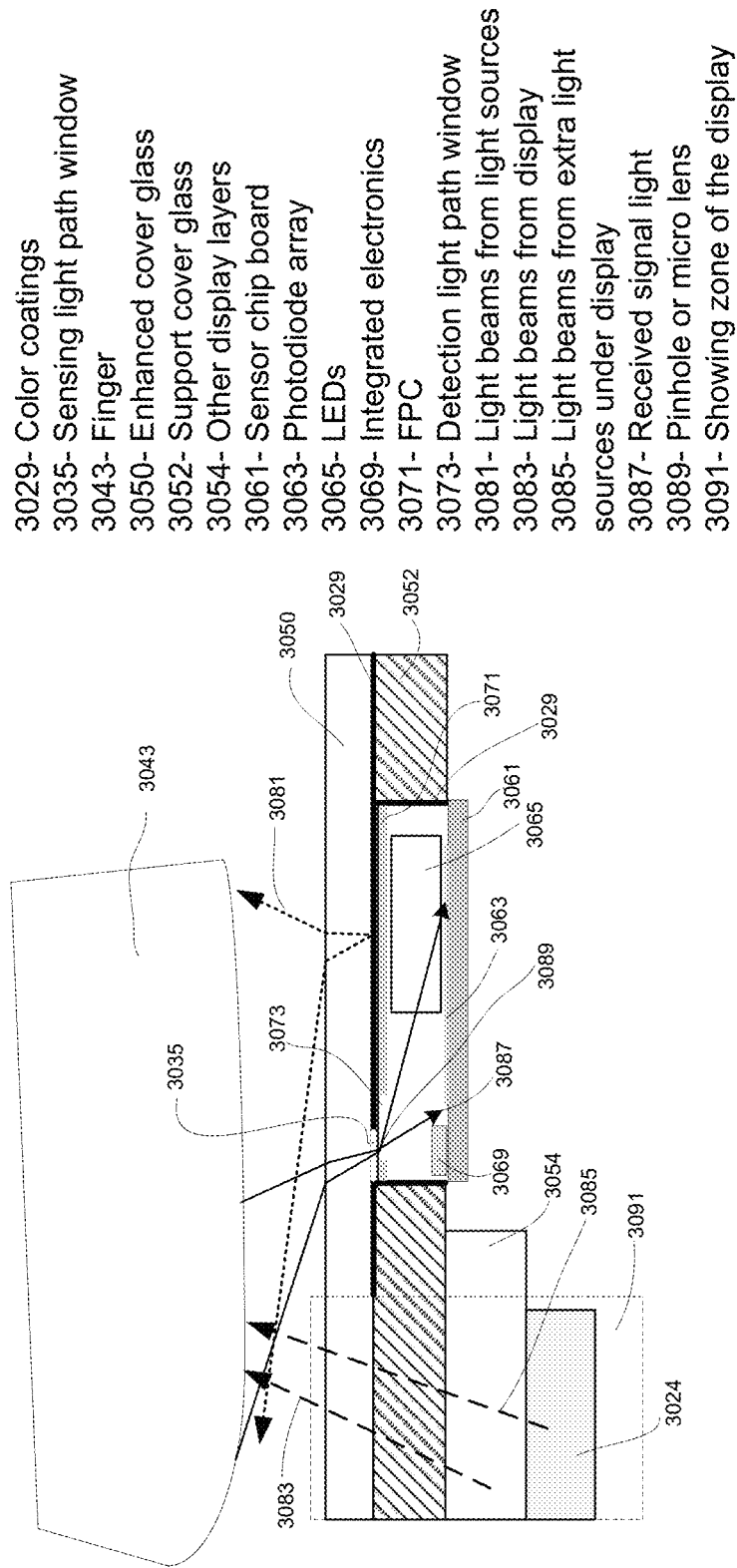

FIG. 20 shows examples of various details in the structure and operation of the optical sensor module 3023 in FIGS. 16, 17, 18 and 19. The support layer 3052 under the display cover 3050 can be made a through hole to hold the optical sensor module 3023. The wall of the hole is painted with color coating 3029 as the sensor module wall that blocks undesired background or environmental light. An optical imaging or light collection module 3089 is provided to capture returned light from an object or finger for imaging by the optical sensor array 3063. This optical imaging module 3089 may include a pinhole or micro lens that is mounted under the cover top layer 3050 in some implementations. The sensing light path window 3035, the pinhole/micro lens 3089 and the detection light path window 3073 can be aligned so that the optical sensor array 3063 can receive the image signal light 3087 in the field of view that covers the in-display fingerprint sensing region 3022.

In some implementations, the light 3081 from light sources 3065, the light 3083 from display 3054, the light 3085 from extra light source 3024 may be used to illuminate the finger. Multiple light wavelengths are included for the light sources to realize fingerprint detection and anti-spoof function. For example, live finger spectrum signature can be used to check if the finger is alive. For example, if red or near IR light is used as light source, the sensor can image deeper tissues under the skin, such as the dermis. With this signature, the fingerprint can be imaged with sufficient information regardless of the conditions of the finger or the sensing surface, dry, wet, or worn-out fingerprint patterns with shallow finger ridge-valley features. In this approach, the fingerprint can be imaged when the finger is not pressed on the display. In addition to the 2-D fingerprint patterns, the finger profile information included in the database also includes 3D fingerprint information that contains inner tissue structures of a finger under the skin. Notably, the image of deeper tissue can be difficult to be duplicated in fake fingerprint and therefor the disclosed optical fingerprint sensing improves the fingerprint detection accuracy with built-in anti-spoofing feature.

FIG. 21 shows examples of capturing images of a finger in contact and non-contact conditions in the device design in FIG. 16. As illustrated, the optical sensor controller may be operated to trigger capturing of different images of the object when (1) the object is above the top transparent layer without contacting the top transparent layer and is approaching the top transparent layer (top), (2) the object is in contact with the top transparent layer (middle), and (3) the object is moving away from the top transparent layer (bottom). Those different images can be optically captured and used to further improve the anti-spoof function of the fingerprint sensing.

Figure 22:
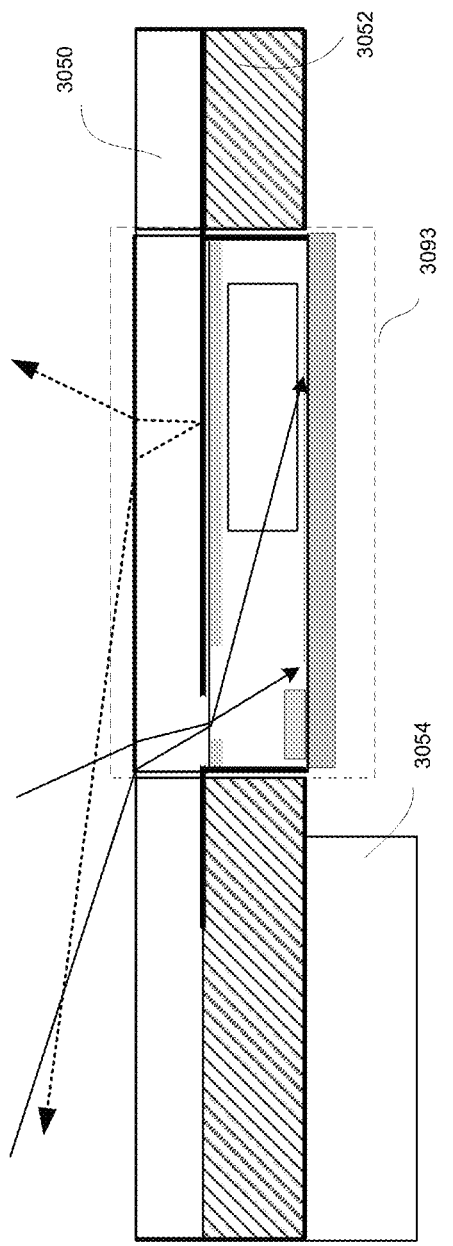
FIG. 22 illustrates an example of an optical sensor module to allow for optical sensing of an object in contact and non-contact conditions in form of a discrete sensor structure similar to the design in FIG. 12.

FIG. 22 further shows an example of an optical sensor module design based on the discrete "button" structure formed in a peripheral area of the top transparent cover as shown in FIG. 12.

Figure 23:
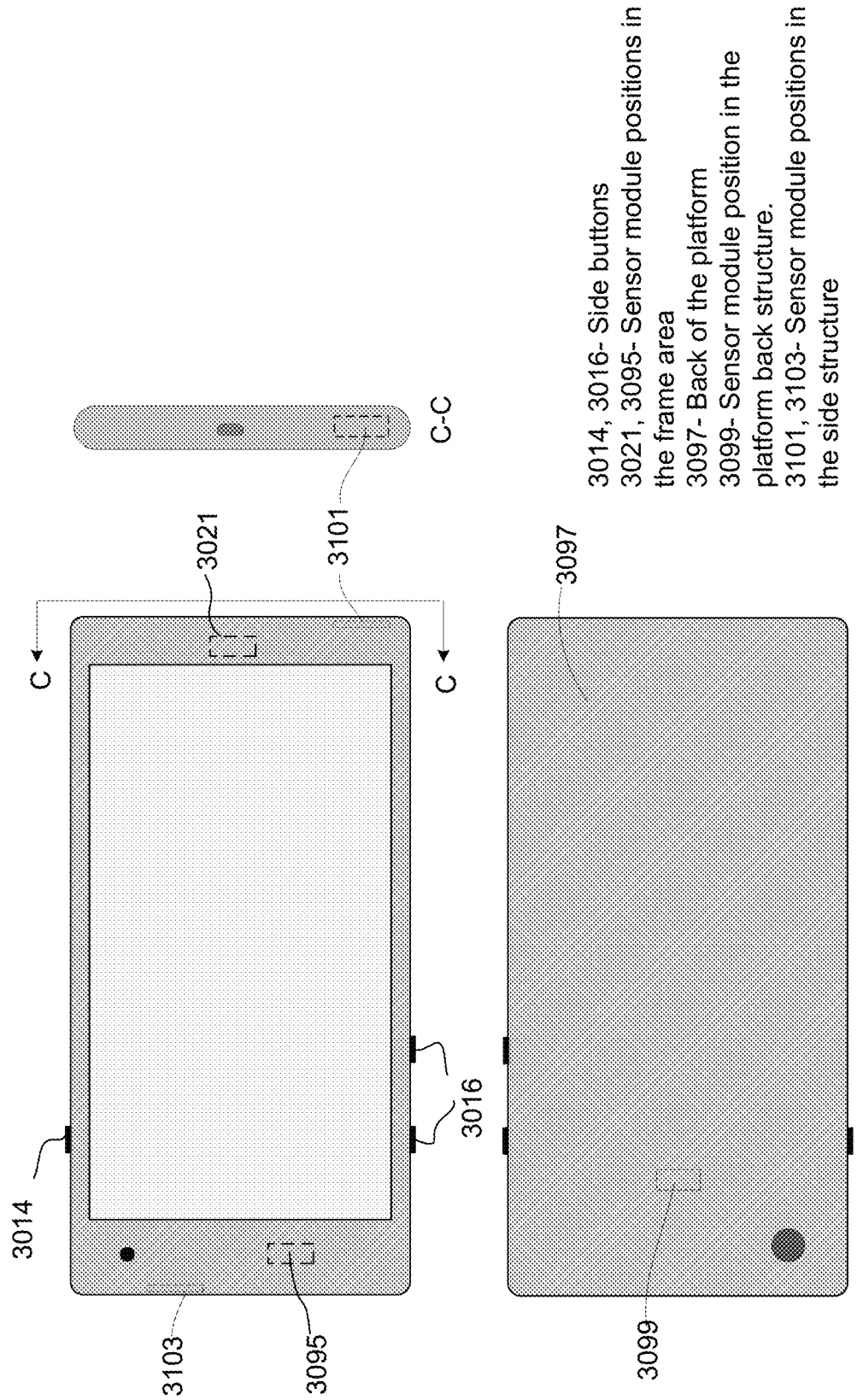
FIG. 23 illustrates examples of placing the optical sensor module in a device.

The optical sensor module designs based on the disclosed technology can be implemented in various locations on the front facet, back facet and sides of a device and in various configurations. FIG. 23 illustrates some examples. For example, the optical sensor module may be located inside a button of the electronic device. In some designs, the button of the electronic device is on a side facet, a back facet or a front side of the electronic device. The button of the electronic device is operable to perform another operation different from fingerprint sensing, e.g., a power button for turning on or off power of the electronic device.

Figure 24:
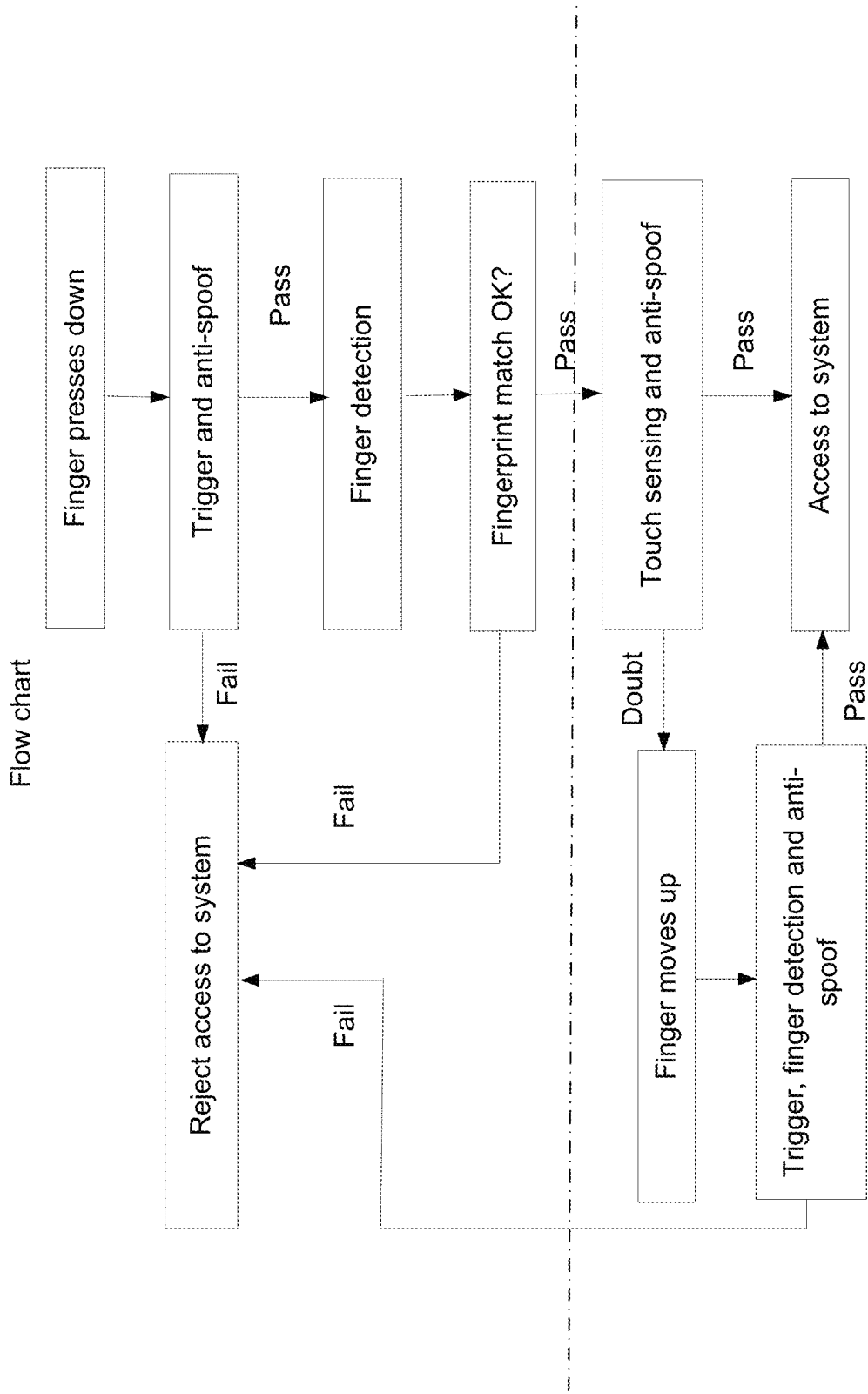
FIG. 24 shows an example of operating an optical sensor module to allow for optical sensing of an object in contact and non-contact conditions.

FIG. 24 shows a flowchart illustrating one example of a method for operating an optical sensor module to authenticate a user for accessing an electronic device. This method includes operating one or more probe light sources of the optical sensor module to produce probe light to illuminate an adjacent area of the electronic device; operating an optical sensor array of optical detectors of the optical sensor module to detect reflected light from an object that is present in the illuminated adjacent area to determine the presence of the object; and operating the one or more probe light sources and the optical sensor array to perform a first optical fingerprint sensing operation when the presence of the object is detected while the object is not in contact with the electronic device to capture one or more first optical images of the object to determine whether the captured one or more first optical images of the object contain a first stored fingerprint of a finger of an authorized user previously obtained from the authorized user by operating the one or more probe light sources and the optical sensor array when the finger of the authorized user was not in contact with the electronic device. Based on the above, the access to the electronic device is denied when the captured one or more first optical images of the object are determined not to contain the first stored fingerprint of the authorized user.

The above processing is represented by the processing operations located above the dashed line in FIG. 24.

Next, when the first optical fingerprint sensing operation determines that the captured one or more first optical images of the object in the first optical fingerprint sensing operation are determined to contain the fingerprint of an authorized user, the method provides additional user authentication as illustrated by processing operations located below the dashed line in FIG. 24.

Specifically, the method includes operating the one or more probe light sources and the optical sensor array to perform a second optical fingerprint sensing operation when the object is in contact with the electronic device to capture one or more second optical images of the object to determine whether the captured one or more second optical images of the object contain a second stored fingerprint of the finger of the authorized user previously obtained from the authorized user by operating the one or more probe light sources and the optical sensor array when the finger of the authorized user was in contact with the electronic device. Accordingly, the access to the electronic device is denied when the captured one or more second optical images of the object are determined not to contain the second stored fingerprint of the authorized user. And, the access to the electronic device is granted when the captured one or more second optical images of the object are determined to contain the second stored fingerprint of the authorized user.

The optical sensors for sensing optical fingerprints disclosed above can be used to capture high quality images of fingerprints to enable discrimination of small changes in captured fingerprints that are captured at different times. Notably, when a person presses a finger on the device, the contact with the top touch surface over the display screen may subject to changes due to changes in the pressing force.

Figure 25:
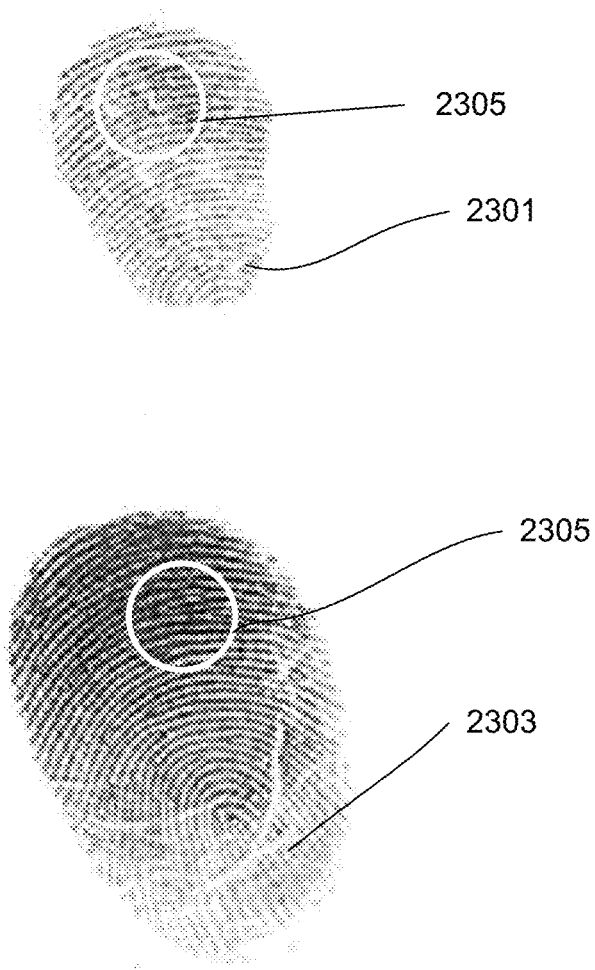
FIG. 25 shows two different fingerprint patterns of the same finger under different press forces to illustrate the operation of the optical sensor module for capturing different fingerprint patterns at different times to monitor time-domain evolution of the fingerprint ridge pattern.

Referring to FIG. 25, the contact profile area increases with an increase in the press force, meanwhile the ridge-print expands with the increase in the press force. Conversely, the contact profile area decreases with an decrease in the press force, meanwhile the ridge-print contracts or shrinks with the decrease in the press force. FIG. 25 shows two different fingerprint patterns of the same finger under different press forces: the lightly pressed fingerprint 2301 and the heavily pressed fingerprint 2303. The returned probe light from a selected integration zone 2305 of the fingerprint on the touch surface can be captured by a portion of the optical sensors on the optical sensor array that correspond to the selected integration zone 2305 on the touch surface. The detected signals from those optical sensors are analyzed to extract useful information as further explained below.

When a finger touches the sensor surface, the finger tissues absorb the light power thus the receiving power integrated over the photo diode array is reduced. Especially in the case of total inner reflection mode that does not sense the low refractive index materials (water, sweat etc.), the sensor can be used to detect whether a finger touches the sensor or something else touches the sensor accidentally by analyzing the receiving power change trend. Based on this sensing process, the sensor can decide whether a touch is a real fingerprint touch and thus can detect whether to wake up the mobile device based on whether the touch is a real finger press. Because the detection is based on integration power detection, the light source for optical fingerprint sensing at a power saving mode.

In the detailed fingerprint map, when the press force increases, the fingerprint ridges expand, and more light is absorbed at the touch interface by the expanded fingerprint ridges. Therefore within a relatively small observing zone 2305, the integrated received light power change reflects the changes in the press force. Based on this, the press force can be detected.

Accordingly, by analyzing the integrated received probe light power change within a small zone, it is possible to monitor time-domain evolution of the fingerprint ridge pattern deformation. This information on the time-domain evolution of the fingerprint ridge pattern deformation can then be used to determine the time-domain evolution of the press force on the finger. In applications, the time-domain evolution of the press force by the finger of a person can be used to determine the dynamics of the user's interaction by the touch of the finger, including determining whether a person is pressing down on the touch surface or removing a pressed finger away from the touch surface. Those user interaction dynamics can be used to trigger certain operations of the mobile device or operations of certain apps on the mobile device. For example, the time-domain evolution of the press force by the finger of a person can be used to determine whether a touch by a person is an intended touch to operate the mobile device or an unintended touch by accident and, based on such determination, the mobile device control system can determine whether or not to wake up the mobile device in a sleep mode.

In addition, under different press forces, a finger of a living person in contact with the touch surface can exhibit different characteristics in the optical extinction ratio obtained at two different probe light wavelengths as explained with respect FIGS. 7, 8 and 9. Referring back to FIG. 25, the lightly pressed fingerprint 2301 may not significantly restrict the flow of the blood into the pressed portion of the finger and thus produces an optical extinction ratio obtained at two different probe light wavelengths that indicates a living person tissue. When the person presses the finger hard to produce the heavily pressed fingerprint 2303, the blood flow to the pressed finger portion may be severely reduced and, accordingly, the corresponding optical extinction ratio obtained at two different probe light wavelengths would be different from that of the lightly pressed fingerprint 2301. Therefore, the optical extinction ratios obtained at two different probe light wavelengths vary under different press forces and different blood flow conditions. Such variation is different from the optical extinction ratios obtained at two different probe light wavelengths from pressing with different forces of a fake fingerprint pattern of a man-made material.

Therefore, the optical extinction ratios obtained at two different probe light wavelengths can also be used to determine whether a touch is by a user's finger or something else. This determination can also be used to determine whether to wake up the mobile device in a sleep mode.

For yet another example, the disclosed optical sensor technology can be used to monitor the natural motions that a live person's finger tends to behave due to the person's natural movement or motion (either intended or unintended) or pulsing when the blood flows through the person's body in connection with the heartbeat. The wake-up operation or user authentication can be based on the combination of the both the optical sensing of the fingerprint pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the display screen, a change in the touching force can be reflected in one or more ways, including fingerprint pattern deforming, a change in the contacting area between the finger and the screen surface, fingerprint ridge widening, or a blood flow dynamics change. Those and other changes can be measured by optical sensing based on the disclosed optical sensor technology and can be used to calculate the touch force. This touch force sensing can be used to add more functions to the optical sensor module beyond the fingerprint sensing.

Palmprint Sensing

According to some embodiments, an optical ID sensor may be configured to image and identify palmprints. Similar to fingerprints, palmprints are also unique for a person. Therefore, palmprints can also be used as a bio-ID for secure access to electronic systems. For example, palmprints identification may be used to wake up a smart phone, a tablet computer, or a laptop computer that is in a sleep mode, or to grant access to bank accounts or authorize electronic payments in an electronic financial system. Compared to fingerprint identification, palmprint identification may image a larger area of a hand. The relative position of the hand with respect to an optical palmprint sensor may not need to be as accurate. In addition, palmprints may be obtained at various distances from the optical palmprint sensor, so that "three-dimensional" palmprint ID data may be obtained. Therefore, security check using palmprint ID may afford a better user experience, as well as more robust security.

optical palmprint sensors 4013*a* and 4013*b* integrated therein according to some embodiments. Examples of the electronic platform 4000 may include smart phones, tablet computers, laptop computers, wearable devices, electronic payment systems, or other electronic devices where secure access may be desired. The electronic platform 4000 may have a front side 4001 and a back side 4003. The electronic platform 4000 may also have one or more side buttons 4019, such as a power on/off button and sound volume control buttons. The electronic platform 4000 may also include a socket (not shown) for plugging in a headphone, or a Bluetooth interface for interfacing with a wireless headphone.

As illustrated, an optical palmprint sensor 4013*a* may be disposed on the front side 4001 of the electronic platform 400, and configured to detect and image palmprints of a hand 4005 approaching the front side 4001. Alternatively or additionally, an optical palmprint sensor 4013*b* may be disposed on the back side 4003 of the electronic platform 4000, and configured to detect and image palmprints of a hand 4009 approaching the back side 4003. In some embodiments, an optical palmprint sensor may be located at a side edge of the frame (not shown), so that palmprints may be detected and imaged as a hand approaches the side edge.

In some embodiments, the electronic platform 4000 (e.g., a smart phone or tablet computer) may include a display screen on the front side 4001. The optical palmprint sensor 4013*a* on the front side 4001 may be installed under the display screen, located either within the display area or at a border of the display area (e.g., similar to the optical fingerprint sensor illustrated in FIGS. 20 and 21). The optical palmprint sensor 4013*b* on the back side 4003 may be installed under the backside structure of the frame.

Each optical palmprint sensor 4013*a* or 4013*b* may include an optical assembly 4015 and a photodiode array 4017. In some embodiments, the optical assembly 4015 may include a lens and/or a pinhole (the optical assembly 4015 may be referred herein as a lens/pinhole assembly). The optical assembly 4015 may be configured to form, at a surface of the photodiode array 4017, an image of at least a portion of a palm. The photodiode array 4017 may be configured to convert optical signals into electrical signals, which may be stored in a computer memory and/or processed by a processor. An image captured by the optical palmprint sensor 4013*a* or 4013*b* may include patterns of a palm and/or fingers.

The optical palmprint sensor 4013*a* or 4013*b* may also include optical spectral filters. The optical spectral filters may be formed on the surface of the photodiode array 4017 or surfaces of other optical components. The optical palmprint sensor 4013*a* or 4013*b* may also include electronic circuits coupled to the photodiode array 4017. The electronic circuits may be formed on a printed circuit board (PCB). As an example, the optical palmprint sensor 4013*a* or 4013*b* may include optical and optoelectronic components similar to that illustrated in FIG. 20.

Figure 26:
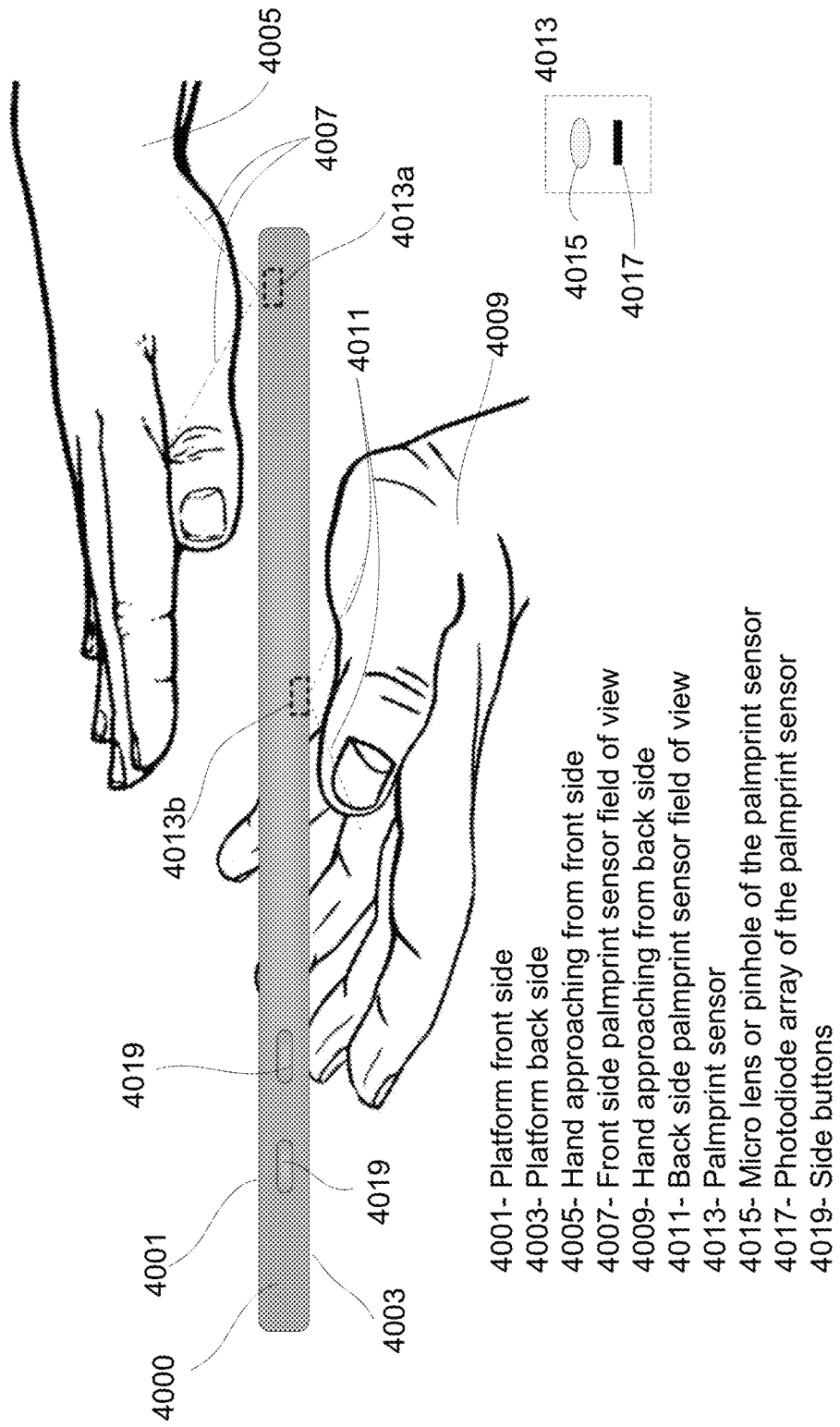
FIG. 26 illustrates schematically an electronic platform that includes one or more optical palmprint sensors integrated therein according to some embodiments.

Each optical palmprint sensor 4013*a* or 4013*b* may have a certain angular field of view (FOV) 4007 or 4011, as illustrated by the dashed lines in FIG. 26. In some embodiments, the optical palmprint sensor 4013*a* or 4013*b* may be configured to detect and image palmprints as a hand 4005 or 4009 approaches the front side 4001 or the back side 4003 of the electronic platform 4000 within its FOV and is at an appropriate object distance (e.g., from about 0 mm to about 10 mm, or from about 2 mm to about 6 mm) of the imaging optics. It may or may not require that any part of the hand 4005 or 4009 physically touch the optical palmprint sensor 4013*a* or 4013*b*. Additionally or alternatively, the optical palmprint sensor 4013*a* or 4013*b* may be configured to detect and image palmprints as a hand 4005 or 4009 is holding the electronic platform 4000.

The illumination light for imaging palmprints may include ambient light from the environment, light from a display (in cases in which the optical palmprint sensor 4013*a* or 4013*b* is integrated with a display screen of the electronic platform 4000). In some embodiments, the electronic platform 4000 may also include one or more light sources disposed adjacent the optical palmprint sensor 4013*a* and/or 4013*b*. The light sources may provide illumination light on a palm, in addition to the ambient light and the display light. The light sources may be configured to provide infrared light, and/or visible light of selected wavelengths. For example, the light sources may include lasers or LEDs (e.g., similar to the light sources 3024 and 3065 illustrated in FIG. 20). As discussed above, by using multiple light sources with different wavelengths, the liveness of a palm may be determined.

A security check system of the electronic platform 4000 may detect a trigger event indicating that a person intends to access the electronic platform 4000. According to various embodiments, the trigger event may be touching of a physical button (e.g., the power on/off button or a volume control button), or plugging in a headphone or turning on a wireless headphone. In response to detecting the trigger event, the security check system may evaluate the palmprints acquired by the optical palmprint sensors 4013*a* and/or 4013*b* for authentication. In this way, accidental waking up of the electronic platform 4000 without a user's intention may be avoided. Therefore, battery power may be better preserved.

In the authentication process, the security check system may compare the palmprints to palmprint ID data stored in a computer memory to determine whether the palmprints match the palmprint ID data. The palmprint ID data may be generated from palmprints of an authorized user acquired by the optical palmprint sensor 4013*a* or 4013*b* during a registration process.

In some embodiments, the optical palmprint sensor 4013*a* or 4013*b* may be configured to continuously detect whether a palm (or a portion of a palm) is within its field of view (FOV), and acquire palmprints when it detects that the palm is within its FOV. For example, the optical palmprint sensor 4013a or 4013b may continuously perform imaging. The security check system may perform image analysis to determine whether a palm (or a portion of a palm) is being imaged. When it is determined that a palm is being imaged, the security check system may cause the optical palmprint sensor 4013a or 4013b to acquire the palmprints (e.g., to capture the palmprints imaged on the photodiode array and save them in a computer memory). Thus, the security check system may evaluate the acquired palmprints for authentication as soon as it detects a trigger event without waiting for the optical palmprint sensor 4013a or 4013b to acquire the palmprints. Therefore, a user may have a better user experience by gaining access to the electronic platform relatively quickly.

In some other embodiments, the optical palmprint sensor 4013a or 4013b may be configured to perform imaging and acquire palmprints only after the trigger event has been detected. In this manner, computing resources and battery power may be better preserved, perhaps at the expense of a longer latent time in granting access.

In some embodiments, the optical palmprint sensor 4013a or 4013b may be configured to detect whether a palm is within a predetermined distance from the optical palmprint sensor 4013a or 4013b, and acquire palmprints when it detects that the palm is within the predetermined distance. The predetermined distance may be determined based on the optical design of the imaging optics of the optical palmprint sensor 4013a or 4013b. For example, the imaging optics may be designed to form clear images of an object when the object is within a certain range of object distances. For instance, the range of object distances may be between 0 mm and about 10 mm, or between about 2 mm and about 6 mm.

In some embodiments, the optical palmprint sensor 4013a or 4013b may be configured to acquire multiple palmprints when the palm is at various object distances. For example, palmprints may be acquired when the palm is 2 mm, 3 mm, and 4 mm from the optical palmprint sensor 4013a or 4013b. Similarly, during the registration process, the optical palmprint sensor 4013a or 4013b may acquire multiple palmprints of the authorized user at various object distances. Thus, the palmprint ID data stored in the computer memory may include three-dimensional (3D) information of the palm of the authorized user. In this way, the authentication process may be sensitive to the 3D aspect of the object being imaged. Thus, the security check system may have anti-spoofing functions. For example, the security check system may be able to distinguish a live 3D palm from a 2D photograph of a palm.

Figure 27:
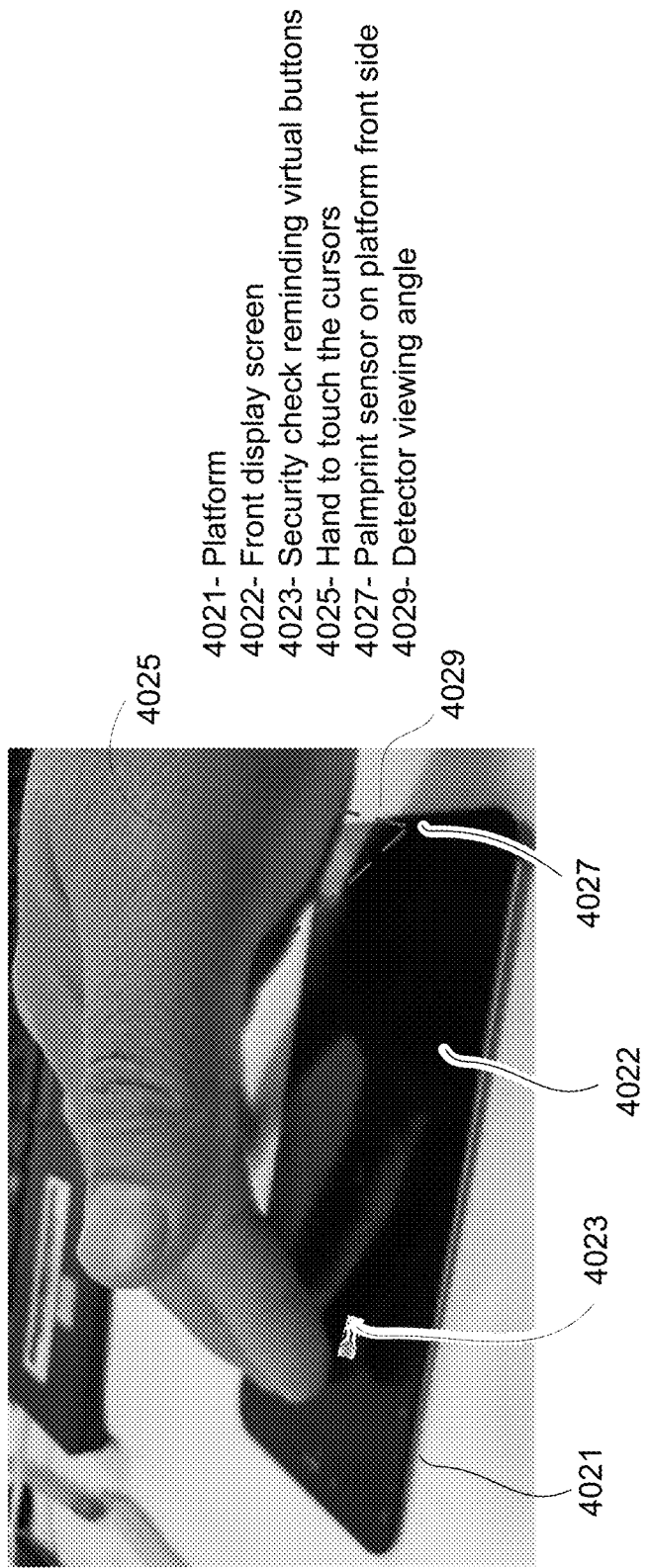
FIG. 27 illustrates an electronic platform configured to display security check reminding cursors on a display screen according to some embodiments.

In some embodiments, the electronic platform may display security check reminding cursors on a display screen. For example, as illustrated in FIG. 27, the electronic platform 4021 displays a security check reminding cursor 4023 on a front display screen 4022. The security check reminding cursor 4023 may function as a virtual button. When a finger (or another part of a hand 4023) touches the security check reminding cursor 4023, the security check system may be triggered to evaluate the palmprints of the hand 4023 acquired by the optical palmprint sensor 4027.

In some embodiments, the security check system may require that a particular finger, for example the index finger, to touch the virtual button 4023. For instance, the optical palmprint sensor 4027 may be located at a lower edge of the front display screen 4022. The virtual button 4023 may appear at a location on the display screen 4022 such that, when a user uses an index finger of a right hand 4025 to touch the virtual button 4023, a specific portion of the palm may be within the FOV 4029 of the optical palmprint sensor 4027. If the palmprint ID data was acquired under similar requirements during a registration process, the palmprint evaluation may be more accurate and robust. In some other embodiments, multiple virtual buttons may be shown on the display screen 4022. The security check system may require that multiple fingers touch the multiple virtual buttons simultaneously, so that the position of the palm may be limited to a proper location and orientation.

Figure 28:
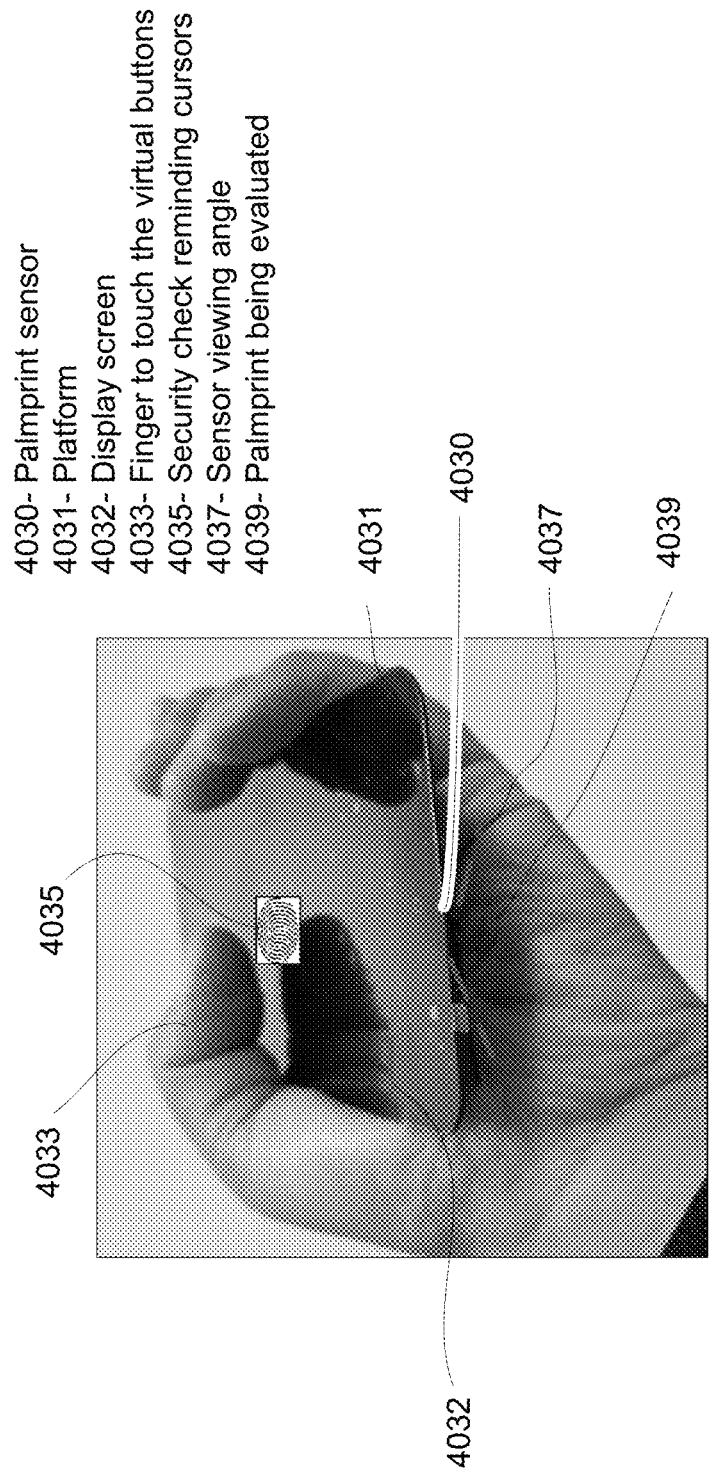
FIG. 28 illustrates an electronic platform configured to display security check reminding cursors on a display screen according to some embodiments.

FIG. 28 illustrates an exemplary embodiment in which security check reminding cursors (virtual buttons) are used to trigger the evaluation of palmprints. In this example, the electronic platform 4031 may be a smart phone or another type of hand-held devices. The optical palmprint sensor 4030 may be positioned on the back side of the electronic platform 4031. A user may hold the electronic platform 4031 in a hand with the display screen 4032 facing up and the optical palmprint sensor 4030 facing the palm 4039 of the hand. A virtual button 4035 may be displayed on the display screen 4032 as a security check reminder. When the user touches the virtual button 4035 with a finger 4033 (e.g., a thumb), the security check system may be triggered to evaluate the palmprints acquired by the optical palmprint sensor 4030. In some embodiments, the security check system may require that a particular finger (e.g., the thumb) touches the virtual cursor 4035, so that a proper portion of the palm 4039 is within the FOV 4037 of the optical palmprint sensor 4030.

Figure 29:
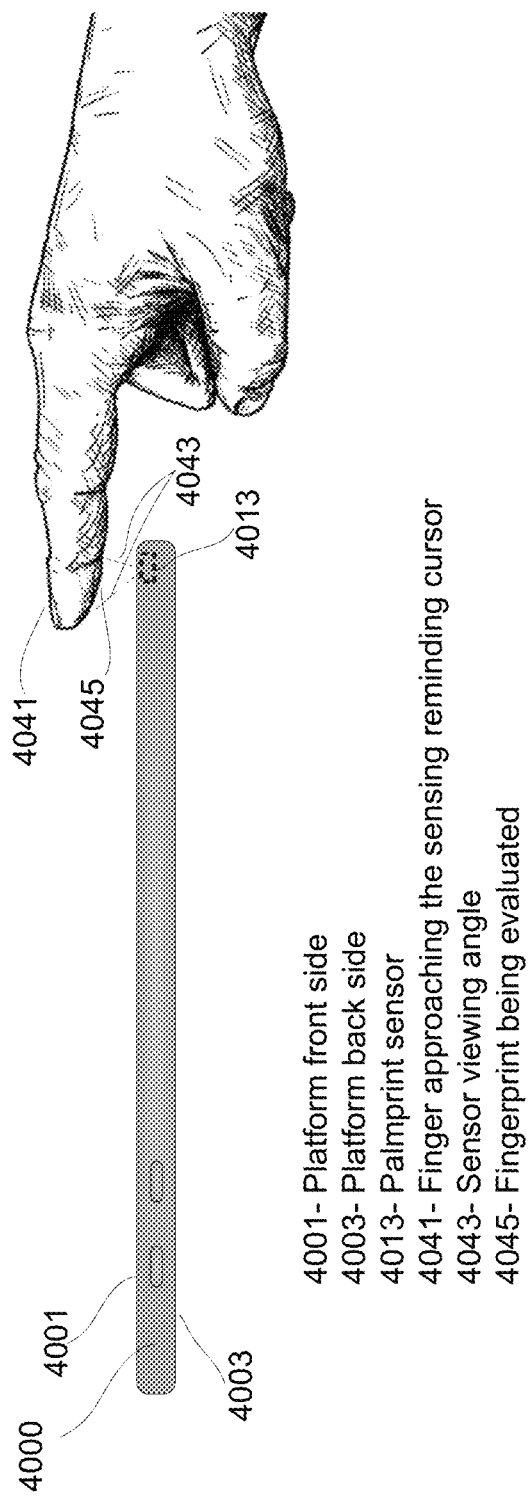
FIG. 29 illustrates an electronic platform that includes an optical palmprint sensor located near an edge of the frame under a display screen according to some embodiments.

FIG. 29 illustrates an exemplary embodiment. In this example, the optical palmprint sensor 4013 may be located near an edge (e.g., a bottom edge) of the frame under the display screen on the front side 4001 of the electronic platform 4000. The A security check reminding virtual button may be displayed on the display screen directly above the optical palmprint sensor 4013. As a finger 4041 approaches the virtual button, the security check system may be triggered to evaluate the palmprints 4045 acquired by the optical palmprint sensor 4013. In this example, the palmprints 4045 may comprise primarily fingerprints as the finger 4041 may be within the FOV 4043 of the optical palmprint sensor 4013. In some embodiments, any part of a palm approaching the virtual button (not limited to the finger 4041) may trigger the security check system to evaluate the palmprints 4045.

According to various embodiments, the security check system may be triggered to evaluate the palmprints 4045 when the finger 4041 (or another part of the palm) touches the virtual button, and/or when the finger 4041 approaches the virtual button and is at a proper distance (e.g., 3 mm or 5 mm) above the display screen, and/or when the finger 4041 is lifted from the display screen and is at the proper distance (e.g., 3 mm or 5 mm) above the display screen. The latter two scenarios may be referred to as remote trigger. The optical palmprint sensor 4013 may continuously attempt to image the palmprints 4045, but is triggered to acquire palmprints 4045 for evaluation only when the security check system is triggered.

Figure 30:
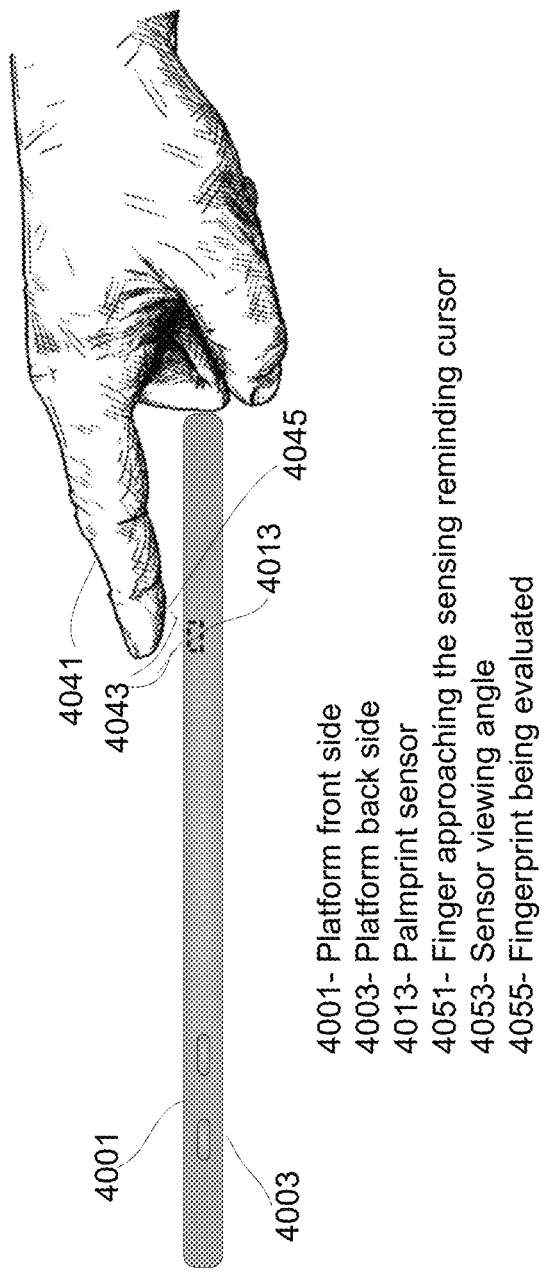
FIG. 30 illustrates an electronic platform that includes an optical palmprint sensor located under a display screen within a display area of the display screen according to some embodiments.

FIG. 30 illustrates another exemplary embodiment. In this example, the optical palmprint sensor 4013 may be located under the display screen within the display area on the front side 4001 of the electronic platform 4000. A security check reminding virtual button may be displayed on the display screen directly above the optical palmprint sensor 4013. As a finger 4041 (or another part of the palm) approaches the virtual button, the security check system may be triggered to evaluate the palmprints 4045 acquired by the optical palmprint sensor 4013.

According to various embodiments, the security check system may be triggered to evaluate the palmprints 4045 when the finger 4041 touches the virtual button, and/or when the finger 4041 approaches the virtual button and is at a proper distance (e.g., 3 mm or 5 mm) above the display screen, and/or when the finger 4041 is lifted from the display screen and is at the proper distance (e.g., 3 mm or 5 mm) above the display screen. The optical palmprint sensor 4013 may continuously attempt to image the palmprints 4045, but is triggered to acquire palmprints 4045 for evaluation only when the security check system is triggered.

Figure 31:
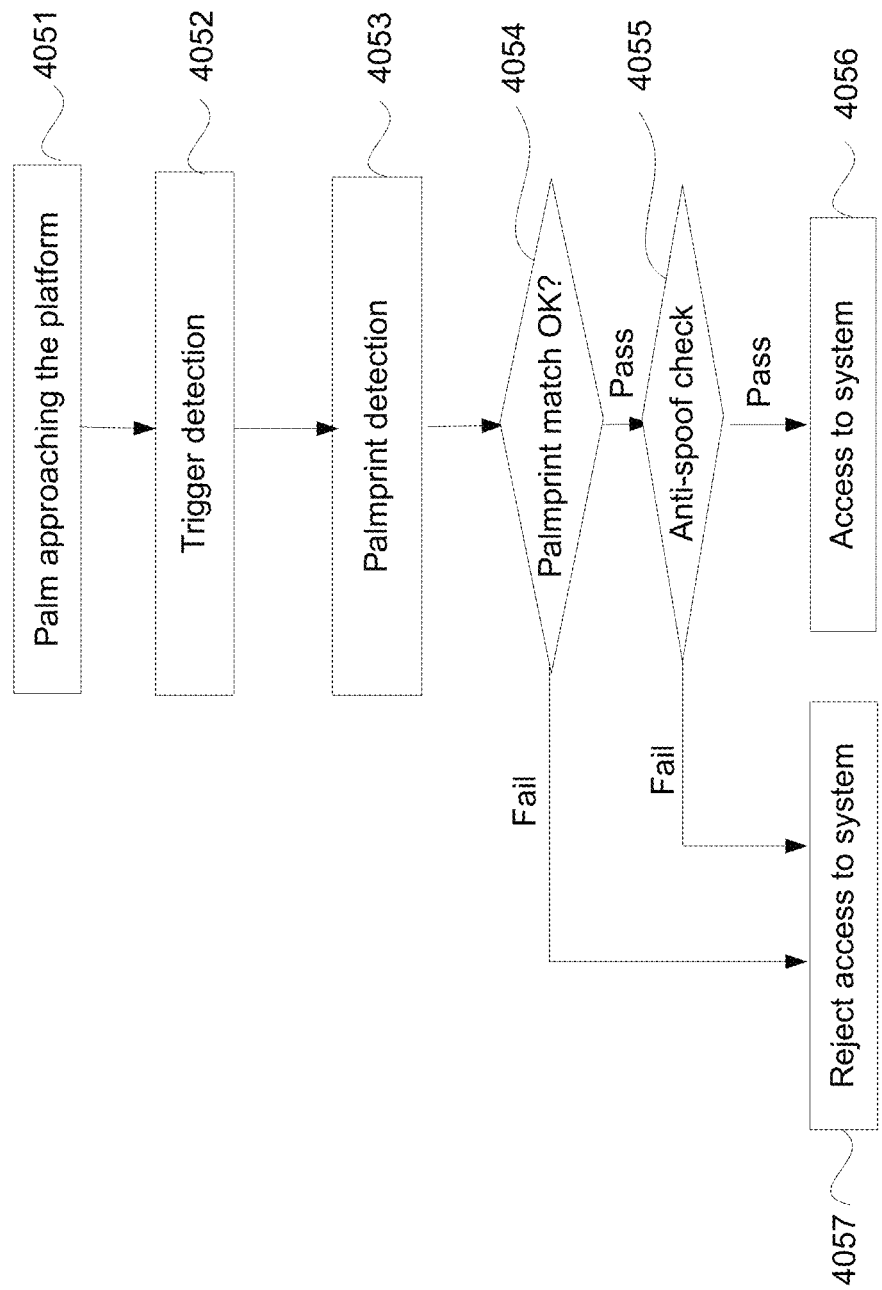
FIG. 31 shows a flowchart illustrating an exemplary method of security check for secure access of an electronic platform using palmprint sensing according to some embodiments.

FIG. 31 shows a flowchart illustrating an exemplary method of security check for secure access of an electronic platform using palmprint sensing according to some embodiments. Exemplary electronic platforms may include smart phones, tablet computers, laptop computers, electronic payment systems, and the like. The electronic platform may include an optical palmprint sensor, such as an optical imaging system for capturing palmprints (or fingerprints) of a person attempting to access the electronic platform. The optical palmprint sensor may be positioned under a display screen (e.g., in a display area or on a border of the display area), or as a discrete button separate from the display screen.

At 4051, the person's palm may approach the electronic platform. For example, the person's palm may be grabbing the electronic platform, waving at the electronic platform, or moving toward the electronic platform.

At 4052, a trigger event may be detected. The trigger event may indicate that the person is trying to access the electronic platform. The trigger event may include, for example, when the person touches a physical button (e.g., a power on/off button, or a sound volume control button) or one or more virtual buttons (e.g., security check reminding cursors), and/or when the person's palm is within a proper distance from the optical palmprint sensor (e.g., 0 mm to 10 mm, or 2 mm to 6 mm from the optical palmprint sensor), and/or when the person's palm makes a particular gesture (e.g., waving back and forth).

At 4053, in response to detecting the trigger event, the security check system may detect palmprints using the optical palmprint sensor. In some embodiments, the optical palmprint sensor may continuously detect the presence of a palm within its field of view, and acquire palmprints when it detects the palm within its field of view. For example, the optical palmprint sensor may acquire palmprints when the palm approaches the optical palmprint sensor and reaches a proper distance from the optical palmprint sensor (e.g., 3 mm, 5 mm, or the like), and/or when the palm touches the optical palmprint sensor, and/or when the palm is moving away from the optical palmprint sensor and reaches a proper distance from the optical palmprint sensor. However, the palmprints may be evaluated by the security check system only when a trigger event has been detected. In this manner, as soon as the trigger event occurs, the security check system may evaluate the palmprints for authentication, and determine whether to grant or deny access in a relatively short amount of time without waiting for the optical palmprint sensor to acquire palmprints. In this manner, accidentally waking up the electronic platform without the person's intention may also be avoided. In some other embodiments, the optical palmprint sensor may start acquiring palmprints only when a trigger event has been detected. In this manner, computing resources and battery power may be better preserved, perhaps at the expense of a longer latent time in granting access.

At 4054, the palmprints acquired by the optical palmprint sensor may be compared to the palmprint ID data stored in a memory to evaluate whether the palmprints match with the palmprint ID data. The palmprint ID data may be generated from palmprints of an authorized user acquired by the optical palmprint sensor during a registration process.

At 4057, if the evaluation at 4054 results in a "fail," access may be denied.

At 4055, if the evaluation at 4054 results in a "pass," anti-spoofing evaluation may be performed. The anti-spoofing evaluation may include, for example, liveness detection, capacitance measurements, sound echo detection, or specific image analysis (e.g., as described above with references to FIGS. 6-9). If the anti-spoofing evaluation at 4055 results in a "fail," access may be denied.

At 4056, if the anti-spoofing evaluation at 4055 results in a "pass," access may be granted.

It should be appreciated that the specific steps illustrated in FIG. 31 provide a particular method of security check for secure access of an electronic platform according to some embodiments. Other sequences of steps may also be performed according to alternative embodiments. For example, alternative embodiments of the present invention may perform the steps outlined above in a different order. Moreover, the individual steps illustrated in FIG. 31 may include multiple sub-steps that may be performed in various sequences as appropriate to the individual step. Furthermore, additional steps may be added or removed depending on the particular applications. One of ordinary skill in the art would recognize many variations, modifications, and alternatives.

Peripheral Light Sources

According to some embodiments, an electronic device may include an organic light-emitting diode (OLED) display screen, also referred to as an active matrix OLED (AMOLED) display screen, and an optical ID sensing module may be disposed under the OLED/AMOLED display screen. OLED/AMOLED display screens may present particular challenges to light source configurations for providing illumination for the optical ID sensing module.

Figure 32A:
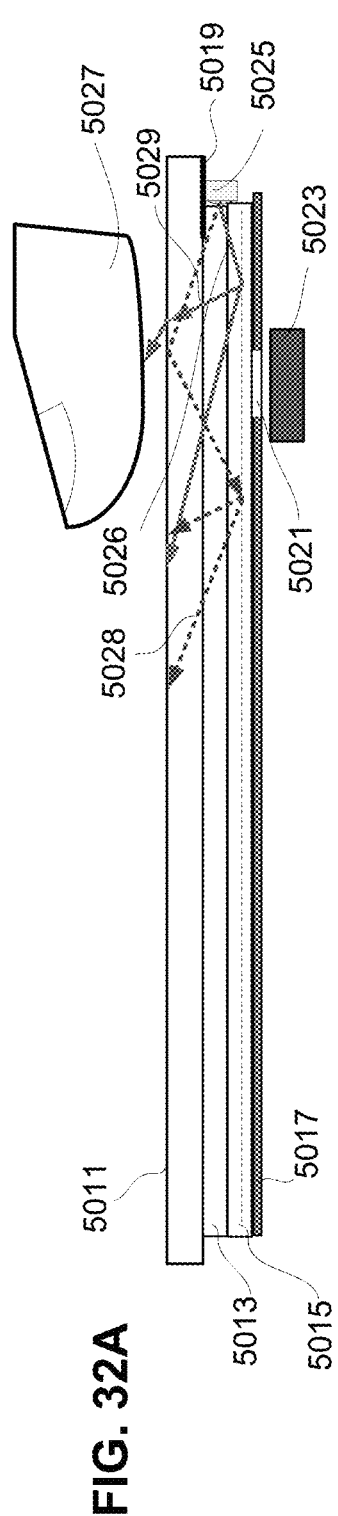
FIG. 32A shows a schematic cross-sectional view of a display screen of an electronic device equipped with an optical ID sensing module and peripheral light sources according to some embodiments.
Figure 32B:
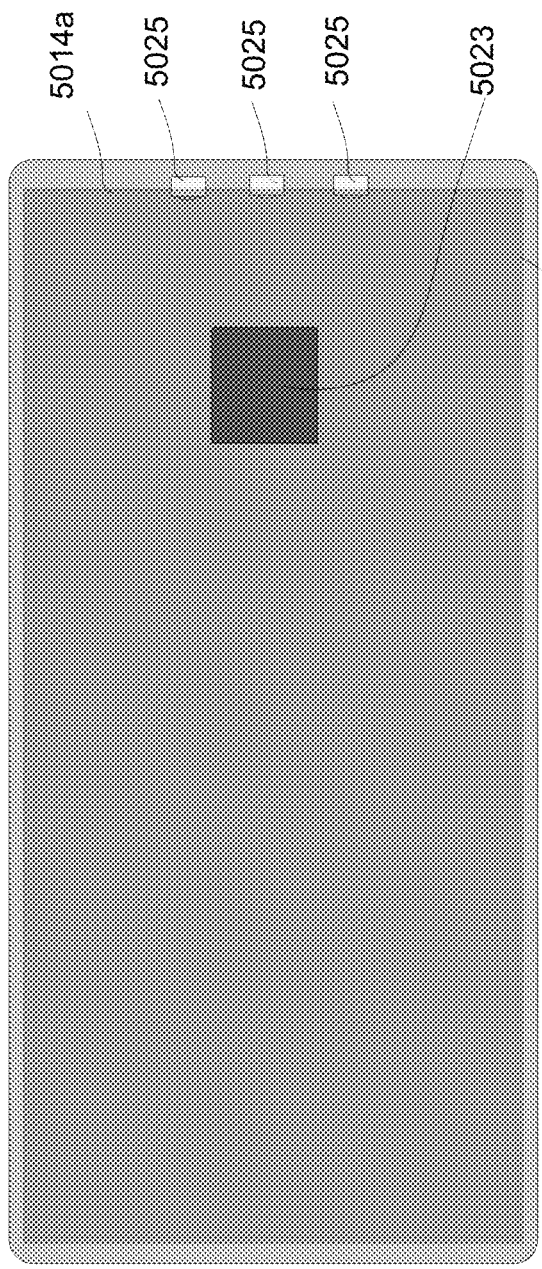
FIG. 32B shows a schematic plan view of the electronic device illustrated in FIG. 32A according to some embodiments.

FIG. 32A shows a schematic cross-sectional view of a display screen of an electronic device equipped with an optical ID sensing module 5023 according to some embodiments. FIG. 32B shows a schematic plan view of the electronic device according to some embodiments. The electronic device may be a smart phone, a tablet computer, a laptop computer, and the like. The display screen may include a cover glass 5011, and a touch sensing layer 5013 disposed under the cover glass 5011. There may be a dark coating 5019 applied to the backside of the cover glass 5011 at the border of the display screen. The touch sensing layer 5013 has edge sides (referred herein as "edges") at the periphery of display screen. For example, the touch sensing layer 5013 has two short edges 5014a and two long edges 5014b along a rectangular border of the display screen. The display screen further includes a display illumination layer 5015 disposed under the touch sensing layer 5013. The display illumination layer 5015 may include organic light-emitting diodes (OLEDs) according to some embodiments. In such cases, the display illumination layer 5015 is referred to as an OLED layer 5015 or an active matrix OLED (AMOLED) layer 5015. The display screen may also include other material layers 5017 disposed under the OLED/AMOLED layer 5015. For example, the other material layers 5017 may include a protection layer.

As illustrated in FIGS. 32A and 32B, the electronic device is equipped with the optical ID sensing module 5023 disposed under the OLED/AMOLED layer 5015. The other material layers 5017 may include a transparent window 5021 directly above the optical ID sensing module 5023, so that signal light carrying fingerprint or palmprint information may be transmitted therethrough and be detected by the optical ID sensing module 5023. The optical ID sensing module 5023 may be configured to form an image of a fingerprint of a finger 5027 or a palmprint of a palm (e.g., as illustrated in FIG. 26) placed on or adjacent the cover glass within a field of view (FOV) of the optical ID sensing module 5023. The optical ID sensing module 5023 may include a camera, such as a pinhole camera, a lens camera, a lens-pinhole camera, and the like. The optical ID sensing module 5023 may also include an array of pinhole cameras, an array of lens cameras, or an array of lens-pinhole cameras. For example, the optical ID sensing module 5023 may be similar to the example illustrated in FIG. 20. It should be noted that, although only one optical ID sensing module 5023 is illustrated in FIGS. 32A and 32B, the electronic device may be equipped with multiple optical ID sensing modules 5023 in some embodiments.

It may be desirable to have an illumination light source to illuminate a finger 5027 or a palm, so that the optical ID sensing module 5023 may be able to capture high quality fingerprints or palmprints. Thus, it may be desirable to provide a light source positioned adjacent the optical ID sensing module 5023. However, the OLEDs in the OLED/AMOLED layer 5015 may be sensitive to high intensity light beams. The OLED/AMOLED layer 5015 usually include many thin film transistors (TFTs) for addressing individual pixels. The TFTs may be damaged if a light beam emitted by a light source is directly incident on them or through them. For example, if a light source is placed below the OLED/AMOLED layer 5015 adjacent the optical ID sensing module 5023 to provide illumination light for the optical ID sensing module 5023, a light beam emitted by the light source may be incident on the OLED/AMOLED layer 5015 from below, which may damage the OLEDs and the TFTs in the OLED/AMOLED layer 5015.

To prevent damages to the OLED/AMOLED layer 5015, one or more light sources 5025 are provided at an edge of the touch sensing layer 5013 above the OLED/AMOLED layer 5015, as illustrated in FIGS. 32A and 32B, according to some embodiments. The light sources 5025 may be micro-sized light sources. They may be positioned at any edge of the touch sensing layer 5013. For example, they may be positioned at a short edge of the touch sensing layer 5013, as illustrated in FIG. 32B. They may also be positioned at a long edge of the touch sensing layer 5013, or at both a short edge and a long edge of the touch sensing layer 5013. The light sources 5025 may be positioned under the dark coating 5019 at the border of the display screen, so that they may not be visible.

Referring to FIG. 32A, light emitted by the light sources 5025 may be coupled into the touch sensing layer 5013 from the edge. Some light rays 5026 coupled into the touch sensing layer 5013 may be transmitted into the OLED/AMOLED layer 5015 and be scattered and/or diffracted by the microstructures (e.g., the TFTs) in the OLED/AMOLED layer 5015. The scattered light 5029 may be refracted through the top surface of the cover glass 5011 to illuminate the finger 5027 (or a palm). Some light rays (e.g., the light ray indicated by the dashed arrow) coupled into the touch sensing layer 5013 may be transmitted into the cover glass 5011, which may be subsequently reflected by the top surface of the cover glass 5011 (e.g., when the angle of incidence satisfies the condition for total internal reflection) toward the OLED/AMOLED layer 5015. The reflected light rays may be scattered and/or diffracted by the microstructures in the OLED/AMOLED layer 5015. The scattered light rays 5028 may be transmitted through the cover glass 5011 to illuminate the finger 5027. In this configuration, light beams emitted by the light sources 5025 are not directly incident on the OLEDs in the OLED/AMOLED layer 5015 from below; instead, they are incident on the OLED/AMOLED layer 5015 from the top, and only after being refracted and/or reflected by the touch sensing layer 5013 and the cover glass 5011. Thus, probabilities of damaging the OLEDs in the OLED/AMOLED layer 5015 may be eliminated or reduced.

According to various embodiments, the light sources 5025 may be light-emitting diodes (LEDs), laser diodes (LDs), vertical-cavity surface-emitting lasers (VCSELs), and the like. The light sources 5025 may be configured to emit light in an ultraviolet wavelength range, a visible wavelength range, a near infrared (NIR) wavelength range, and the like. In some embodiments, the dark coating 5019 may be made to be partially transparent for the wavelength range of the light sources 5025, so that light emitted by the light sources 5025 may be transmitted through the dark coating 5019 and be projected to the finger 5027 or palm.

In some embodiments, the light sources 5025 are configured to emit light in a wavelength range that is outside the visible wavelengths. For example, the light sources 5025 may be configured to emit light in an NIR wavelength range. The optical ID sensing module 5023 may include a filter configured to transmit only light in the NIR wavelength range, and absorb or reflect visible light. Thus, the optical ID sensing module 5023 may image fingerprints or palmprints illuminated only by the light sources 5025, and the background light in visible wavelengths from ambient light and from light emitted by the OLED/AMOLED layer 5015 may be suppressed.

Besides preventing potential damages to the OLED/AMOLED layer 5015, the peripheral arrangement of the illumination light sources 5025 may provide several other advantageous. For example, the optical ID sensing module 5023 may be operated with the OLEDs in the OLED/AMOLED layer 5015 (either in the entire display screen, or only those within the field of view of the optical ID sensing module 5023) are turned off. The OLEDs may be turned off when the optical ID sensing module 5023 is triggered to perform security check.

Thus, the optical ID sensing module 5023 may image fingerprints or palmprints that are illuminated only by the light sources 5025. As illustrated in FIG. 32A, the light rays from the light sources 5025 may be incident on the finger 5027 at relatively large angles of incidence. As such, the fingerprints or palmprints captured by the optical ID sensing module 5023 may exhibit shades in the valley positions of the skin on the finger 5027 or palm. Thus, the quality and reliability of fingerprint identification may be improved. This may be especially advantageous in cases in which the finger 5027 or palm being authenticated is dry.

In addition, when the display OLEDs are turned off, the microstructures of the display, such as the TFTs in the OLED/AMOLED layer 5015 and the sensing circuits in the touch sensing layer 5013 may not be seen by the optical ID sensing module 5023. This may prevent or reduce artifacts in the fingerprints or palmprints that may be captured by the optical ID sensing module 5023. Thus, the optical ID sensing module 5023 may perform authentication more accurately and reliably.

Also, some people may not have clear corneum fingerprint or palmprint due to shallow finger ridge-valley features, but may have corium fingerprint or palmprint. According to some embodiments, the light sources 5025 may be configured to emit light in visible or NIR wavelengths, which may penetrate into the finger/palm tissues. Thus, the optical ID sensing module 5023 may be able to image corium fingerprint or palmprint. As deeper tissues under the skin may be more difficult to imitate using fake materials, the optical ID sensing module 5023 may also have anti-spoofing capabilities.

Figure 33A:
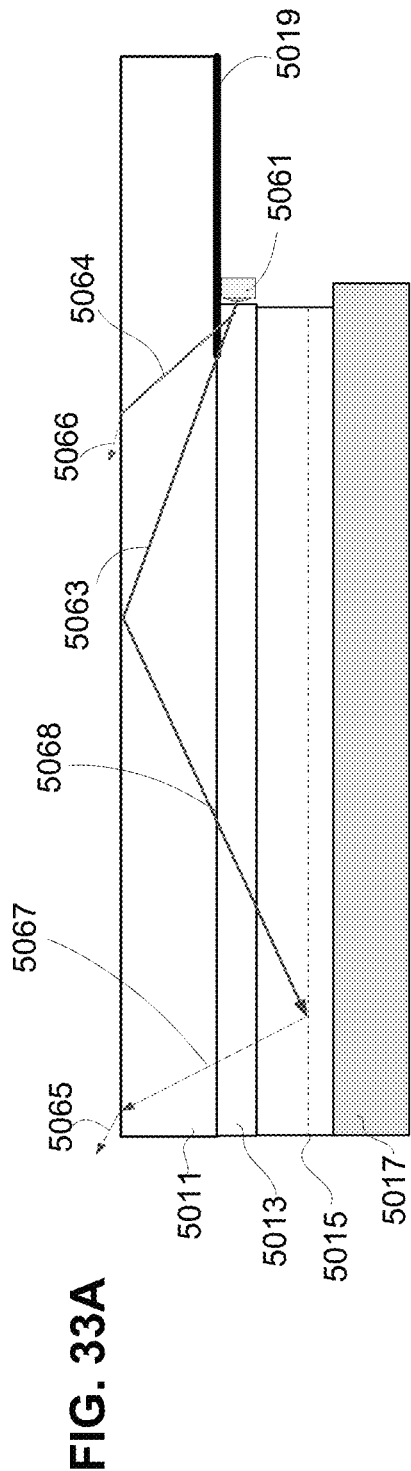
FIG. 33A shows a schematic cross-sectional view of a display screen of an electronic device equipped with peripheral light sources according to some embodiments.
Figure 33B:
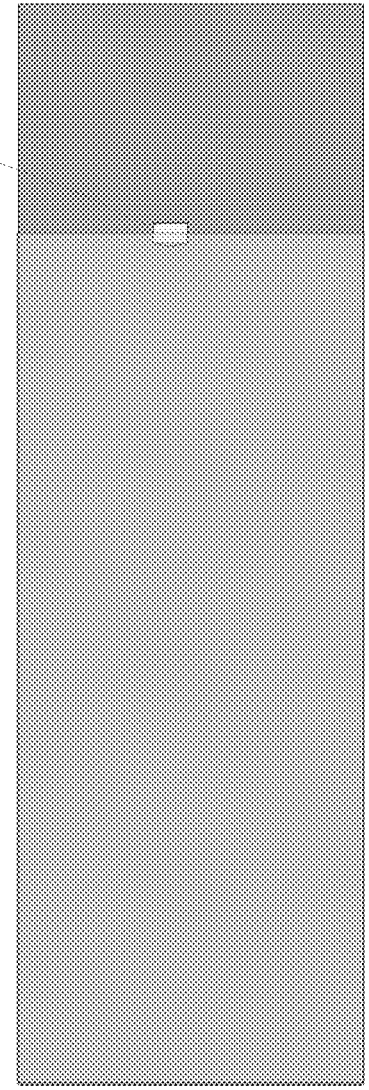
FIG. 33B shows a schematic plan view of the electronic device illustrated in FIG. 33A according to some embodiments.

FIG. 33A shows a partial schematic cross-sectional view of a display screen of an electronic device according to some embodiments. The electronic device may be equipped with an optical ID sensing module (not shown), similar to the optical ID sensing module 5023 illustrated in FIGS. 32A and 32B. FIG. 33B shows a partial schematic plan view of the electronic device according to some embodiments. The display screen may include a cover glass 5011, a touch sensing layer 5013 disposed under the cover glass 5011, and a display illumination layer 5015 disposed under the touch sensor layer 5013, similar to the display screen illustrated in FIGS. 32A and 32B.

The electronic device includes a dark coating 5019 at the bottom surface of the cover glass 5011 at a border of the display screen. The electronic device includes one or more light sources 5061 (only one light source 5061 is shown in FIGS. 33A-33B) positioned under the dark coating 5019, so that they may be invisible. The touch sensor layer 5013 may be thick enough that the one or more light sources 5061 may be positioned against an edge of the touch sensor layer 5013.

As illustrated in FIG. 33A, light emitted by the one or more light sources 5061 may be coupled into the touch sensor layer 5013. Some light rays coupled into the touch sensor layer 5013 may be transmitted into the cover glass 5011. The transmitted light rays 5063 may be reflected by the top surface of the cover glass 5011, for example when the angle of incidence of the transmitted light rays 5063 satisfies the condition for total internal reflection. The reflected light rays 5068 may be directed toward the display illumination layer 5015, which may subsequently be scattered or diffracted by the microstructures in the display illumination layer 5015. The scattered or diffracted light rays 5067 may be transmitted through the touch sensor layer 5013 and the cover glass 5011. The transmitted rays 5065 may illuminate the finger or palm.

Some light rays coupled into the touch sensor layer 5013 may be transmitted through the dark coating 5019 into the cover glass 5011 (e.g., the dark coating 5019 may be transparent or partially transparent in the wavelength range of the one or more light sources 5061). The transmitted light rays 5064 may be refracted out of the top surface of the cover glass 5011, for example when the angle of incidence of the light rays 5064 does not satisfy the condition for total internal reflection. The transmitted light rays 5066 may illuminate a finger or palm placed adjacent the cover glass 5011 (e.g., as the finger 5027 illustrated in FIG. 32A).

Because the light rays 5065 and 5066 illuminating the finger (or palm) propagate in a direction that is nearly perpendicular to the optical axis of the optical ID sensing module (not shown), which is substantially perpendicular to the surface of the cover glass 5011, the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

FIG. 34A shows a schematic cross-sectional view of a display screen of an electronic device equipped with an optical ID sensing module 5023 according to some embodiments. FIG. 34B shows a schematic plan view of the electronic device according to some embodiments. The display screen may include a cover glass 5011, a touch sensing layer 5013 disposed under the cover glass 5011, and a display illumination layer 5015 disposed under the touch sensor layer 5013, similar to the display screen illustrated in FIGS. 32A and 32B. The display illumination layer 5015 may include an OLED/AMOLED layer, an LCD layer, and the like. The electronic device includes one or more light sources 5031 positioned at an edge of the cover glass 5011. In some embodiments, the cover glass 5011 may include indentations at the edge of the cover glass 5011 for receiving the one or more light sources 5031.

As illustrated in FIG. 34A, light emitted by the one or more light sources 5031 may be coupled into the cover glass 5011 through the edge. Some light rays coupled into the cover glass 5011 may be refracted out of the top surface of the cover glass 5011, for example when the angle of incidence of the light rays does not satisfy the condition for total internal reflection. The refracted light rays 5033 may illuminate a finger or palm placed on or adjacent the cover glass 5011 (e.g., as the finger 5027 illustrated in FIG. 32A).

Some light rays coupled into the cover glass 5011 (e.g., the light ray 5035) may be refracted out of the bottom surface of the cover glass 5011, which may be transmitted through the touch sensor layer 5013 and subsequently be scattered or diffracted by the microstructures in the display illumination layer 5015. The scattered or diffracted light rays may be transmitted through the touch sensor layer 5013 and the cover glass 5011. The transmitted light rays 5037 may illuminate the finger or palm as well.

Some light rays coupled into the cover glass 5011 (e.g., the light ray 5036) may be reflected by the top surface of the cover glass 5011 (e.g., when the angle of incidence of the light ray 5036 satisfies the condition for total internal reflection). The reflected light rays may be directed toward the display illumination layer 5015, and may be scattered or diffracted by the microstructures in the display illumination layer 5015. The scattered or diffracted light rays may be transmitted through the touch sensor layer 5013 and the cover glass 5011. The transmitted rays 5038 may also illuminate the finger or palm.

Because the light rays 5033, 5037, and 5038 illuminating the finger (or palm) propagate in a direction that is nearly perpendicular to the optical axis of the optical ID sensing module 5023 (which is perpendicular to the surface of the cover glass 5011), the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

In this configuration, light beams emitted by the light sources 5031 are not directly incident on the OLEDs in the display illumination layer 5015 from the bottom; instead, they are incident on the illumination 5015 from the top, and only after being refracted and/or reflected by the touch sensing layer 5013 and the cover glass 5011. Thus, probabilities of damaging the OLEDs in the display illumination layer 5015 may be eliminated or reduced.

Figure 35A:
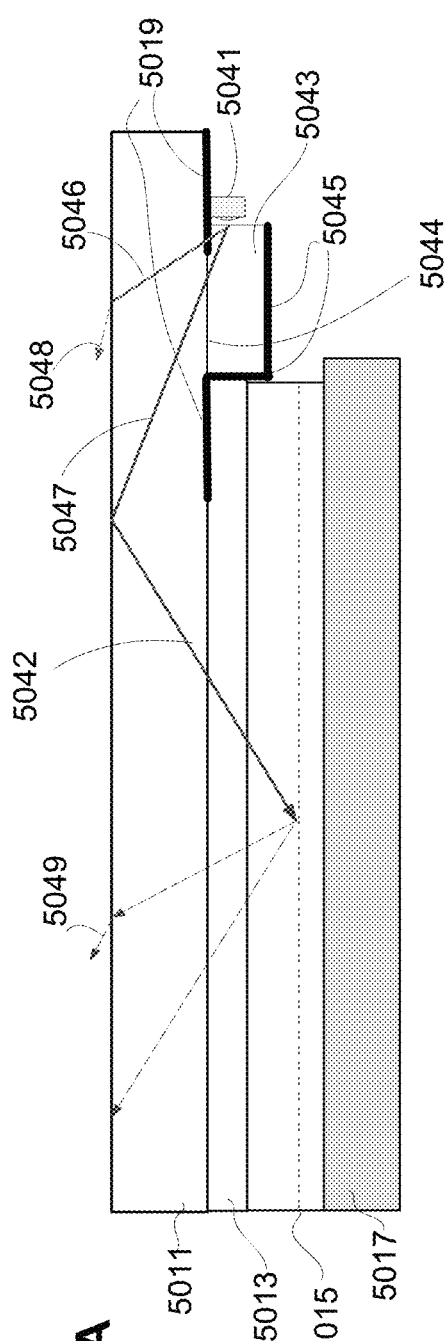
FIG. 35A shows a schematic cross-sectional view of a display screen of an electronic device equipped with peripheral light sources according to some embodiments.
Figure 35B:
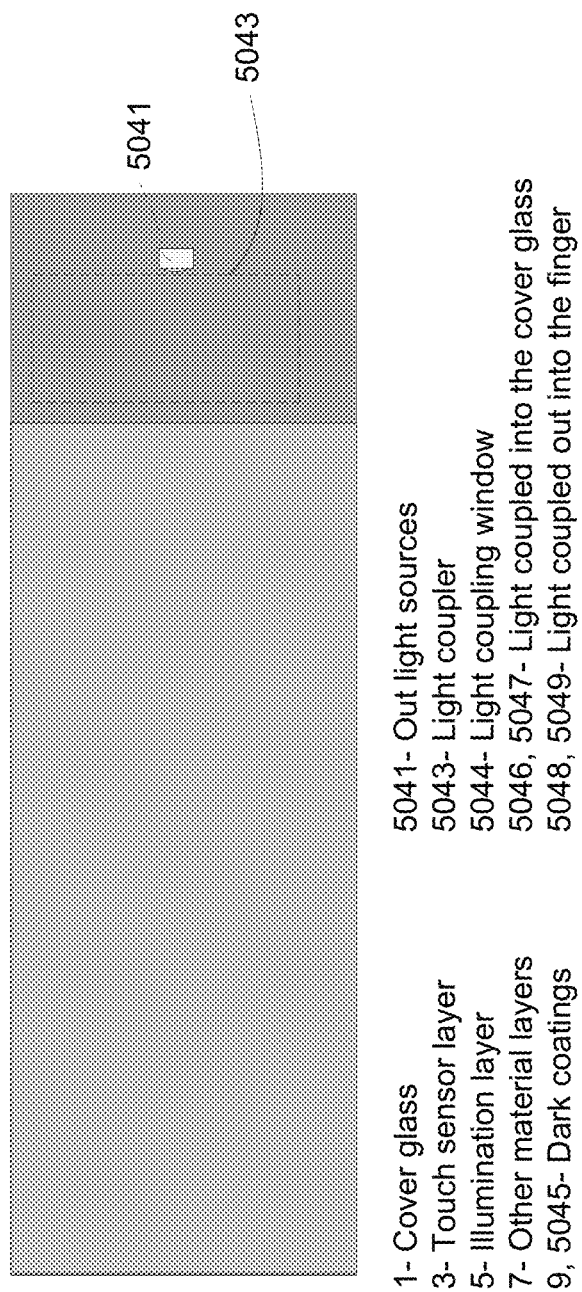
FIG. 35B shows a schematic plan view of the electronic device illustrated in FIG. 35A according to some embodiments.

FIG. 35A shows a partial schematic cross-sectional view of a display screen of an electronic device according to some embodiments. The electronic device may be equipped with an optical ID sensing module (not shown), similar to the optical ID sensing module 5023 illustrated in FIGS. 32A and 32B. FIG. 35B shows a partial schematic plan view of the electronic device according to some embodiments. The display screen may include a cover glass 5011, a touch sensing layer 5013 disposed under the cover glass 5011, and a display illumination layer 5015 disposed under the touch sensor layer 5013, similar to the display screen illustrated in FIGS. 32A and 32B.

The electronic device includes one or more light sources 5041 (only one light source 5041 is shown in FIGS. 35A-35B) positioned under the cover glass 5011 at a border of the display screen. The display screen may include a dark coating 5019 applied to the bottom surface of the cover glass 5011 at the border. The one or more light sources 5041 may be positioned under the dark coating 5019, so that they may not be visible.

The electronic device also includes a light coupler 5043 positioned under the cover glass 5011 adjacent the one or more light sources 5041. The light coupler 5043 may be configured to couple light emitted by the one or more light sources 5041 into the cover glass 5011. In some embodiments, the light coupler 5043 may have an index of refraction that is nearly the same or similar to the index of refraction of the cover glass 5011. Thus, light rays emitted from the light source 5041 may not undergo refraction at the interface between the cover glass 5011 and the light coupler 5043.

In some embodiments, the dark coating 5019 includes one or more window areas 5044 adjacent the light sources 5041. The dark coating is removed in the window areas 5044, so as to let light emitted from the one or more light sources 5041 be transmitted therethrough. In some other embodiments, the dark coating 5019 may be partially transparent for the wavelength range of the one or more light sources 5041. In some embodiments, the electronic device includes another dark coating 5045 under the light coupler 5043 and on a side wall of the light coupler 5043. Thus, the border of the display screen may appear dark even in the window areas 5044.

As illustrated in FIG. 35A, light emitted by the one or more light sources 5041 may be coupled into the light coupler 5043, and be transmitted through the top surface of the light coupler 5043 into the cover glass 5011. Some light rays transmitted into the cover glass 5011 (e.g., the light rays 5046) may be refracted out of the top surface of the cover glass 5011 (e.g., when the angle of incidence of the light rays 5046 does not satisfy the condition for total internal reflection). The refracted light rays 5048 may illuminate a finger or palm placed on or adjacent the cover glass 5011 (e.g., as the finger 5027 illustrated in FIG. 32A). Some light rays transmitted into the cover glass 5011 (e.g., the light ray 5047) may be reflected by the top surface of the cover glass 5011 (e.g., when the angle of incidence of the light rays 5047 satisfies the condition for total internal reflection). The reflected light rays 5042 may be incident on and be scattered or diffracted by the microstructures in the display illumination layer 5015. The scattered or diffracted light rays 5049 may be transmitted through the touch sensor layer 5013 and the cover glass 5011. The transmitted light rays 5049 may illuminate the finger or palm as well.

Because the light rays 5048 and 5049 illuminating the finger (or palm) propagate in a direction that is nearly perpendicular to the optical axis of the optical ID sensing module (not shown), which is substantially perpendicular to the surface of the cover glass 5011, the background of the fingerprint (or palmprint) image may appear dark. When a finger (or palm) touches the top surface of the cover glass 5011, the ridge area of the fingerprint (or palmprint) may result in bright image lines, while the valley area of the fingerprint (or palmprint) may result in dark image lines.

In this configuration, light beams emitted by the light sources 5041 are not directly incident on the display illumination layer 5015 from the bottom; instead, they are incident on the display illumination layer 5015 from the top, and only after being refracted and/or reflected by the touch sensing layer 5013 and the cover glass 5011. Thus, probabilities of damaging the display illumination layer 5015 may be eliminated or reduced.

Figure 36A:
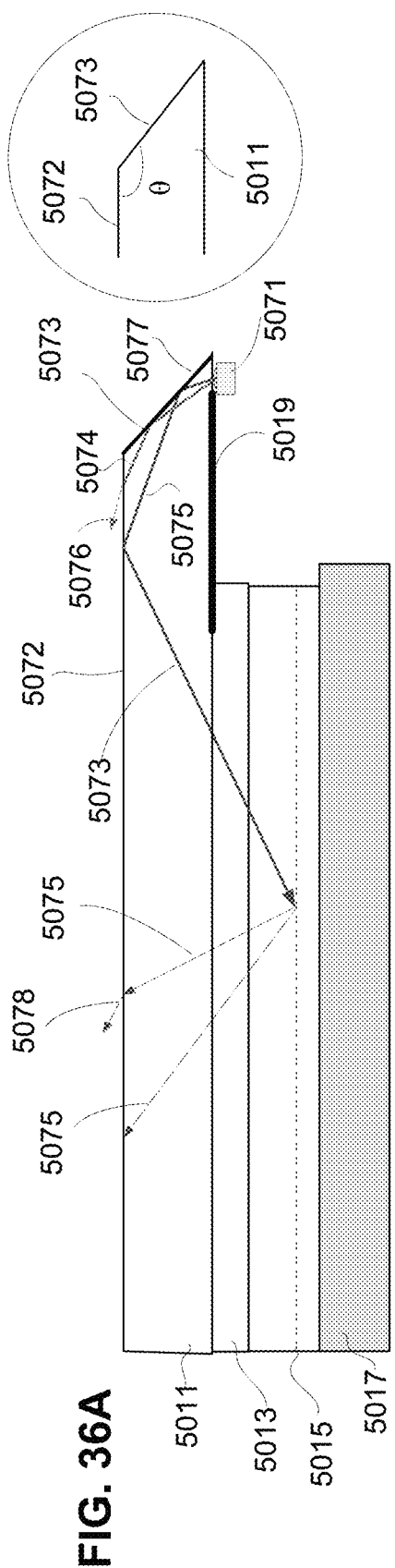
FIG. 36A shows a schematic cross-sectional view of a display screen of an electronic device equipped with peripheral light sources according to some embodiments.
Figure 36B:
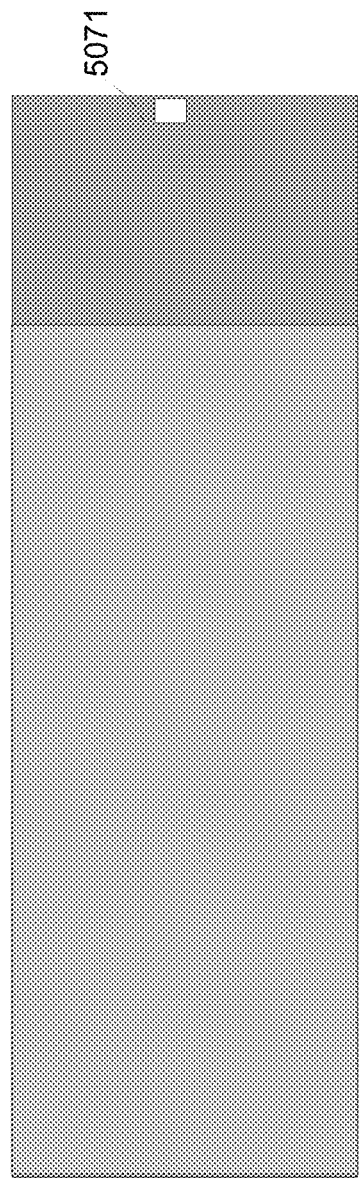
FIG. 36B shows a schematic plan view of the electronic device illustrated in FIG. 36A according to some embodiments.

FIG. 36A shows a partial schematic cross-sectional view of a display screen of an electronic device according to some embodiments. The electronic device may be equipped with an optical ID sensing module (not shown), similar to the optical ID sensing module 5023 illustrated in FIGS. 32A and 32B. FIG. 36B shows a partial schematic plan view of the electronic device according to some embodiments. The display screen may include a cover glass 5011, a touch sensing layer 5013 disposed under the cover glass 5011, and a display illumination layer 5015 disposed under the touch sensor layer 5013, similar to the display screen illustrated in FIGS. 32A and 32B.

The electronic device includes a dark coating 5019 at the bottom surface of the cover glass 5011 at a border of the display screen. The dark coating 5019 does not extend to the very edge of the bottom surface of the cover glass 5011, or has a window adjacent the edge. The electronic device includes one or more light sources 5071 (only one light source 5071 is illustrated in FIGS. 36A-36B) positioned under the window of the dark coating 5019 adjacent the edge of the cover glass 5011. Light emitted by the one or more light sources 5071 may be transmitted through the window into the cover glass 5011.

As illustrated in FIG. 36A, the edge of the cover glass 5011 adjacent the one or more light sources 5071 has a slanted surface 5073. Light rays transmitted into the cover glass 5011 may be reflected by the slanted surface 5073. The reflected light rays (e.g., the light rays 5074 and 5075) may propagate forward toward the opposite edge of the cover glass 5011. In some embodiments, the slanted surface 5073 may form an angle θ with respect to the top surface 5072 of the cover glass 5011. The angle θ may range from about 100 degrees to about 175 degrees, according to some embodiments. The light rays transmitted into the cover glass 5011 may undergo total internal reflection at the slanted surface 5073. In some embodiments, a high reflection film may be applied to the slanted surface 5073.

Some reflected light rays (e.g., the light ray 5074) may be refracted out of the top surface of the cover glass 5011 (e.g., when the angle of incidence of the light ray 5074 does not satisfy the condition for total internal reflection). The refracted light ray 5076 may illuminate a finger placed adjacent the top surface of the cover glass 5011. Some reflected light rays (e.g., the light ray 5075) may be reflected by the top surface of the cover glass 5011 (e.g., when the angle of incidence of the light ray 5075 satisfies the condition for total internal reflection). The reflected light rays 5073 may be directed toward the display illumination layer 5015, which may be scattered or diffracted by the microstructures in the display illumination layer 5015. The scattered or diffracted light rays 5075 may be transmitted through the touch sensor layer 5013 and the cover glass 5011. The transmitted light rays 5078 may illuminate the finger or palm.

Because the light rays 5076 and 5078 illuminating the finger (or palm) propagate in a direction that is nearly perpendicular to the optical axis of the optical ID sensing module (not shown), which is substantially perpendicular to the surface of the cover glass 5011, the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

FIG. 37A shows a partial schematic cross-sectional view of a display screen of an electronic device according to some embodiments. The electronic device may be equipped with an optical ID sensing module (not shown), similar to the optical ID sensing module 5023 illustrated in FIGS. 32A and 32B. FIG. 37B shows a partial schematic plan view of the electronic device according to some embodiments. The display screen may include a cover glass 5011, a touch sensing layer 5013 disposed under the cover glass 5011, and a display illumination layer 5015 disposed under the touch sensor layer 5013, similar to the display screen illustrated in FIGS. 32A and 32B.

The electronic device includes a partially transparent dark coating 5053 at the bottom surface of the cover glass 5011 at the border of the display screen. The partially transparent dark coating 5053 may be transparent or partially transparent to the wavelength range of the one or more light sources 5051, and block light in the visible wavelengths. The partially transparent dark coating 5053 may have a rough texture such that the partially transparent dark coating 5053 may scatter light incident thereon. The electronic device includes one or more light sources 5051 (only one light source 5051 is illustrated in FIGS. 37A-37B) positioned under the partially transparent dark coating 5053, so that they may be invisible.

As illustrated in FIG. 37A, light emitted by the one or more light sources 5051 may be coupled into the cover glass 5011 through the partially transparent dark coating 5053. Some light rays (e.g., the light rays 5056) may be refracted into the cover glass 5011, which may be subsequently refracted out of the top surface of the cover glass 5011 (e.g., when the angle of incidence of the light rays 5056 does not satisfy the condition for total internal reflection). The refracted light rays 5058 may illuminate a finger or palm placed adjacent the cover glass 5011 (e.g., as the finger 5027 illustrated in FIG. 32A). Some light rays (e.g., the light ray 5055) may be scattered into the cover glass 5011 by the partially transparent dark coating 5053, and may be subsequently reflected by the top surface of the cover glass 5011 (e.g., when the angle of incidence of the light rays 5055 satisfies the condition for total internal reflection). The reflected light rays 5052 may be incident on and be scattered or diffracted by the microstructures in the display illumination layer 5015. The scattered or diffracted light rays may be transmitted through the touch sensor layer 5013 and the cover glass 5011. The transmitted light rays 5057 may illuminate the finger or palm.

Because the light rays 5057 and 5058 illuminating the finger (or palm) propagate in a direction that is nearly perpendicular to the optical axis of the optical ID sensing module (not shown), which is substantially perpendicular to the surface of the cover glass 5011, the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

In this configuration, light beams emitted by the light sources 5051 are not directly incident on the display illumination layer 5015 from the bottom; instead, they are incident on the display illumination layer 5015 from the top, and only after being refracted and/or reflected by the touch sensing layer 5013 and the cover glass 5011. Thus, probabilities of damaging the display illumination layer 5015 may be eliminated or reduced.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:
1. An electronic device comprising:
 a display screen comprising:
  a cover glass;
  a touch sensing layer disposed under the cover glass, the touch sensing layer having an edge surface; and a display illumination layer disposed under the touch sensing layer;

an optical identification (ID) sensing module disposed under the display illumination layer, the optical ID sensing module configured to form an image of a fingerprint pattern or a palmprint pattern of a hand of a user placed within a field of view (FOV) of the optical ID sensing module; and a light source disposed adjacent the edge surface of the touch sensing layer, the light source configured to emit a light beam from a surface of the light source that faces the edge surface of the touch sensing layer, so that the light beam is coupled into the touch sensing layer through the edge surface and a portion of the light beam that is coupled into the touch sensing layer is transmitted through the cover glass to illuminate the hand for imaging of fingerprint pattern or the palmprint pattern by the optical ID sensing module.

2. The electronic device of claim 1, wherein the display illumination layer comprises a plurality of organic light-emitting diodes (OLEDs).

3. The electronic device of claim 2, wherein the display illumination layer further comprises a plurality of thin film transistors (TFTs) electrically coupled to the plurality of OLEDs for operating the plurality of OLEDs.

4. The electronic device of claim 1, wherein the touch sensing layer comprises touch sensing circuitries.

5. The electronic device of claim 1, wherein the light source comprises a light-emitting diode (LED), a laser diode (LD), or a vertical-cavity surface-emitting lasers (VCSEL).

6. The electronic device of claim 1, wherein the light source is configured to emit the light beam in a near infrared (NIR) wavelength range, an ultraviolet (UV) wavelength range, or a visible wavelength range.

7. The electronic device of claim 1, wherein the display screen further comprises a dark coating applied to a back surface of the cover glass at a border of the display screen, and wherein the light source is disposed under the dark coating.

8. An electronic device comprising:
a display screen comprising:
   a cover glass;
   a touch sensing layer disposed under the cover glass, the touch sensing layer having an edge surface; and
   an organic light-emitting diode (OLED) layer disposed under the touch sensing layer;
an optical identification (ID) sensing module disposed under the OLED layer, the optical ID sensing module configured to form an image of a fingerprint pattern or a palmprint pattern of a hand of a user placed within a field of view (FOV) of the optical ID sensing module; and a light source disposed adjacent the edge surface of the touch sensing layer, the light source configured to emit a light beam from a surface of the light source that faces the edge surface of the touch sensing layer, so that the light beam is coupled into the touch sensing layer through the edge surface and a portion of the light beam that is coupled into the touch sensing layer is transmitted through the cover glass to illuminate the hand for imaging of fingerprint pattern or the palmprint pattern by the optical ID sensing module.

9. The electronic device of claim 8, wherein the light source comprises a light-emitting diode (LED), a laser diode (LD), or a vertical-cavity surface-emitting lasers (VCSEL).

10. The electronic device of claim 8, wherein the light source is configured to emit the light beam in a near infrared (NIR) wavelength range.

11. The electronic device of claim 10, wherein the optical ID sensing module comprises an optical filter configured to transmit light in the NIR wavelength range, and block visible light.

12. The electronic device of claim 8, wherein the light source is configured to emit the light beam in an ultraviolet (UV) wavelength range or a visible wavelength range.

13. The electronic device of claim 8, further comprising a processor communicatively coupled to the optical ID sensing module, the display screen, and the light source, the processor configured to:
   detect a trigger event for operating the optical ID sensing module; and
   in response to detecting the trigger event:
      turn off the OLED layer;
      turn on the light source; and
      cause the optical ID sensing module to capture the image of the fingerprint pattern or the palmprint pattern of the hand illuminated by the light beam emitted by the light source.

14. The electronic device of claim 8, wherein the display screen further comprises a dark coating applied to a back surface of the cover glass at a border of the display screen, and wherein the light source is disposed under the dark coating.

15. The electronic device of claim 14, wherein the light source is configured emit the light beam in a first wavelength range, and the dark coating is partially transparent to light in the first wavelength range.

* * * * *